US008484571B2

(12) United States Patent (10) Patent No.: US 8,484,571 B2
Bonuso et al. (45) Date of Patent: Jul. 9, 2013

(54) APPLIANCE WITH THEME SELECTION

(75) Inventors: Jennifer L. Bonuso, Saint Joseph, MI (US); Mark E. Glotzbach, Granger, IN (US); Richard A. McCoy, Stevensville, MI (US); Erik P. Oosterwal, Dowagic, MI (US); Brian N. Radford, Saint Joseph, MI (US); Brandon L. Satanek, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 933 days.

(21) Appl. No.: 12/556,697

(22) Filed: Sep. 10, 2009

(65) Prior Publication Data

US 2009/0327931 A1 Dec. 31, 2009

Related U.S. Application Data

(63) Continuation of application No. PCT/US2009/046186, filed on Jun. 3, 2009.

(60) Provisional application No. 61/058,440, filed on Jun. 3, 2008.

(51) Int. Cl.
*G06F 3/048* (2006.01)
*G06F 3/00* (2006.01)

(52) U.S. Cl.
USPC ............................ 715/764; 715/762; 715/765

(58) Field of Classification Search
USPC .......................................... 715/764, 762, 765
See application file for complete search history.

(56) References Cited

U.S. PATENT DOCUMENTS

| 6,466,234 | B1 * | 10/2002 | Pyle et al. ...................... 715/771 |
| 6,584,439 | B1 | 6/2003 | Geilhufe et al. |
| 6,772,393 | B1 * | 8/2004 | Estrada et al. ................. 715/222 |
| 6,941,521 | B2 * | 9/2005 | Lin et al. ........................ 715/762 |
| 7,640,496 | B1 * | 12/2009 | Chaulk et al. ................. 715/243 |
| 7,937,171 | B2 * | 5/2011 | Glotzbach et al. .............. 700/83 |
| 7,996,383 | B2 * | 8/2011 | Smyros et al. ................ 707/711 |

(Continued)

FOREIGN PATENT DOCUMENTS
WO 2006012390 A2 2/2006

OTHER PUBLICATIONS

Authors: Dave Steinberg; Frank Budinsky; Marcelo Paternostro; Ed Merks EMF: Eclipse Modeling Framework, Second Edition 744PGS Published Dec. 16, 2008 Publisher: Addison-Wesley Professional.
Author: W. Bolton Programmable Logic Controllers, Fifth Edition 403 Pgs Published Aug. 7, 2009 Publisher: Elsevier Science & Technology.

(Continued)

*Primary Examiner* — David Phantana Angkool
(74) *Attorney, Agent, or Firm* — Clifton G. Green; McGarry Bair PC

(57) ABSTRACT

An appliance includes one or more control boards having control software to control a cycle of operation of the appliance, a graphical user interface in communication with the control boards for allowing a user to observe and interact with the appliance regarding the cycle of operation, and a software framework configured to run in a processor having memory in communication with the graphical user interface. The software framework has theme definitions and access to builder content containing information with which it associates a theme definition with one or more resources. The software framework dynamically renders the graphical user interface at runtime based on the resources in response to selection of a theme so that a user can cause the control board to control the cycle of operation via the selected theme in the graphical user interface.

21 Claims, 56 Drawing Sheets

U.S. PATENT DOCUMENTS

| | | | |
|---|---|---|---|
| 8,136,039 B2 * | 3/2012 | Ebrom et al. | 715/706 |
| 2006/0095551 A1 * | 5/2006 | Leung et al. | 709/223 |
| 2007/0168060 A1 * | 7/2007 | Nixon et al. | 700/83 |
| 2009/0326856 A1 * | 12/2009 | McCoy | 702/122 |
| 2010/0005405 A1 * | 1/2010 | Argue et al. | 715/763 |
| 2010/0005447 A1 * | 1/2010 | McCoy | 717/115 |
| 2010/0042603 A1 * | 2/2010 | Smyros et al. | 707/4 |
| 2011/0185342 A1 * | 7/2011 | Argue et al. | 717/113 |

OTHER PUBLICATIONS

Author: Frank Petruzella Programmable Logic Controllers, 3 Edition 480 Pgs Published Mar. 2, 2004 Publisher; Career Education.

Author: Kelvin T. Erickson Programmable Logic Controllers: An Emphasis on Design and Application 1460 Pgs Published Apr. 1, 2005 Publisher: Dogwood Valley Press, LLC.

* cited by examiner

Fig. 33

Scenario 3

Scenario 2

APPLIANCE WITH THEME SELECTION

CROSS REFERENCE TO RELATED APPLICATIONS

This application is a continuation of PCT/US2009/046186 filed Jun. 3, 2009, which claims priority from U.S. Application Ser. No. 61/058,440 filed Jun. 3, 2008.

FIELD OF THE INVENTION

The invention relates to the operation of appliances and more particularly, to the rendering of themes on a graphical user interface in an appliance.

DESCRIPTION OF THE RELATED ART

Household appliances typically comprise one or more components responsible for the electromechanical operations of the appliance. For example, an oven can include an appliance management component having a printed circuit board (PCB) with memory, as well as a user-interface component, such as a control panel or keypad, for a user to issue commands to the oven. As another example, a washing machine can include an appliance management component, a user-interface component, and a motor control component that controls a motor of the washing machine.

Typically, discrete circuits couple the internal components of an appliance, with each discrete circuit responsible for individual communication between related components. The circuits communicate with each other over an internal network that traditionally is implemented by hard-wired ribbon cables or other connectors or harnesses between the components. The hard-wired connectors form a closed system or network that is difficult or not possible to modify. For example, because the closed network relies on hard-coded or hard-wired network solutions, it is not practical to couple additional external components or additional internal components to the appliance to expand the capability or function of the appliance. The closed network cannot easily be adapted for communication with the additional external/internal components and therefore limits the potential of the appliance.

In some instances, service personnel can access the interior of an appliance and connect an external device to the internal network in order to modify the operation of or otherwise interact with the internal components of the appliance. However, scheduling appointments with service personnel can be inconvenient, and accessing the interior of the appliance can require the use of specialized tools and can potentially damage the appliance in the process. In addition, due to the limited potential of the internal components, the user of the appliance is unable to thoroughly personalize the operation of the appliance in order to tailor the appliance to his or her particular needs.

SUMMARY OF THE INVENTION

An appliance according to the invention is configured to perform a cycle of operation on a physical article and includes one or more control boards having control software to control the cycle of operation, a graphical user interface in communication with the control boards for allowing a user to observe and interact with the appliance regarding the cycle of operation, and a software framework configured to run in a processor having memory in communication with the graphical user interface. The software framework has theme definitions and access to builder content containing information with which it associates a theme definition with one or more resources. The software framework dynamically renders the graphical user interface at runtime based on the resources in response to selection of a theme so that a user can cause the control board to control the cycle of operation via the selected theme in the graphical user interface.

In another aspect, the appliance has a dynamic user interface for allowing a user to initiate or observe the cycle of operation, two or more theme definitions each having an identifier, one or more control boards in communication with the user interface and having a processor and memory, and a software framework in the memory. The software framework has access to a content provider for acquiring a dataset from at least one source of data, and it also has one or more binding objects and one or more user interface control objects. The binding objects and the user interface control objects are directly or indirectly related to each other. The appliance also has one or more sources of information about a dataset having data. The binding objects and the sources of information are directly or indirectly related in the memory. The appliance also has a memory location to store a selected theme identifier. The software framework can change the relationship between the binding objects and the sourcees of information in response to a runtime change to the value of the memory location that stores the theme identifier. The result is a graphical transformation of the user interface where the related objects of the bindings enable the transformation to be made at runtime.

BRIEF DESCRIPTION OF THE DRAWINGS

In the drawings:

Figure 33:
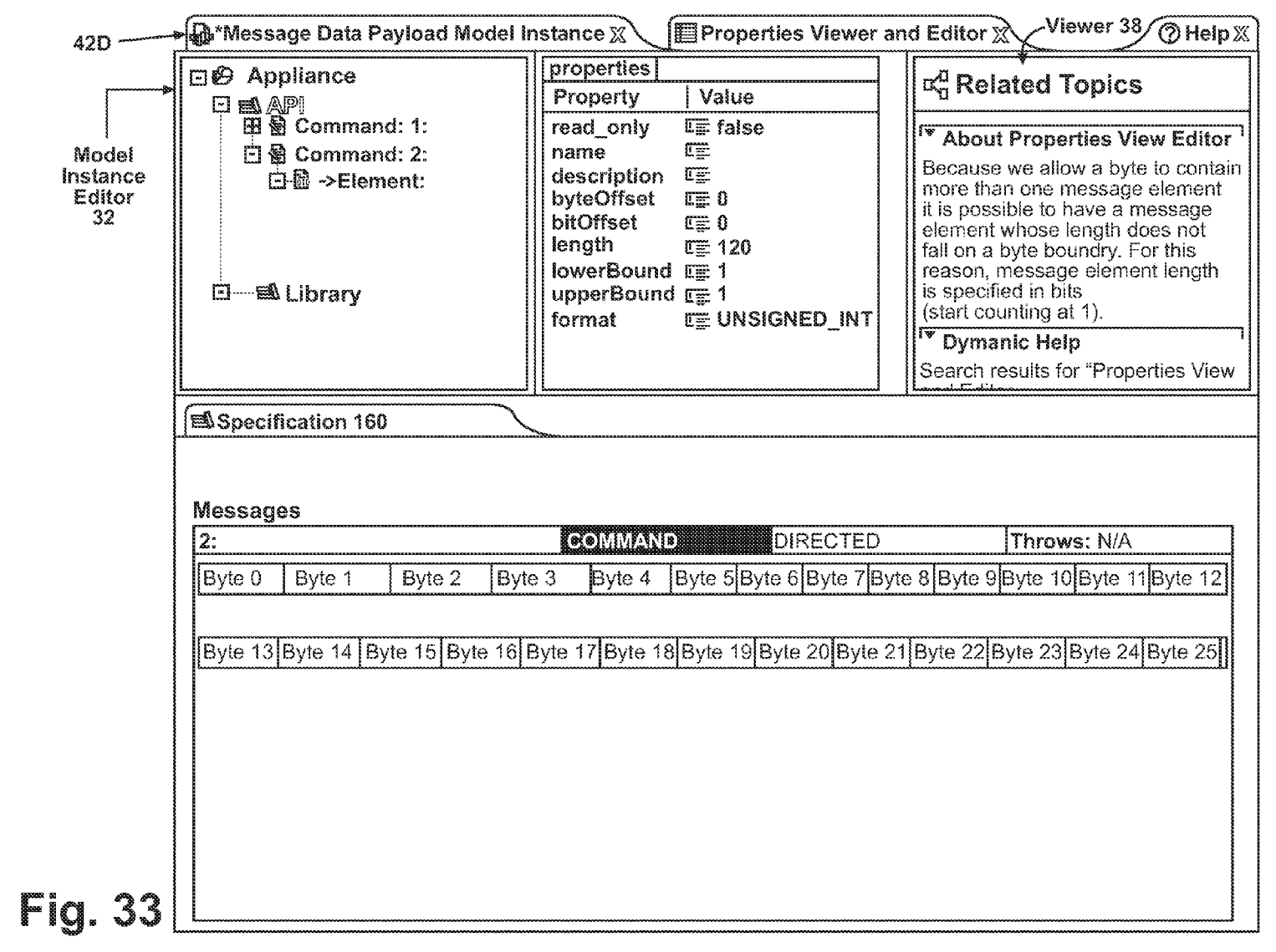

FIG. 33 is a screen shot of a model instance editor in an appliance development toolkit according to the invention with a properties viewer and information about it.

DESCRIPTION OF EMBODIMENTS OF THE INVENTION

Figure 1:
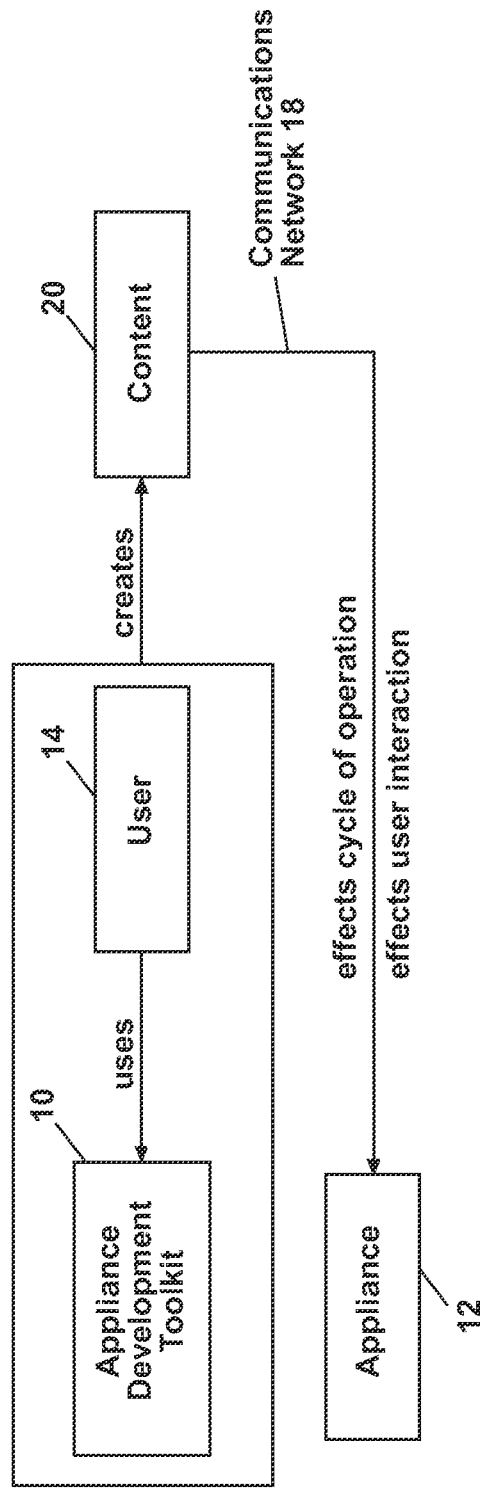
FIG. 1 is a schematic diagram showing the environment of an appliance development toolkit according to the invention.

Referring to the drawings and to FIG. 1 in particular, an appliance development toolkit 10 according to the invention, which will be referred to hereinafter as the toolkit 10, is configured to enable the creation and modification of content 20 to affect and/or effect operation of one or more components associated with an appliance 12 so as to affect and/or effect interaction between a user 14 and the appliance 12 and/or a cycle of operation of the appliance 12. The toolkit 10 can be used with different appliances 12 without requiring the recoding of software of the toolkit 10. The user 14 can be a consumer, a salesperson, a manufacturer 14A (see FIG. 25), a product engineer, or any other individual capable of using the appliance 12 and/or the toolkit 10.

The appliance 12 can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, and the like.

The appliance 12 can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The components associated with the appliance 12 can include any devices, parts, software, and the like that participate in the operation of the appliance 12, either directly or indirectly. Some of the components have a corresponding controller (main controller, motor controller, user interface, etc.), which can be a simple microprocessor mounted on a printed circuit board (a control board), while other components can have no controller. The components can comprise one or more devices that are controlled by the controller. Typically, the controller components in cooperation, either directly or indirectly, through other components, control the operation of all of the components and the associated devices to implement a cycle of operation for the appliance 12.

The one or more components affected/effected by the toolkit 10 can comprise another appliance 12, one or more components on the appliance 12 or in another appliance 12, or an accessory device or component thereof for use with the appliance 12. For purposes of describing the invention, it will be understood that when reference is made herein to the use of the toolkit 10 in conjunction with the appliance 12, the same applies to the use of the toolkit 10 in conjunction with another appliance 12, with one or more components of the appliance 12 or of another appliance 12, and with an accessory device or component(s) thereof for use with the appliance 12.

The appliance 12 can be communicatively coupled to the toolkit 10 via a communications network 18 existing at least partially within the appliance 12 and/or at least partially external to the appliance 12 as appropriate. The communications network 18 comprises all of the coupling elements communicatively linking the various parts of the toolkit 10 and the appliance 12, as well as any coupling elements communicatively linking additional devices or resources to the toolkit 10 and/or appliance 12 (e.g. a coupling element connecting the appliance 12 with an accessory). For example, the communications network 18 can comprise an internal communications network of the appliance 12 enabling communication between the various components within the appliance 12, an external communications network connected to the toolkit 10, and a coupler for communicatively coupling the two networks. The coupler can comprise a communication driver configured to establish a communications link between the toolkit 10 and the appliance 12. Looking also at FIG. 2, the communication driver can be a smart driver 54 having expanded functionality enabling the smart driver 54 to create, modify, and/or interpret content 20. The communications network 18 can further comprises an additional communications connection between the appliance 12 and/or toolkit 10 and one or more additional devices, such as the accessory, an external network, a second appliance 12 or accessory, or one or more components thereof. As a non-limiting example, the additional communications connection can be to the Internet. The communications network 18 can comprise, at least in part, a smart coupler 56 as is disclosed in International Patent Application Publication No. 2009/058770, which is incorporated by reference herein in its entirety. The smart coupler 56 can incorporate the communications driver, which can be the smart driver 54.

The toolkit 10 enables a user 14 to create content 20 that can be provided to or otherwise obtained by one or more content targets 22 to affect the functionalities of the appliance 12. Content 20 can be formatted as at least one of a relational database, XML document, CSV file, binary file, data collection, memory structure, object structure, object graph, object tree, memory heap, machine code, source code, and text file, images, text, data elements, or other type of information associated with the toolkit 10 that can be interpreted, converted, propagated, created, modified, or otherwise used for some purpose by the toolkit 10, the appliance 12, or an associated device or component. Examples of content 20 include but are not limited to a cycle structure, a custom cycle, a branded cycle, user-attached data about appliance control functionality, a fault tree, a diagnostic test, an appliance user interface 64 (see FIG. 6A for example), appliance network communication, routing tables for appliance network communication, stain treatment, cooking, cooking algorithms, cooking vessels, meal preparation, dish preparation, recipes, units conversion, ingredients, ingredient substitution, dietary needs, appliance use and care, appliance FAQ, consumables meta data, and information associated with consumable, a cycle definition, cycle structure information, a paired element, source identification information, a message data payload structure, an electronic document that is human-readable, machine-readable, a communications specification/protocol, and information about a consumable.

Figure 46:
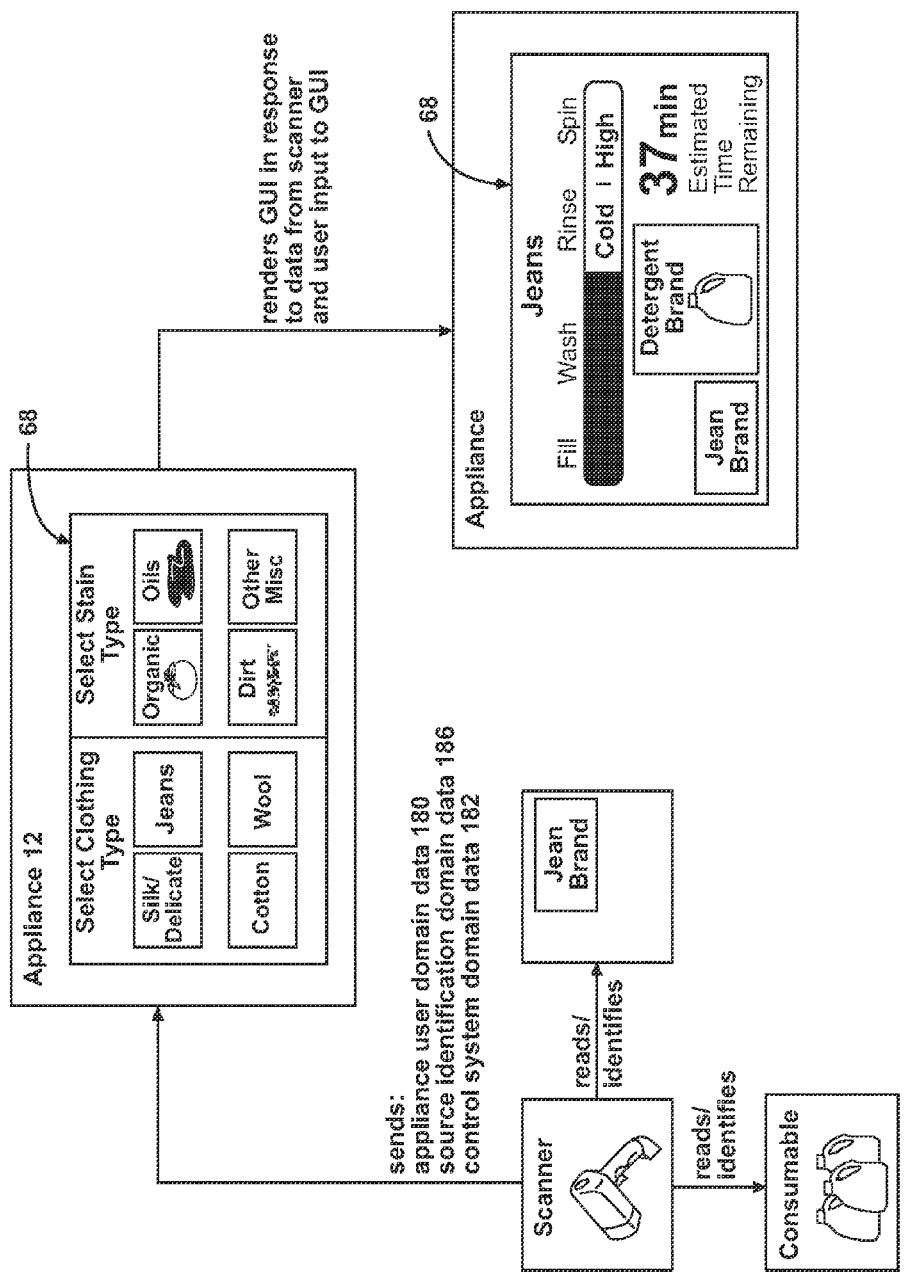
FIG. 46 is a schematic diagram showing a dynamic rendering of a graphical user interface in response an appliance receiving data from a sender according to the invention.

Content 20 can comprise various forms of data or data elements, including appliance user domain data 180 (see FIG. 24), control system domain data 182 (see FIG. 24), and source identification domain data 186 (see FIG. 46). Appliance user domain data 180 includes information related to a user's 14 use of an appliance 12. It includes such things as washing and cooking preferences, recipes, user demographics, choices and selections that user makes, and the like. Control system domain data 182 includes information related to the control and operation of an appliance. It includes such things as cycle structures, cycle definitions, message payloads, communication protocols, and the like. Source identification domain data 186 includes information related to the sources of goods and services and includes things such as trademarks, brand names, service marks, jingles, and the like. User interface domain data includes information related to interacting with a user interface 64, which is preferably a graphical user interface 68. It includes such things as widgets, animation definitions, buttons, bars, sliders, knobs, and the like, whether real or virtual.

A content target 22 comprises any entity that receives content 20. Non-limiting examples of different content targets 22 include the toolkit 10, the appliance 12, the communications network 18, a system configurator 28, editors 30 and 32, converters 34, viewers 38, an appliance control system 90, a user interface 64 and graphical user interface 68, a web browser or web page, a personal computer 70, an application 50, a computer program, a handheld device, a remote client 72 such as a cell phone, a printer, and any hardware or software components or devices associated therewith or included therein.

Figure 2:
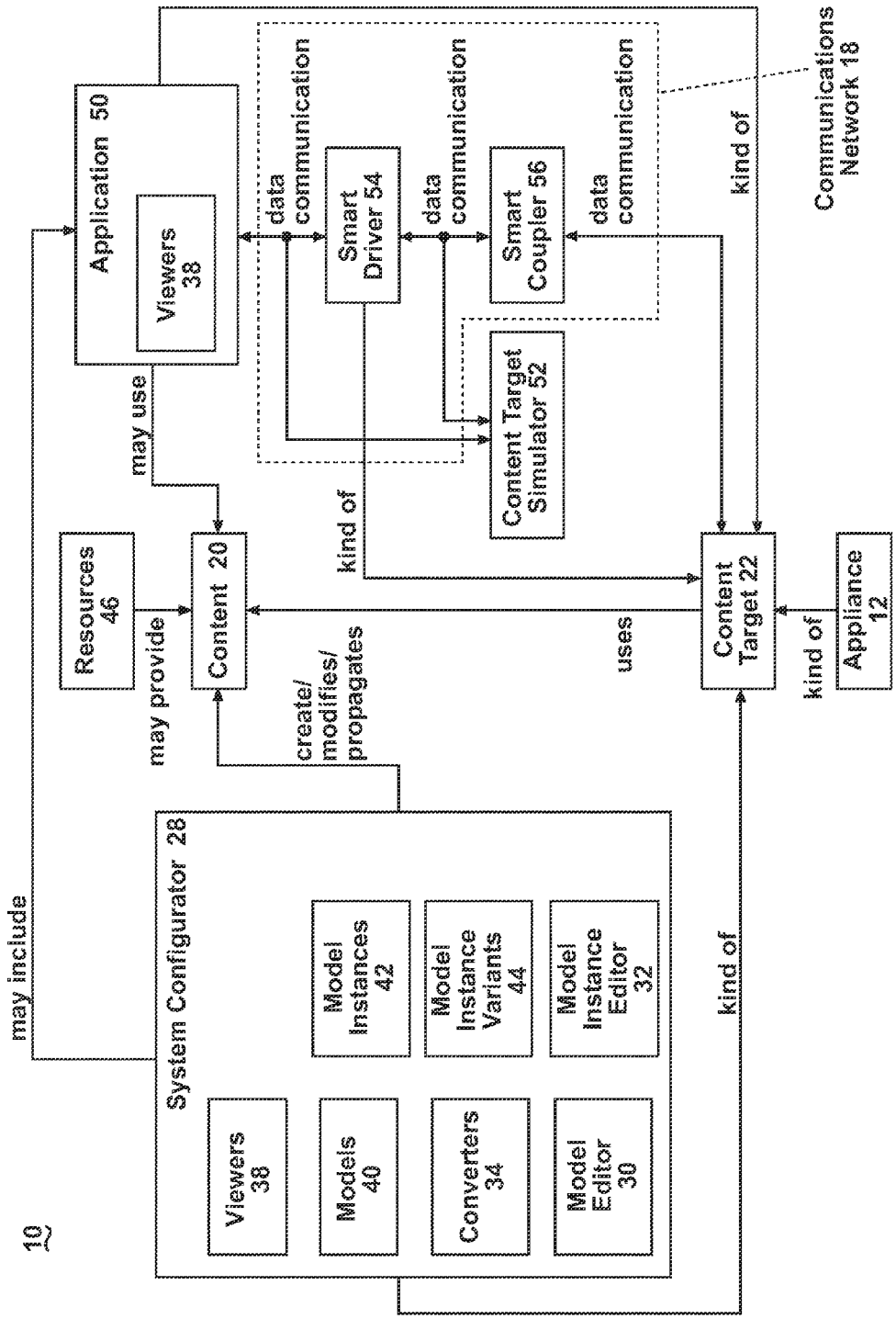
FIG. 2 is a schematic diagram showing elements of an appliance development toolkit according to the invention.
Figure 3:
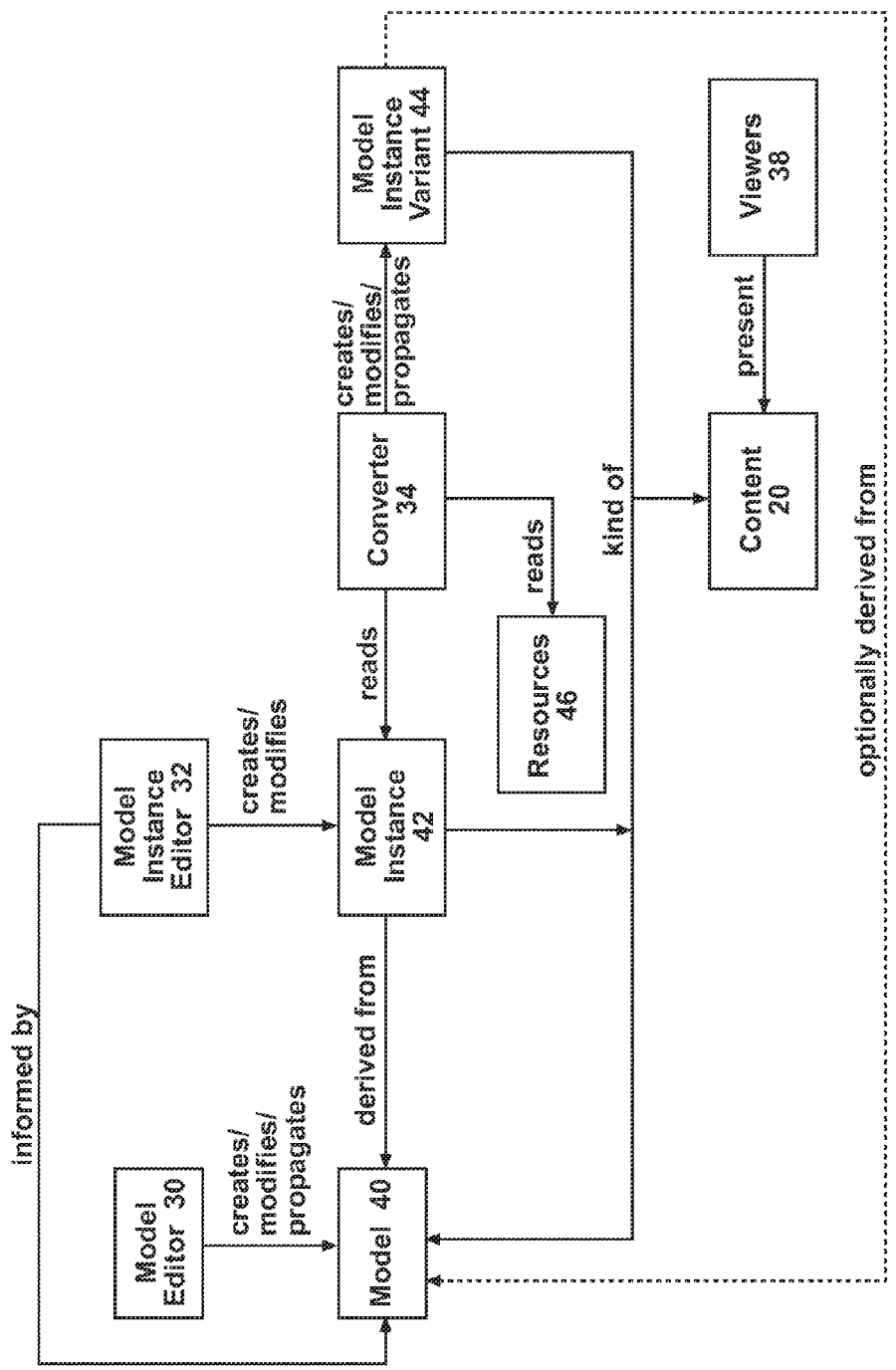
FIG. 3 is a schematic diagram showing relationships among elements of the system configurator in the appliance development toolkit of FIGS. 1 and 2.
Figure 4:
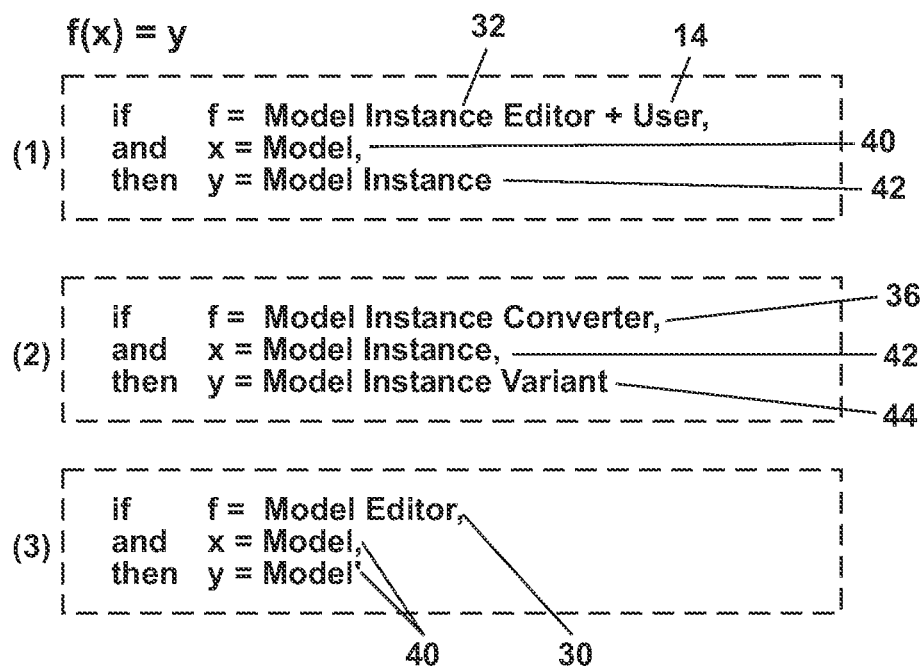
FIG. 4 is a diagram showing the functional relationship among some of the elements of FIG. 3.

As shown in FIGS. 2-4, the toolkit 10 comprises system configurator 28 having a model editor 30, a model instance editor 32, and one or more converters 34 configured to enable a user 14 to create, modify, and/or propagate content 20, such as models 40, model instances 42, and model instance variants 44, respectively. The toolkit 10 can further comprise one or more viewers 38 that function as content targets 22 and provide a visual display corresponding to the received content 20. Depending on the particular type of viewer 38 being used, viewers 38 can produce one or more of a variety of different displays or views ranging from schematic diagrams to code to images. The communications network 18 is configured to establish a communicative link between the system configurator 28 and at least one component associated with the appliance 12.

Different content targets 22 can use the same content 20 for different purposes. For example, a model instance editor 32 that receives content 20 in the form of a model instance 42 can provide a visual diagram of the model instance 42 and enable the user 14 to edit the model instance 42. However, if the same model instance 42 is sent to the appliance 12, the appliance 12 can be enabled with new operational capabilities, such as new cycles of operation. In another example shown in FIGS. 5 and 6A, the appliance 12 can receive the model instance 42 from the model instance editor 32 and provide the model instance 42 to a graphical user interface 68 of the appliance 12 in order to cause the graphical user interface 68 to display certain images and text.

Converters 34 can enable the flexible usage of content 20 by converting data elements or content 20 created by one of the editors 30, 32 into content 20 of a form suitable for use by a particular content target 22. For example, a type of converter 34 called a model instance converter is configured to produce a model instance variant 44 based on a model instance 42. Another type of converter 34 called a simple converter can simply propagate data elements or a file stored in memory and comprising data elements created by the toolkit 10 without having to substantially convert the data elements. Simple converters are best used when the content target 22 can operate directly on the data elements created by editors 30, 32, such as a content target 22 in the form of a viewer 38 included in the system configurator 28. Converters 34 are typically used to enable the transfer of data elements amongst the various entities of the toolkit 10 and appliance 12. A converter 34 can potentially also act as an exporter, which functions similarly to the propagating function described previously. The toolkit 10 can also include a converter 34 in the form of an encoder to encode content 20 onto a consumable information holder or other component.

The system configurator 28 can optionally further comprise one or more applications 50, which can also include one or more viewers 38 and can use content 20 provided by the system configurator 28. One or more applications 50 can also be communicatively coupled to but not included within the system configurator 28. Content 20 provided by the system configurator 28 can optionally be supplemented by content 20 provided by or created using resources 46, which can include any entities capable of producing content 20 or being used by another entity to generate content 20.

For testing, diagnostic, and engineering purposes, a link can be established between the system configurator 28 and a content target simulator 52 (FIG. 2). The content target simulator 52 typically comprises software and is intended to provide a realistic simulation of the operation of the appliance 12. The toolkit 10 thus comprises software configured to enable a user 14 to effectively command operation of the appliance 12 or of an appliance simulator and to create data or data elements for display to a user 14 as content 20 in a viewer 38 of the toolkit 10 based on the operation of the appliance 12. The user 14 can observe the content 20 in the viewer 38 and create or modify the content 20 using the toolkit 10 in response to communication over the communications network 18 and link.

A model 40 is a very robust, thorough, and thoroughly-vetted collection of data elements or structures equivalent to a UML class diagram. A model 40 consists of a plurality of class definitions where each class has a plurality of properties and each class can reference other classes a minimum and maximum number of times, which may be infinite. Classes can reference other classes via a named property. Classes can also, in effect, serve as extensions of other classes in order to inherit their functionalities, property definitions, and references. Classes can implement interfaces, which are definitions of collections of functions each having a set of arguments, wherein each argument can be set to one of a set of valid values. The purpose of the class definition is to provide rules or constraints for creating model instances 42 and model instance variants 44, which are, in essence, runtime instances of the model 40. Thus, the toolkit 10, in effect, enables users 14 to create runtime instances of a class diagram and is configured to create, manage, and/or edit models 40, model instances 42, and model instance variants 44, as well as data elements or information associated therewith, that are configured to effect the functionality of one or more components associated with the appliance 12.

As described in more detail hereinafter with respect to FIGS. 25 and 26, the model editor 40 is typically used by a user 14 associated with the manufacturer 14A of the toolkit 10 or of the appliance 12, such as an engineer or software developer, to refine and constrain models 40 prior to the models 40 being made available to users 14 external to the manufacturer 14A. The provides the manufacturer 14A with the ability to control the specific toolkit 10 functionalities available to users 14 outside the company, and, in doing so, provides the ability for the manufacturer 14A to offer and sell licenses for the toolkit 10 that enable users 14 access to only certain levels of functionality. Each particular model 40 in essence is a template or a plurality of constraints defining at least part of the functionality of the system configurator 28. Each model 40 enables at least one model instance editor 42 and defines the functionalities of the model instance editor 42. Thus, n models 40 can be used with the toolkit 10 to generate n instances of data elements derived therefrom. An exemplary data element can comprise at least one representation of a portion of a message data payload to be sent across the communications network 18.

The model instance editor 42 creates instances of data elements that comprise a model instance 42 and that are related to appliance 12 functionality and derived from the appliance user domain data 180 model. The model instance editor 42 is configured at least in part by the appliance user domain data 180 model irrespective of the appliance 12 so that the toolkit 10 can be used with different appliances 12. Validation rules, which essentially comprise a communications protocol, for the content 20 can be derived from the appliance user domain model. The model instance 42 can comprise a hierarchical data structure, a graph, a fault tree, or a relational database and can be configured or developed by a user 14 interacting with the user interface 64.

Figure 5:
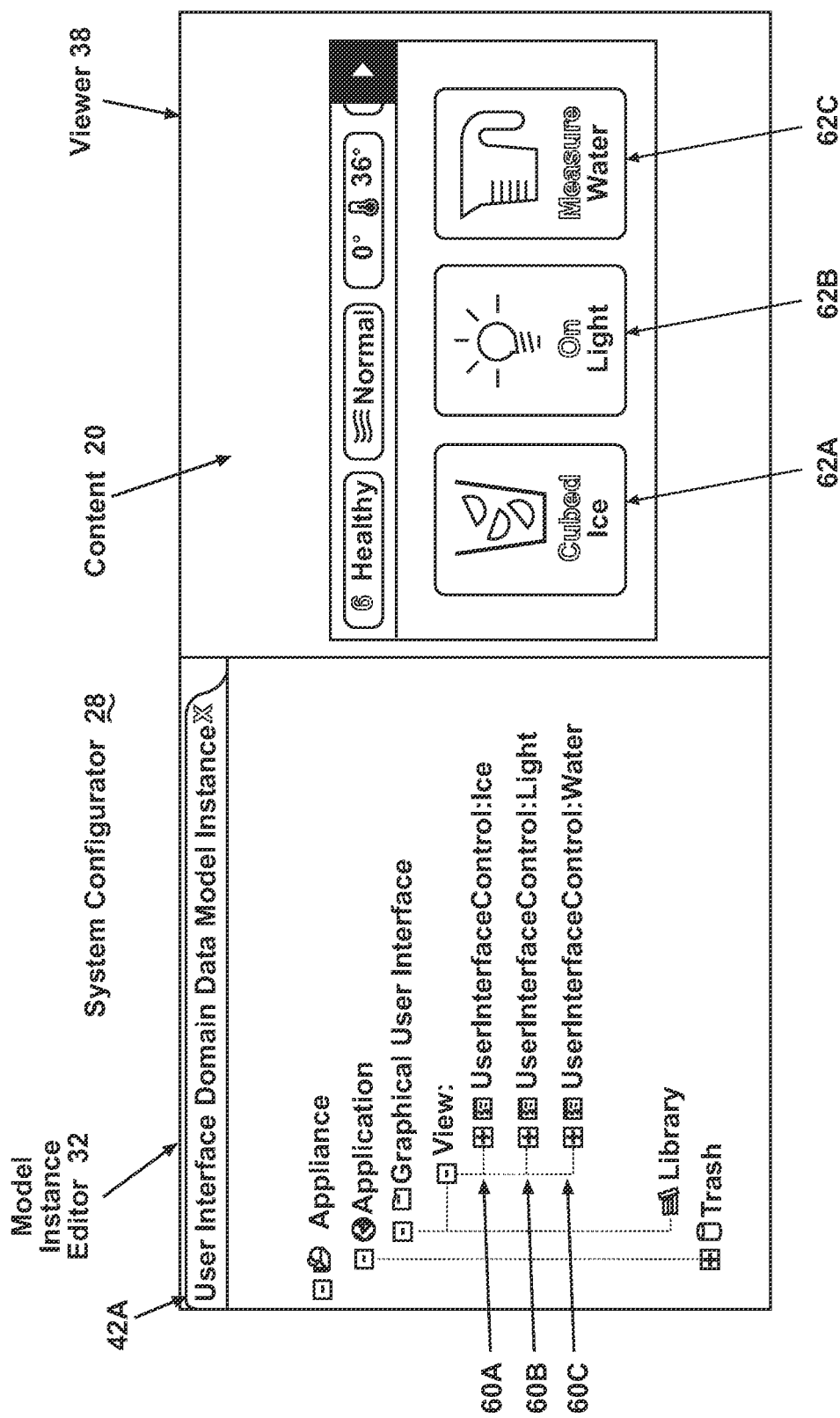
FIG. 5 is a screen shot of an editor and a content viewer of an appliance development toolkit according to the invention.
Figure 6A:
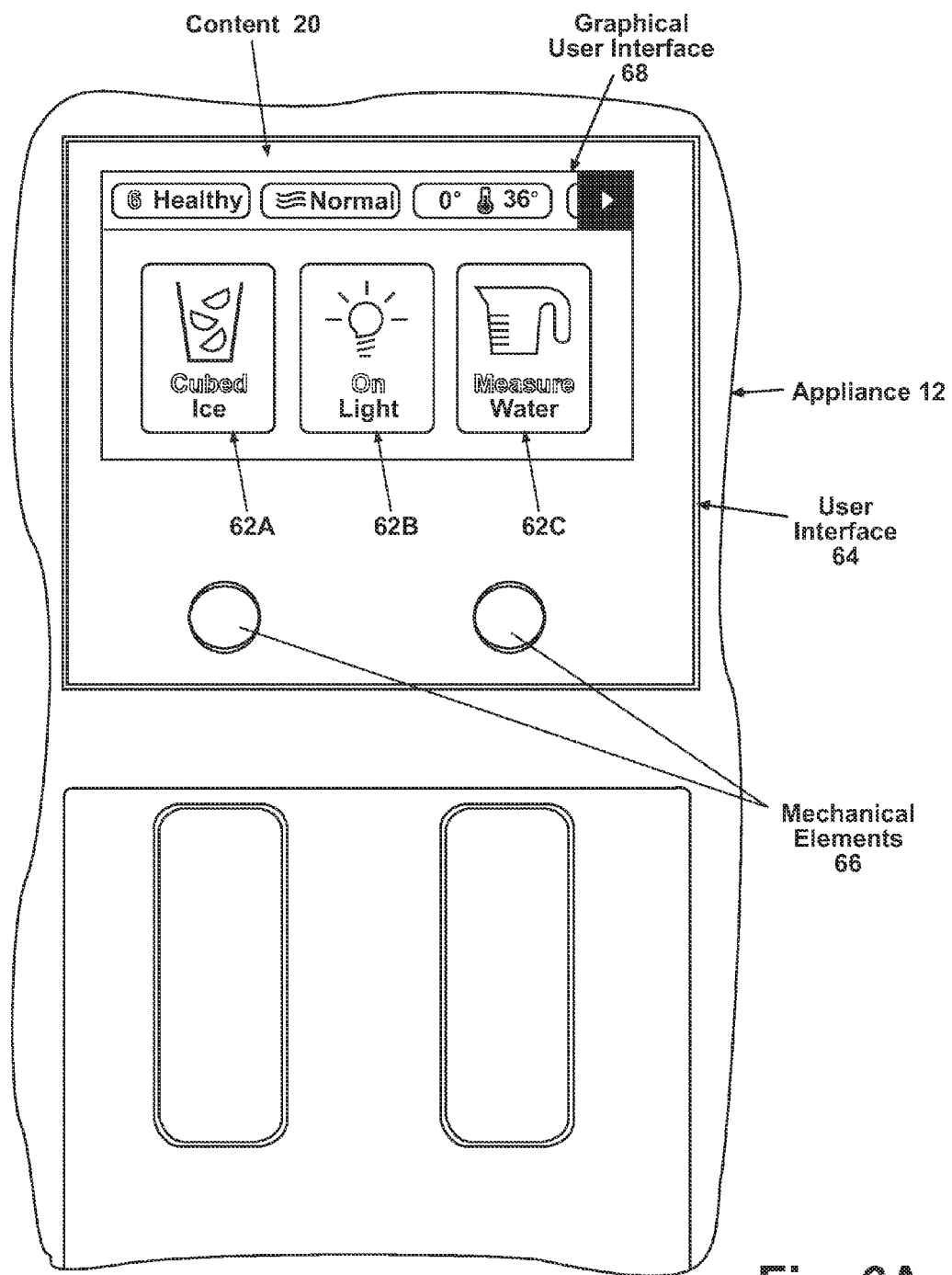
FIG. 6A shows a first embodiment of a user interface as a result of using an appliance development toolkit according to the invention.
Figure 6B:
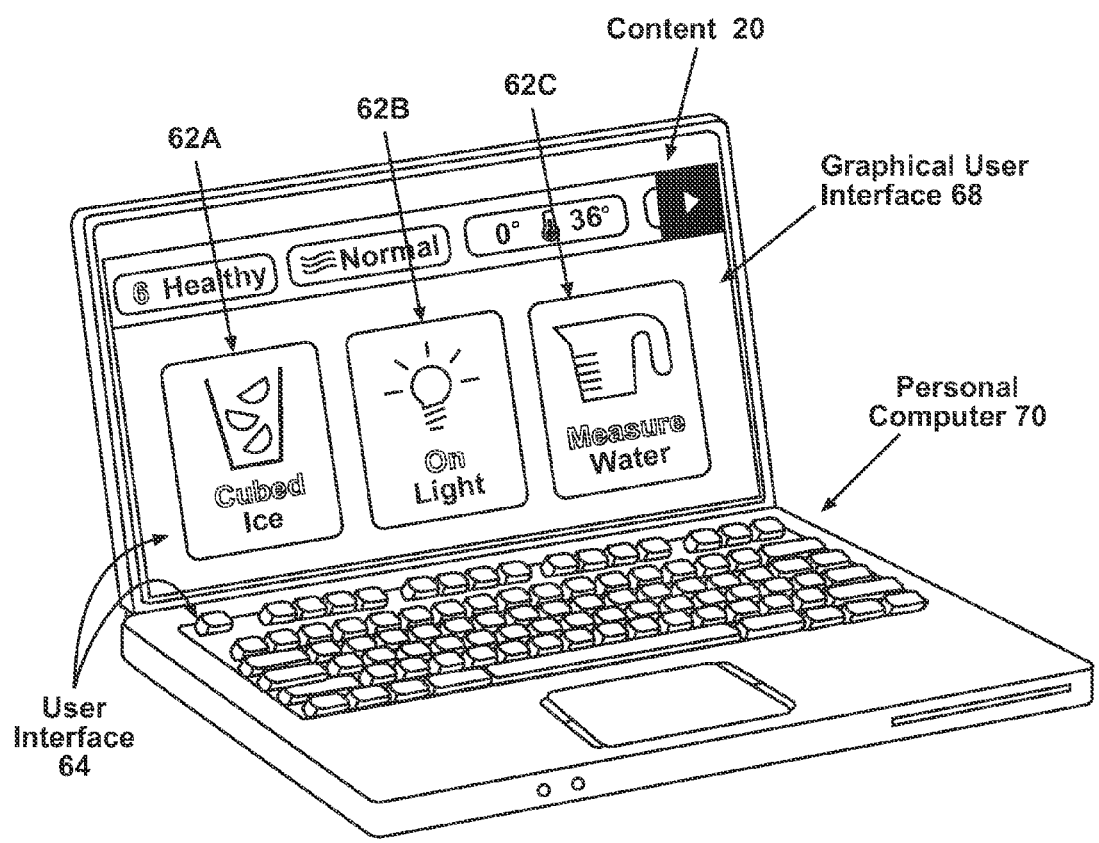
FIG. 6B shows a second embodiment of a user interface as a result of using an appliance development toolkit according to the invention.
Figure 6C:
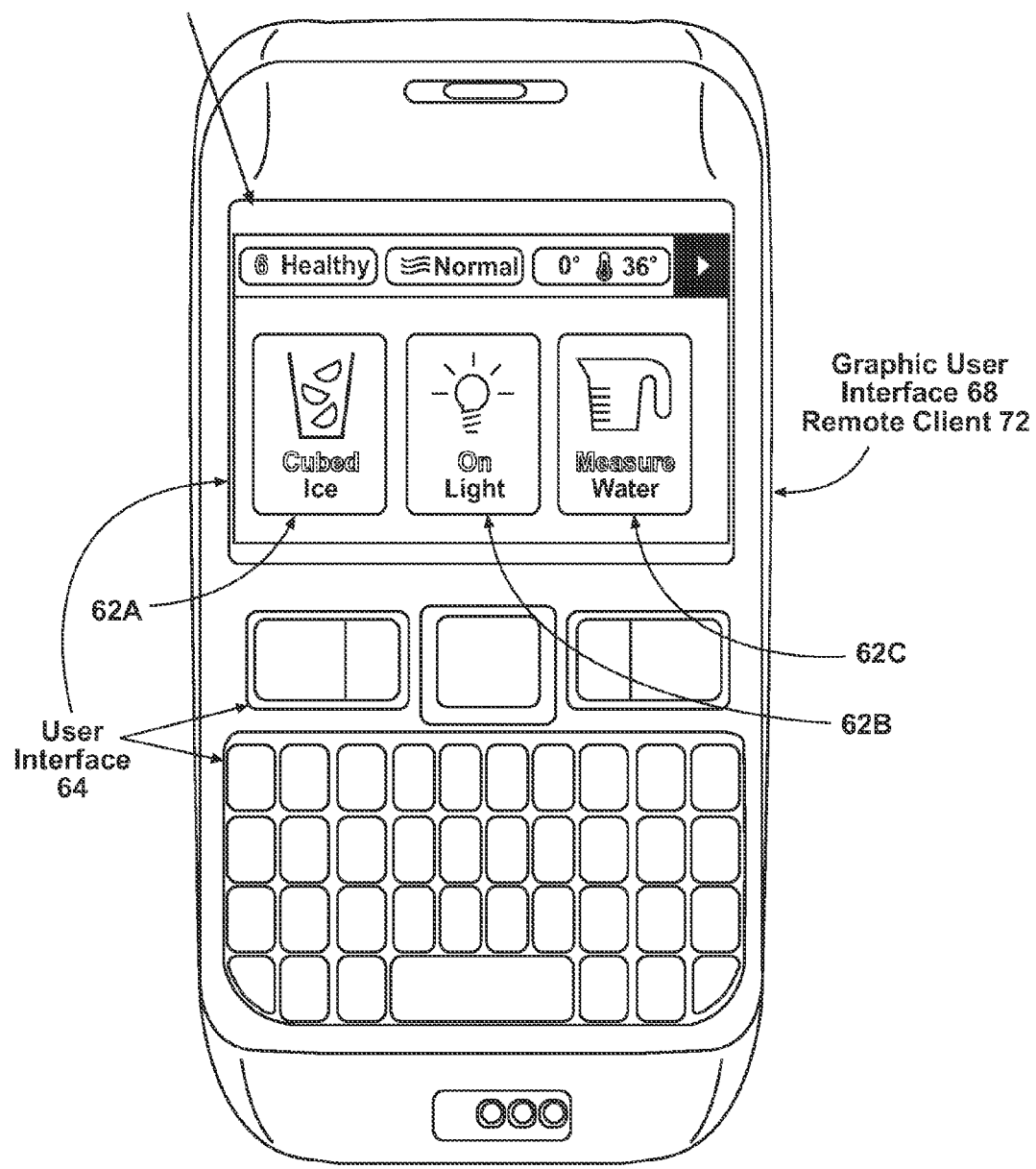
FIG. 6C shows a third embodiment of a user interface as a result of using an appliance development toolkit according to the invention.
Figure 7:
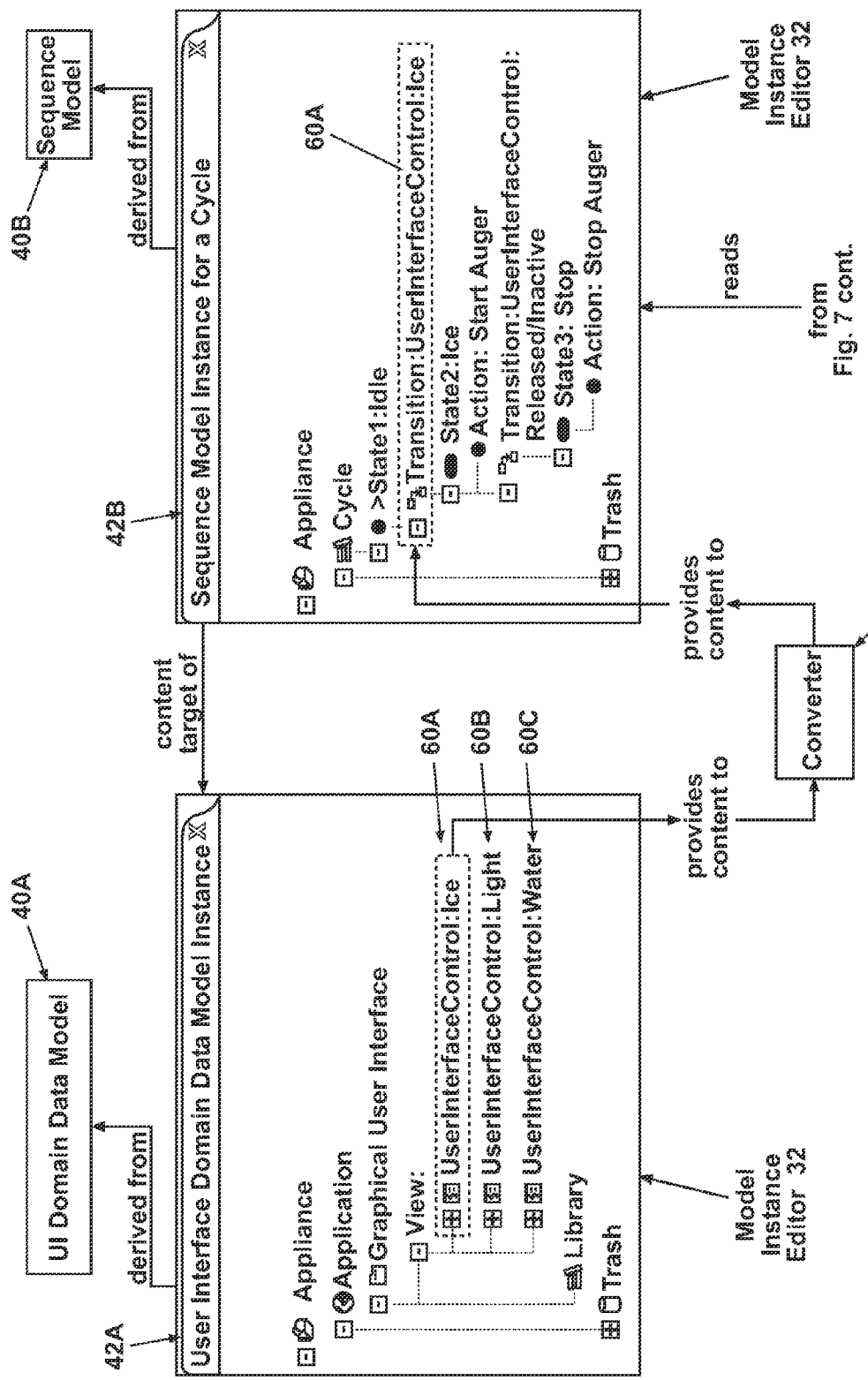
FIG. 7 is a screen shot of two editor windows in an appliance development toolkit according to the invention and a cycle structure for an appliance.
Figure 7:
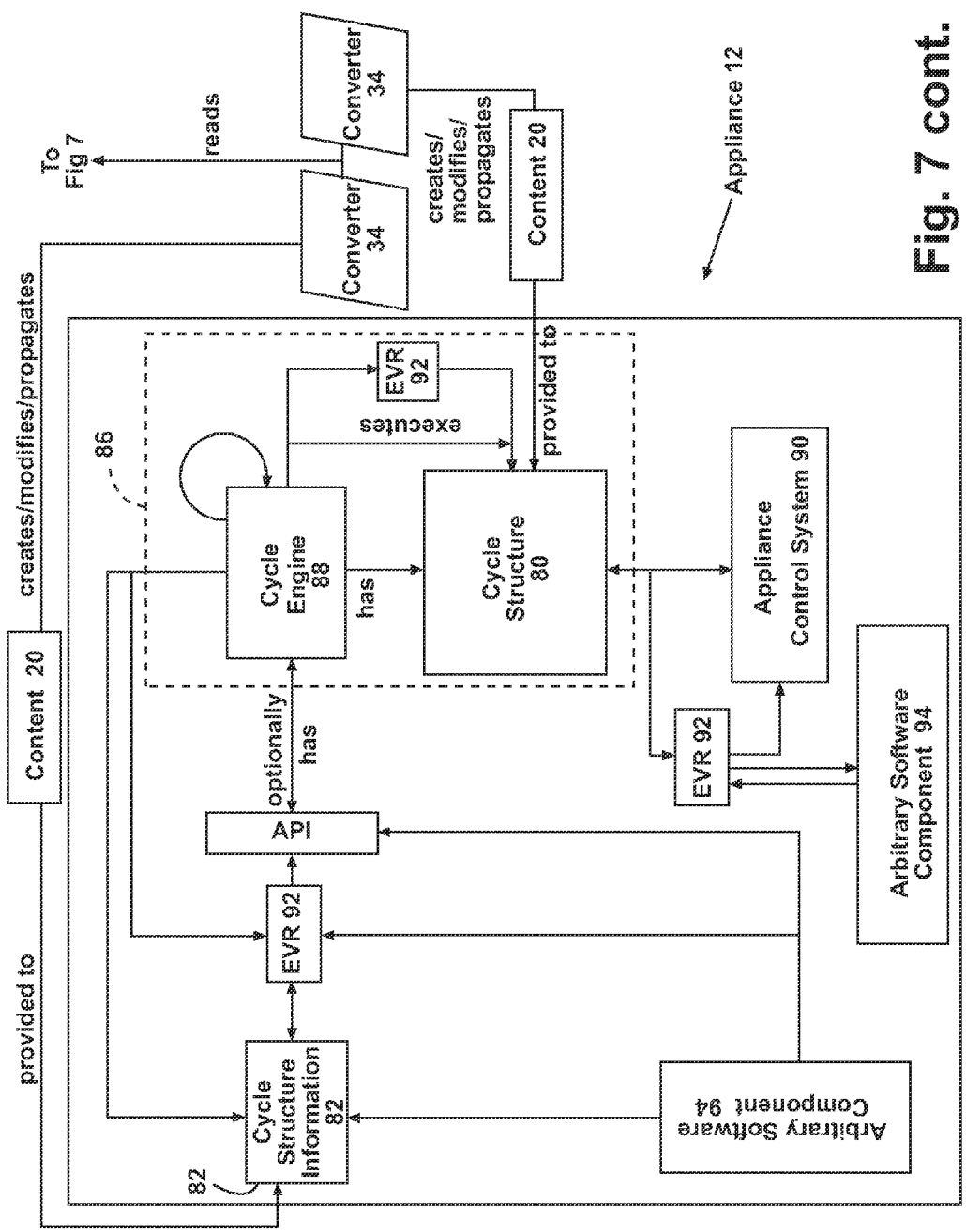

Referring now to FIGS. 5-7, models 40 can be grouped into a variety of types based on the function of the model 40 and model instances 42 created therefrom. A user interface domain data model 40A can be used to create user interface domain data model instances 42A, such as that illustrated in FIGS. 5 and 7, which are used to control the functionality of a user interface 64 of the appliance 12, which can be a graphical user interface 68. In this example, the user interface domain data model instance 42A includes user interface control objects 60A-C displayed in the model instance editor 32 and corresponding to each of three user interface controls 62A-C to be displayed on the user interface 64 of the appliance 12. The user interface control objects 60A-C are converted or propagated by a converter 34 included in the system configurator 28 into content 20, which is sent to a content target 22 of the system configurator 28, the viewer 38. Looking now to FIG. 6A, the viewer 38 then creates a rendering of the graphical user interface 68 as it would appear on the appliance 12 once the user interface domain data model instance 42A has been sent to the appliance 12 as content 20. This simulation enables the user 14 to observe and, if desired, modify the appearance of the graphical user interface 68 without having to repeatedly reprogram the appliance 12 itself. As illustrated in FIGS. 6B and 6C, the user interface domain data model instance 42A can also be sent to other content targets 22, such as a personal computer 70 or a remote client 72, as content 20 to enable the user 14 to visualize the user interface 64 and tailor the user interface 64 to his or her particular needs and tastes.

Figure 47:
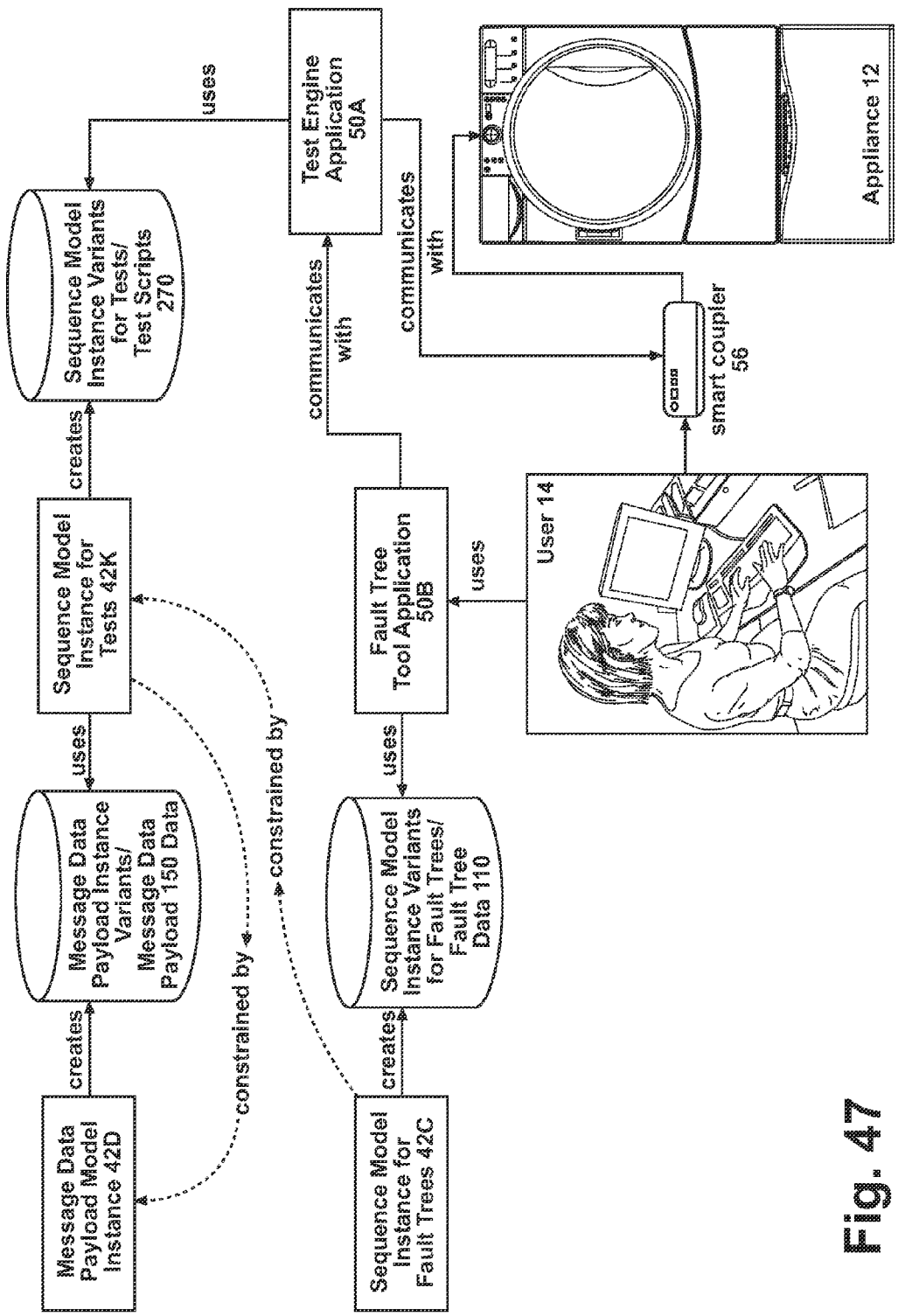
FIG. 47 is a schematic diagram showing the use of a test engine to diagnose an appliance according to the invention.

A sequence model 40B as shown in FIG. 7 is another type of model 40 that can be used to create cycles, fault trees, recipes, and tests (see also FIG. 47). As described herein, the same sequence model 40B can be used to generate a variety of different types of sequence model instances (e.g. instances for a cycle, a fault tree, a recipe, or a test). In some alternative embodiments, multiple sequence models can be required to generate the different types of sequence model instances. A sequence model instance for a cycle 42B that is derived from the sequence model 40B is illustrated as a content target 22 of the user interface domain data model instance 42A. In this example, an object 60A of the sequence model instance for a cycle 42B corresponding to a user interface control 62A for dispensing ice is propagated or, if necessary, converted by a converter 34 associated with the user interface domain data model instance 42A or sequence model instance for a cycle 42B into the appropriate format and is provided to the sequence model instance for a cycle 42B.

Due to this binding of user interface domain data of the user interface domain data model instance 42A and control system domain data 182 of the sequence model instance for a cycle 42B, when a user 14 actuates the user interface control 62A, the transition will be initiated, and the cycle specified by the sequence model instance for a cycle 42B and created in the manner explained below will be carried out to produce ice.

Objects can be composed of a plurality of other objects according to the objects field definitions. If an object comprises a method which has executable software to set the value of a field defined to hold an object, then that object can be reconfigured by changing the value of the a field from a first object to a second object. This reconfiguration can then result in a different composite or overall appliance control system 90 behavior. There are many useful purposes for an appliance control system 90 whose behavior can be changed by changing the values in a first objects field to a third object from a second object. For example, a cycle accessory could use this technique to change a cycle structure 80. Likewise, both a consumables reader and a recipe book wand could use these techniques to customize the behavior of the appliance control system 90 according to appliance user domain data 180, source identification domain data 186, user interface domain data the data about the cycle, data about a consumable, and the like.

Figure 34:
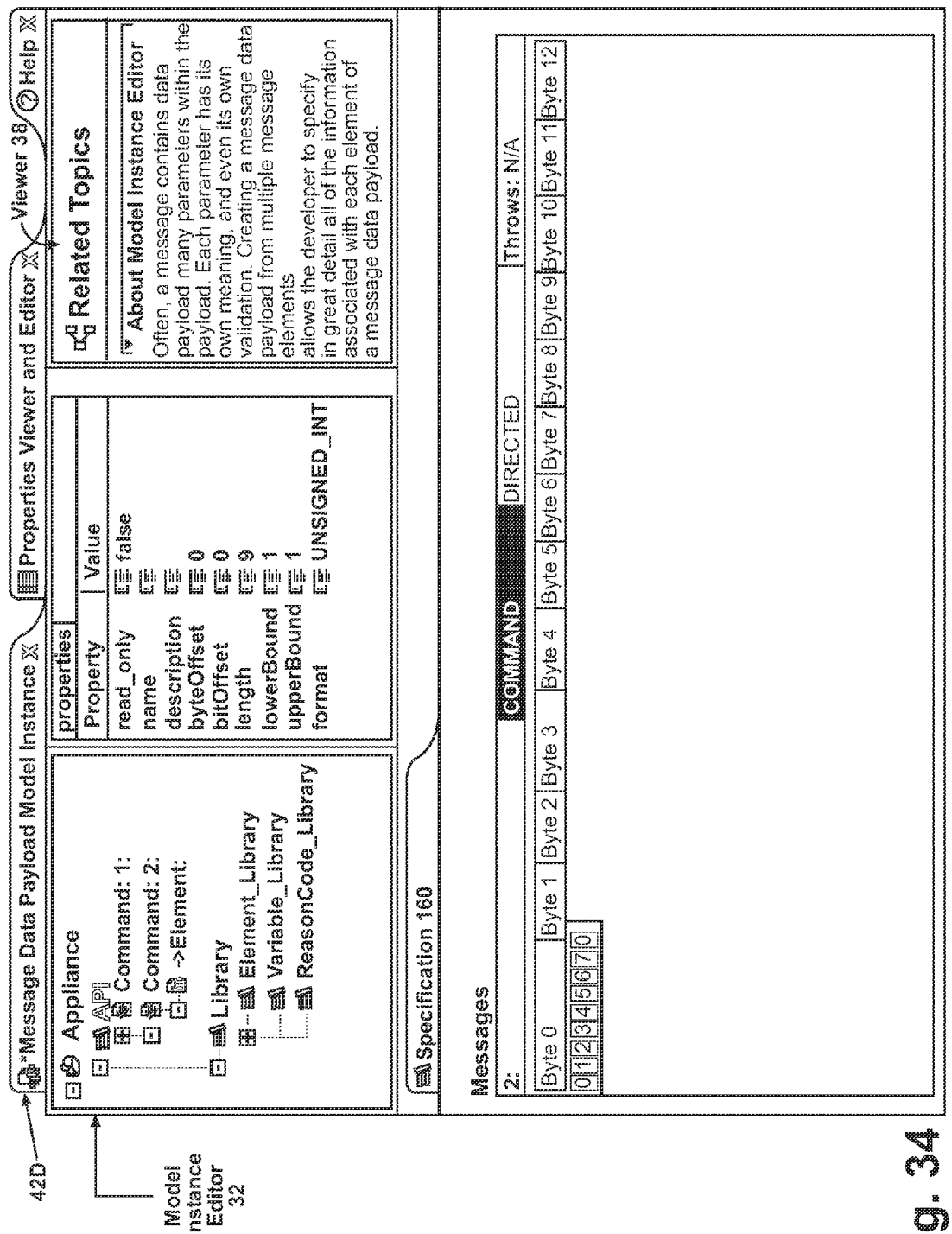
FIG. 34 is a screen shot of a model instance editor in an appliance development toolkit according to the invention with information about it.
Figure 35:
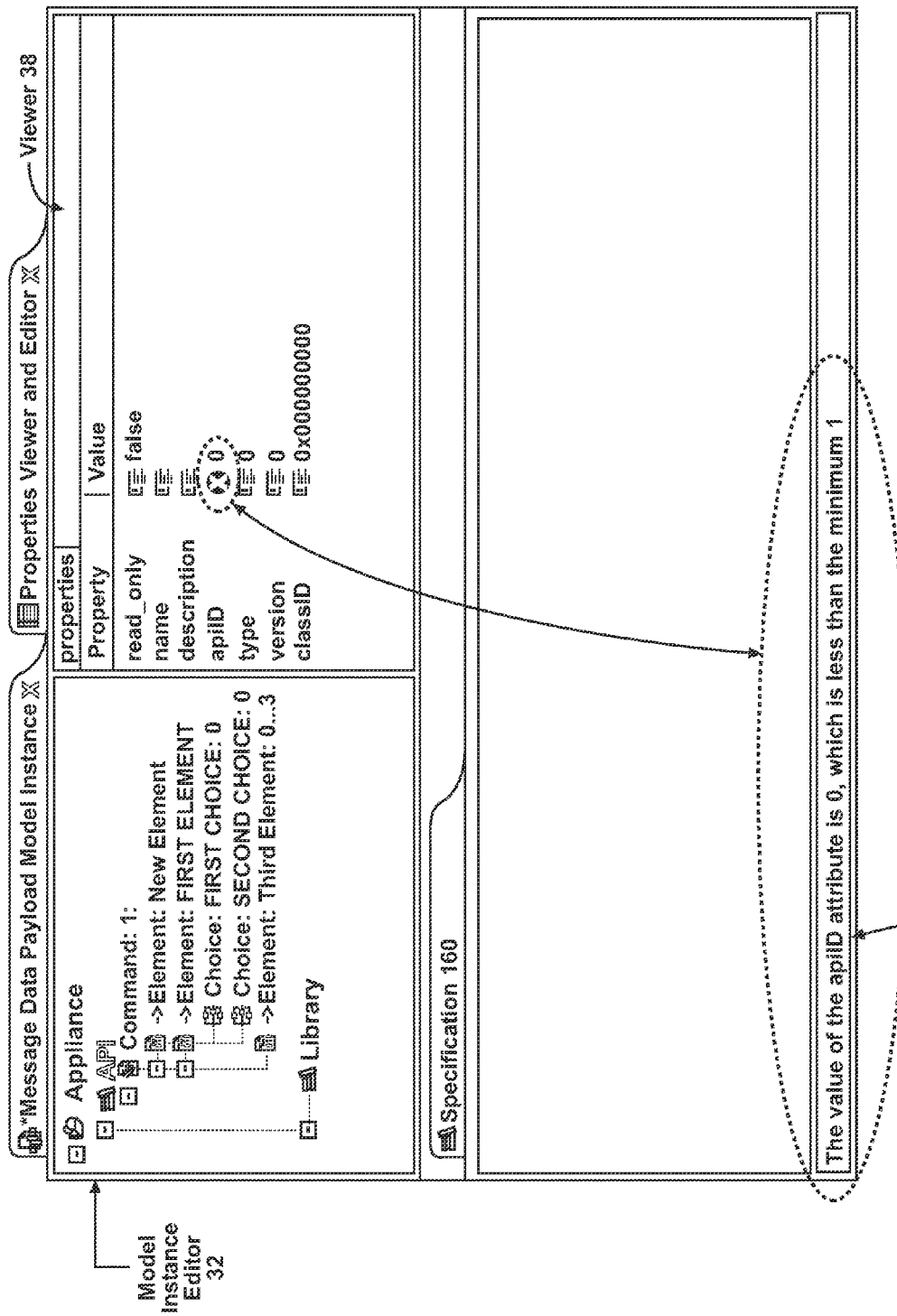
FIG. 35 is a screen shot of a model instance editor in an appliance development toolkit according to the invention showing a step in the creation of a message data payload using holders.
Figure 36:
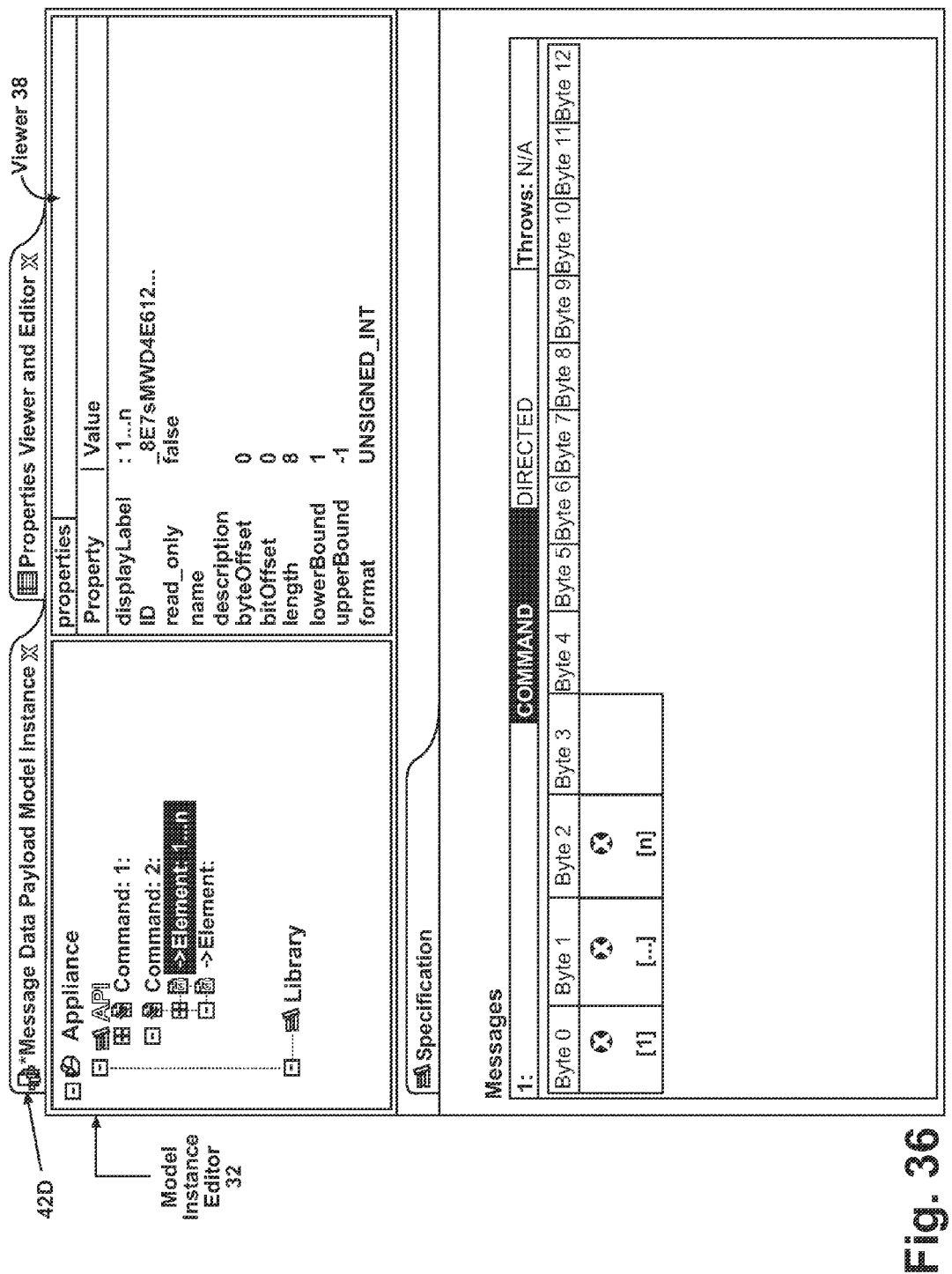
FIG. 36 is a screen shot of a model instance editor in an appliance development toolkit according to the invention showing another step in the creation of a message data payload using holders.

There are many mechanisms which can initiate and manage the dynamic configuration of an appliance control system 90. However, these mechanisms (see FIG. 34) will need a common design framework with which to accomplish the dynamic configuration. Some portions of the dynamic configuration can be accomplished during the compile process, while other portions may be accomplished at post-compile time (also known as runtime).

Figure 9:
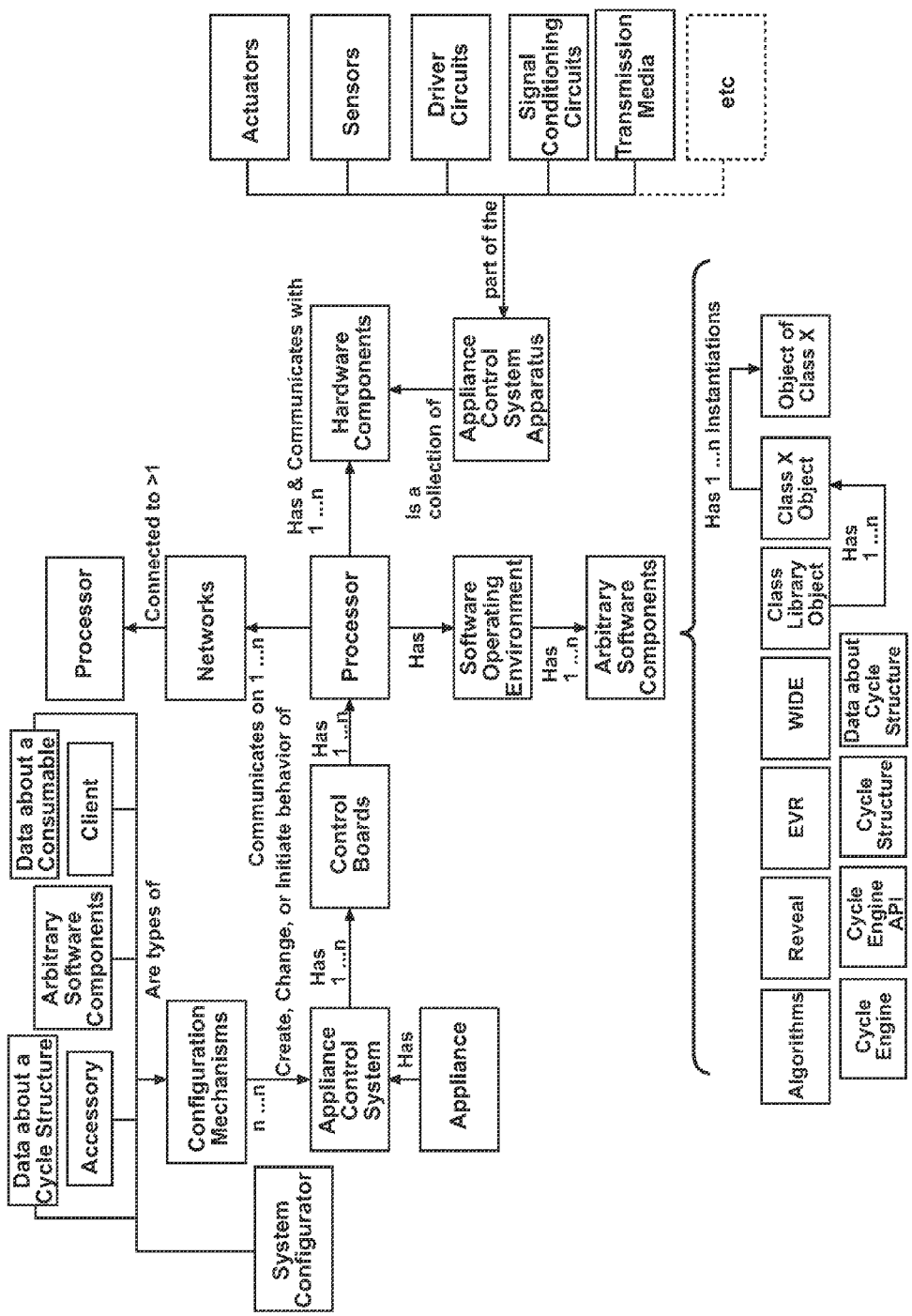
FIG. 9 is a schematic diagram showing the relationships of the control structure of an appliance to the system configurator of FIG. 8.

FIG. 7 illustrates several ways that the appliance 12 can obtain information necessary to carry out appliance 12 operation, including information about cycles of operation, and generate a cycle structure to perform a cycle of operation. Here, cycle structure information 82 represents information about or associated with a cycle structure 80 to be produced by the cycle engine 88. Cycle structure information 82 can include modifications to be made to an existing cycle structure 80, information to be used to create a new cycle structure 80, or a cycle structure requiring conversion or some sort of manipulation into a cycle structure 80 suitable for use with the particular appliance 12. Cycle structure 80 represents a set of instructions for use by the appliance control system 90 of the appliance 12 for carrying out a cycle of operation. An exemplary appliance control system 90 is illustrated in FIG. 9 and is described in detail by International Patent Application Publication No. 2006/135758, which is incorporated by reference herein in its entirety. In one embodiment, the cycle structure 80 can be created by using messaging for communicating the cycle structure information 82 to the cycle architecture 86 via the communications network 18, at which point the cycle engine 88 can discover information for creating or modifying cycle structure 80 for use by the appliance control system 90. The cycle engine 88 then proceeds to build a new or modified functional cycle structure 80. Optionally all messages can be routed through an embedded virtual router (EVR) 92, which results in the cycle engine 88 using its own configuration API for building the new or modified cycle structure 80. The execution by the cycle engine 88 to create or modify the cycle structure 80 can also be accomplished through the EVR 92.

An arbitrary software component 94 in communication with the cycle engine 88 or in communication with the cycle architecture 86 can also be used to create a new or modified cycle structure 80. The arbitrary software component 94 can reside in a variety of locations with respect to a controller component comprising the cycle architecture 86. Hence, all messages between the arbitrary software component 94 and the cycle architecture 86 can be optionally routed through an EVR 92 across the communications network 18. As well, the cycle architecture 86 can optionally communicate with the appliance control system 90 through an EVR 92.

In another scenario, an operational cycle accessory, such as the toolkit 10, can be communicatively coupled to the communications network 18, discover the cycle architecture 86, and send the cycle architecture 86 messages to affect its structure and, ultimately, its execution. In this case, the operational cycle accessory would typically include a combination of software and data to accomplish the configuration of the cycle architecture 86. Alternately, the aforementioned cycle architecture might send a discovery message seeking identification of all sources of the cycle structure 80. Sources of the cycle structure may be in ROM, Flash, EE Prom, an operational cycle component, and/or an external source connected to the communications network 18. Once the cycle structure information 82 located and retrieved, the cycle engine 88 can commence modifying its own cycle structures 80 according to the new cycle structure data. As shown in FIG. 7, when the converters 34 associated with the cycle structure information 82 and the cycle structure 80, read the sequence model instance for a cycle 42B, the converter 34 associated with the cycle structure information converts the sequence model instance for a cycle 42B into cycle structure information 82, and the converter 34 associated with the cycle structure converts the sequence model instance for a cycle 42B directly into a cycle structure 80. Both the cycle structure information 82 and the cycle structure 80 generated by the associated converters 34 are generated based on the same content 20 comprising the sequence model instance for a cycle 42B.

In another embodiment of a cycle architecture 86, a first portion of the cycle structure information 82 is compiled and a second portion is made available at runtime. The second portion can include a plurality of cycle structure data, either in direct or indirect form, which can be combined with the first portion such that the cycle engine 88 operates on the aggregate of the first and second portions to create operational cycle execution software. The second portion can represent differences in the first portion where differences may be additions, deletions, or modifications to elements, their relative orders, or their relative relationships within the cycle structure 80. The cycle engine 88 can appropriately apply the differences represented in the second portion by looking at the identifiers of the elements of the first portion of the cycle structure information 82 and the identifiers of the elements of the second portion of the cycle structure information 82. The advantage of this embodiment of a cycle architecture 86 is that changes to the aggregate cycle structure 80 can be made while preserving the first portion such that subsequent corruption or absence of the second portion would not effect the integrity of the first portion, thus enabling the operation cycle execution software to revert to compiled default state, such as might be supplied at the factory. A second advantage of this embodiment is that specialized variants of the first portion can be designed which can accommodate the constraints presented by the appliance control system 90 and more specifically the controlling components of the appliance 12 such as limited memory and also provide capability for receiving and adapting to a second portion, providing flexibility and configurability within the constraints for the cost of the specialized variants. For appliances 12, this can be an important requirement in some cases.

Alternatively, when an operation cycle accessory is disconnected from the cycle engine 88, the data of the second portion can be optionally removed by the cycle engine 88, causing a reversion to the factory default state. This is a form of anti-piracy protection in that the operation cycle accessory must be present for the additional functionality represented by the accessory to be available to the appliance 12. Optionally, the connection between the appliance 12 and the operation cycle accessory can include a transfer of the first portion into a memory in the appliance 12. In this case, additional operation cycles can be retained without the permanent presence of the operational cycle accessory. It should also be noted that an operation cycle accessory can be virtual in that the software and data and ability to communicate with the cycle engine 88 can reside on an external device connected to the cycle engine 88 via communications network 18, and not physically attached to the containing appliance 12.

It is to be noted that an operational cycle component can have other elements that are not the aforementioned operation cycles or constituent data and complied portions. For example, the operational cycle component can include software code to configure a cycle engine 88 for communication and other functions or code to put software architecture into an alternate mode for the purpose of diagnostics or changing memory.

An appliance cycle of operation performed by the appliance control system 90 can be optimized by information associated with consumables on which the appliance is operating. For example, the cycle structure 80 could be built specifically to accommodate some properties or attributes of the consumable or to accommodate some properties or attributes of a consumable holder. The body or bodies that comprise information, identifiers of functionalities, properties, attributes, and property and attribute values related to consumables can be referred to as sources of information about a consumable or "consumable information holders." Examples of consumable information holders include the consumable itself, a data pod, the consumable holder, a user interface, and a tag. The consumable holder can be a sensing consumable holder that might use a lid sensor, for example, for sensing attributes about the consumable contained therein. These attributes could then be used by the appliance 12 to further refine operation of the consumable holder. For example, if a particular consumable holder is supposed to dispense 2 ounces, a lid with an amount sensor could be configured with an analog circuit coupled to the appliance 12 to provide a level or volume feedback so that the appliance 12 can dispense exactly 2 ounces rather than a time-based approximation.

Information associated with a consumable can include amount and/or composition or other attributes that would characterize the magnitude of the usefulness of the consumable. In this case, the cycle architecture 86 may adapt itself based on the information. For example, if the consumable were a dishwashing rinse aid and the consumable holder had only 90% of the standard dose, the cycle architecture 86 might adapt itself to this condition by increasing the time of the rinse phase to compensate for the lack of rinse aid. Information associated with a consumable can also include parameters of an operating cycle such as personal preferences of a user 14 (e.g., doneness or crispiness preferences), and data about the consumable holder, the appliance 12, or other accessories or components thereof.

In a laundry example, the appliance control system 90 may provide information to the cycle architecture 86 about process variables like soil level, load size, soil type, etc. Based on this information associated with a consumable, including the process variable information, the cycle architecture 86 or an arbitrary software component 94 in conjunction with a cycle engine 88 can reconfigure the cycle structure 80 to adapt to the process variable information. The consumable holder may comprise the arbitrary software component 94 and be able to reconfigure the cycle structure 80 to adapt to the process variable information. Reconfiguration can be accomplished in at least two ways. In one way, the arbitrary software component 94 can read the cycle structure 80 and communicate with the cycle engine 88. In a second way, an arbitrary software component 94 can be preconfigured and communicate that configuration to or instruct the cycle engine 88 about the configuration.

One example of commands associated with an operating cycle is a collection of key value pairs. Keys comprise parameter names having a meaning, wherein the meaning is known by the cycle engine 88 such that values associated with the keys are thereby associated with the meanings. This enables the values to be used in the contexts of the meanings to modify and/or control the cycle of operation of the appliance 12.

Another example of commands associated with an operating cycle is a byte array representing a message packet for a network. In one embodiment of this example, the byte array could be arranged according to the packet definition disclosed in WO2006135726 comprising a functional identifier, an op code, and a message data payload, wherein the identifier and op code relate to an executable function or method implemented by the cycle engine 88 and or cycle engine API. Further, the arguments or parameters of the function or method correspond to the data elements contained in the payload of the message packet.

The consumable holder, therefore, can contain all the functionality of and participate in all the embodiments that an operational cycle accessory in communication with an appliance 12 having a cycle architecture 86 can. Therefore in one embodiment, a consumable holder is an operation cycle accessory that further physically contains and can also further be enabled to directly actuate the introduction of a consumable into an appliance 12.

Figure 8:
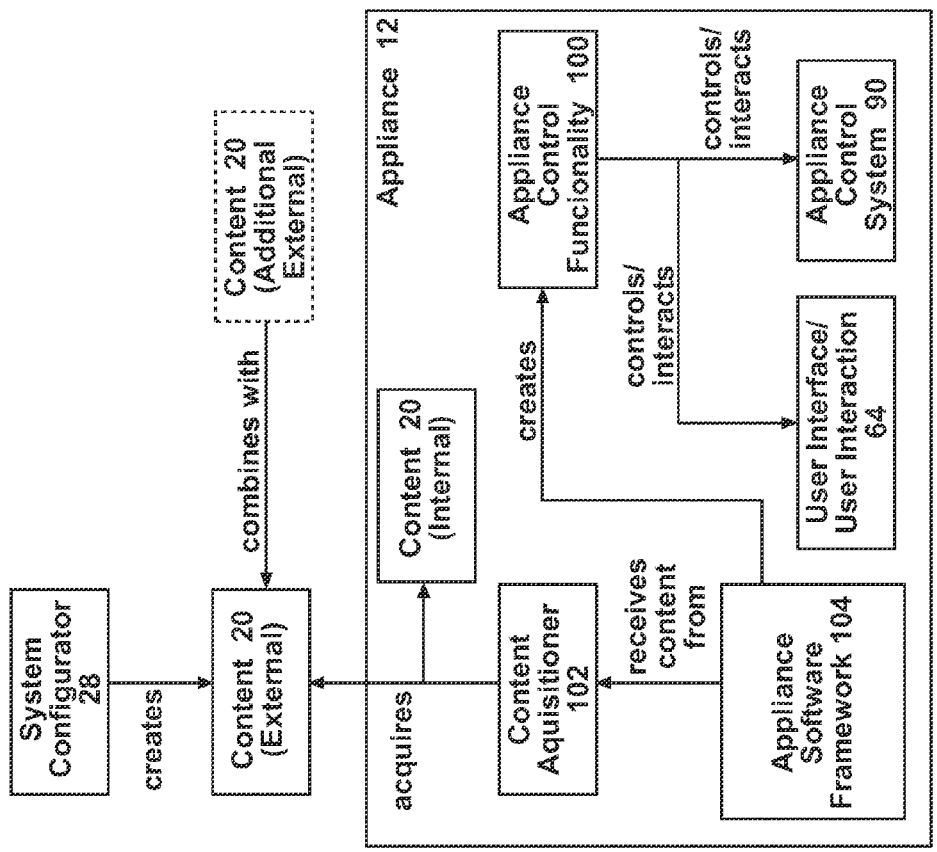
FIG. 8 is a schematic diagram showing the flow of information between an appliance and the system configurator in an appliance development toolkit according to the invention.

As seen in FIG. 8, content 20 can be derived from or provided by components or resources 46 outside the appliance 12 (external content 20) or from memory or other information contained within the appliance 12 (internal content 20) and acquired by a content 20 acquisitioner 102. Appliance software framework 104, which includes the cycle architecture 86 of FIG. 7, receives the content 20 and creates appliance control functionality 100. The appliance control functionality 100 provides and controls the user interface 64 and user interaction, as well as provides and controls the appliance control system 90. As an example, FIG. 9 also illustrates the appliance control system 90 disclosed in International Patent Application Publication No. 2006/135758 and further includes the system configurator 28 for managing the functionality thereof.

As shown in FIGS. 10-15, sequence model 40B can also be used to generate a sequence model instance for a fault tree 42C. Appliances 12 are often diagnosed and serviced using an appliance fault tree 110, and the sequence model instance for a fault tree 42C serves to present a user 14 with various displays or views on the user interface 64 informing the user 14 of possible problems and solutions associated with the appliance 12. The initial step of an appliance fault tree 110 will normally be associated with a symptom of failure or state of the appliance 12.

With continued reference to FIGS. 10-15, the exemplary initial step is performed upon determination of a state of the appliance 12 in which the user 14 is experiencing slow or no water dispensing. Each step of the appliance fault tree 110 including the initial step can have one or more associated actions. Actions can be various tasks or checks performed at each step. Exemplary actions can comprise, but are not limited to, taking a measurement, asking a question, requesting user input, describing an observation, and the like. The exemplary action associated with the initial step is to ask a question, "Is the refrigerator connected to a water supply?" The action can also comprise obtaining the answer, which can be "Yes" or "No."

Figure 11:
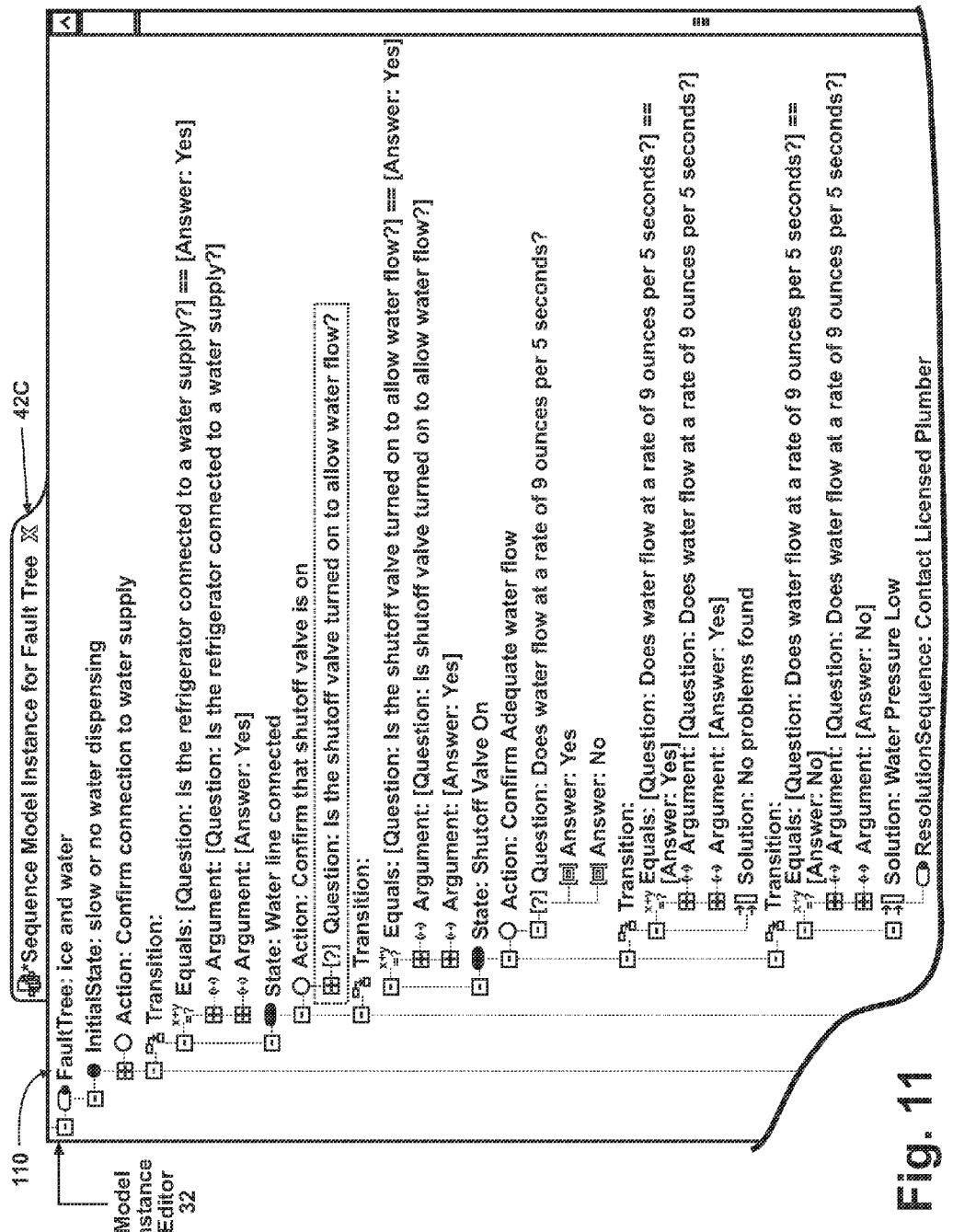
FIG. 11 is a screen shot of an editor in an appliance development toolkit according to the invention with a sequence model instance for a fault tree being created.
Figure 11A:
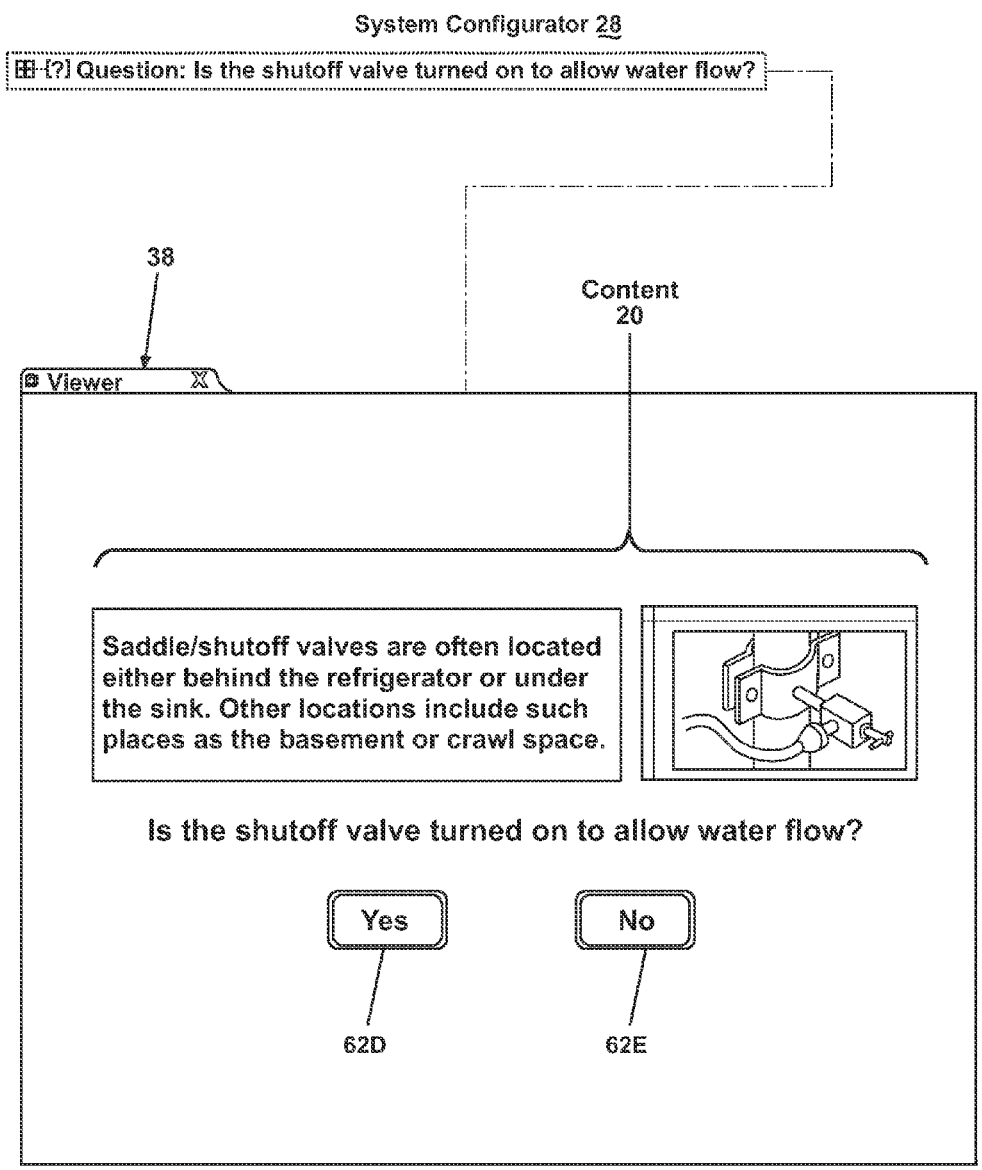
FIG. 11A is a screen shot of a viewer in an appliance development toolkit according to the invention showing how the content resulting from the editor will appear.
Figure 12:
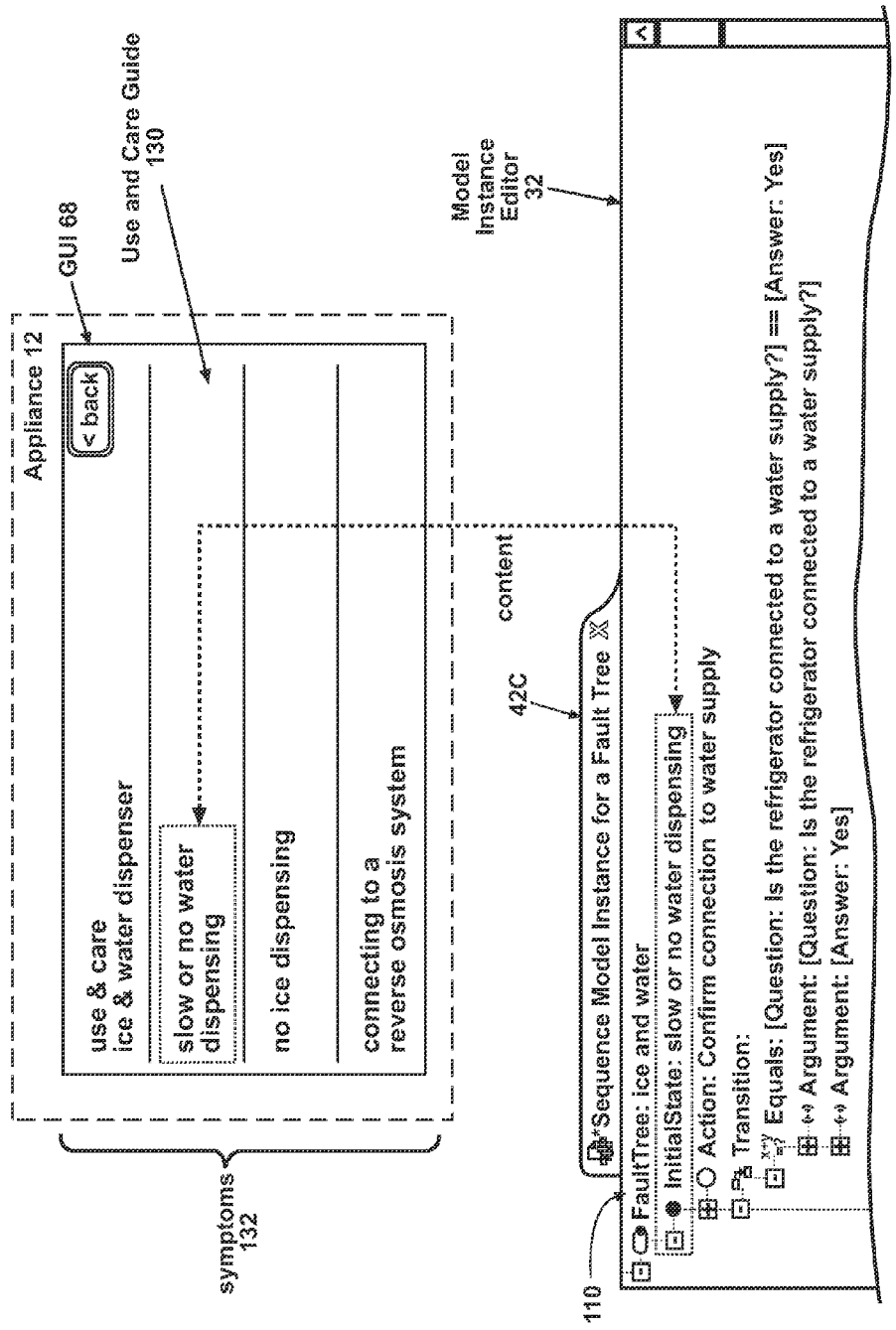
FIG. 12 is a screen shot of the editor of FIGS. 10 and 11, and a screen shot of a graphical user interface in an appliance displaying a portion of the content from the editor.
Figure 13A:
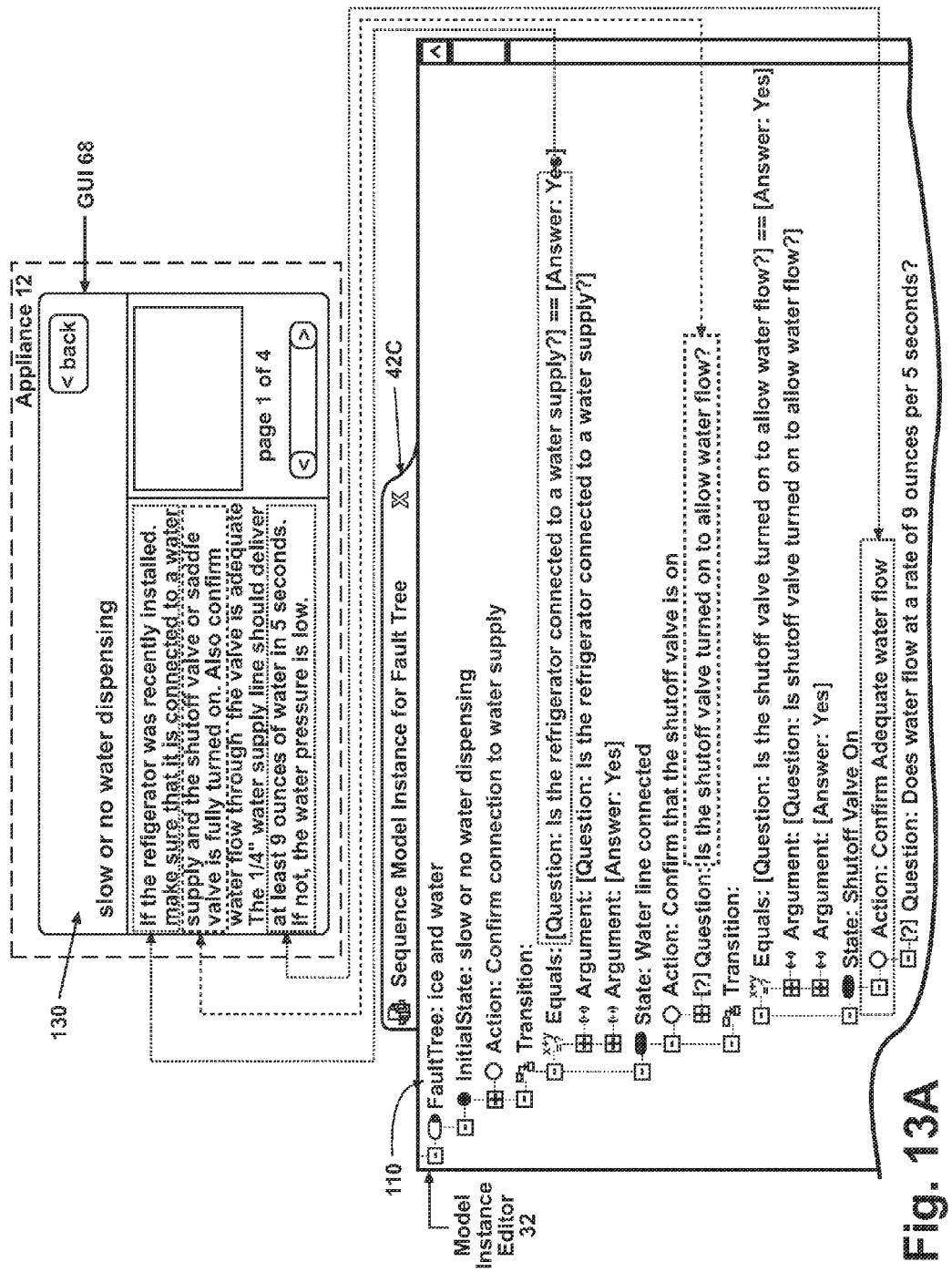
FIG. 13A is a screen shot of the editor of FIGS. 10 and 11, and a screen shot of a graphical user interface in an appliance displaying another portion of the content from the editor in a query.
Figure 13B:
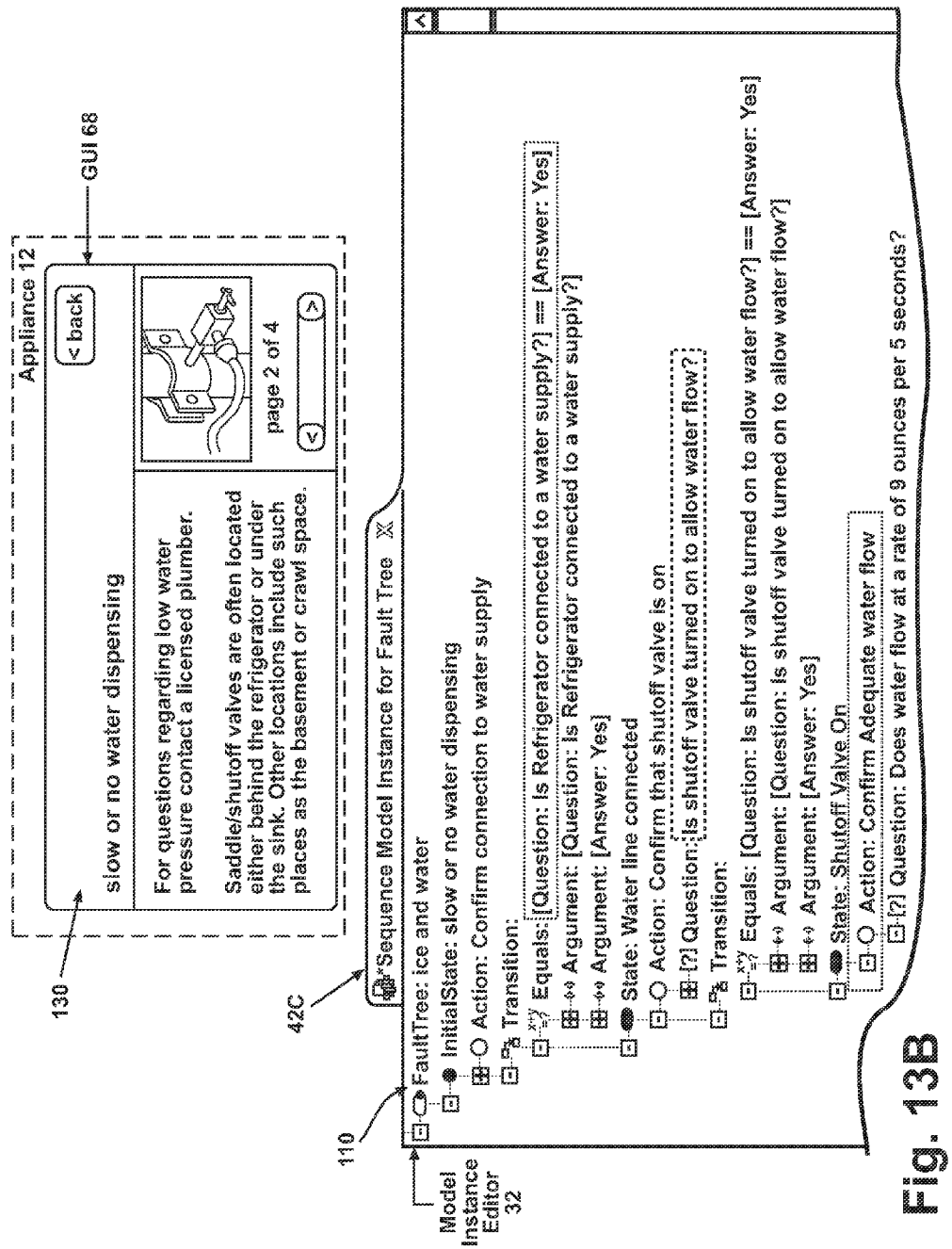
FIG. 13B is a screen shot of the editor of FIGS. 10 and 11, and a screen shot of a graphical user interface in an appliance displaying related portion of the content from the editor responsive to the query of FIG. 13A.

Transitions are paths to other steps in the fault tree 110 and that are normally conditional on the result of a given step or action. At each step of the sequence model instance for a fault tree 42C, an action can be performed comprising asking a question regarding operation of the appliance 12, and the question can be presented on the user interface 64. Once an answer to the question has been obtained, the sequence model instance for a fault tree 42C will perform a transition to another step in the appliance fault tree 110. As shown in FIG. 11A, each question will also have corresponding content 20 that is displayed on the user interface 64. Typically, question-based content 20 will include buttons or other user interface controls 62D, 62E that will enable the user 14 to input an answer to the question. Alternatively, the appliance 12 can automatically determine the answer to the question using various components, such as sensors. Thus, an answer can be obtained either via user interaction with the appliance 12 via the user interface controls 62, or an associated device, or automatically by the components of the appliance 12 or an associated device.

Figure 10:
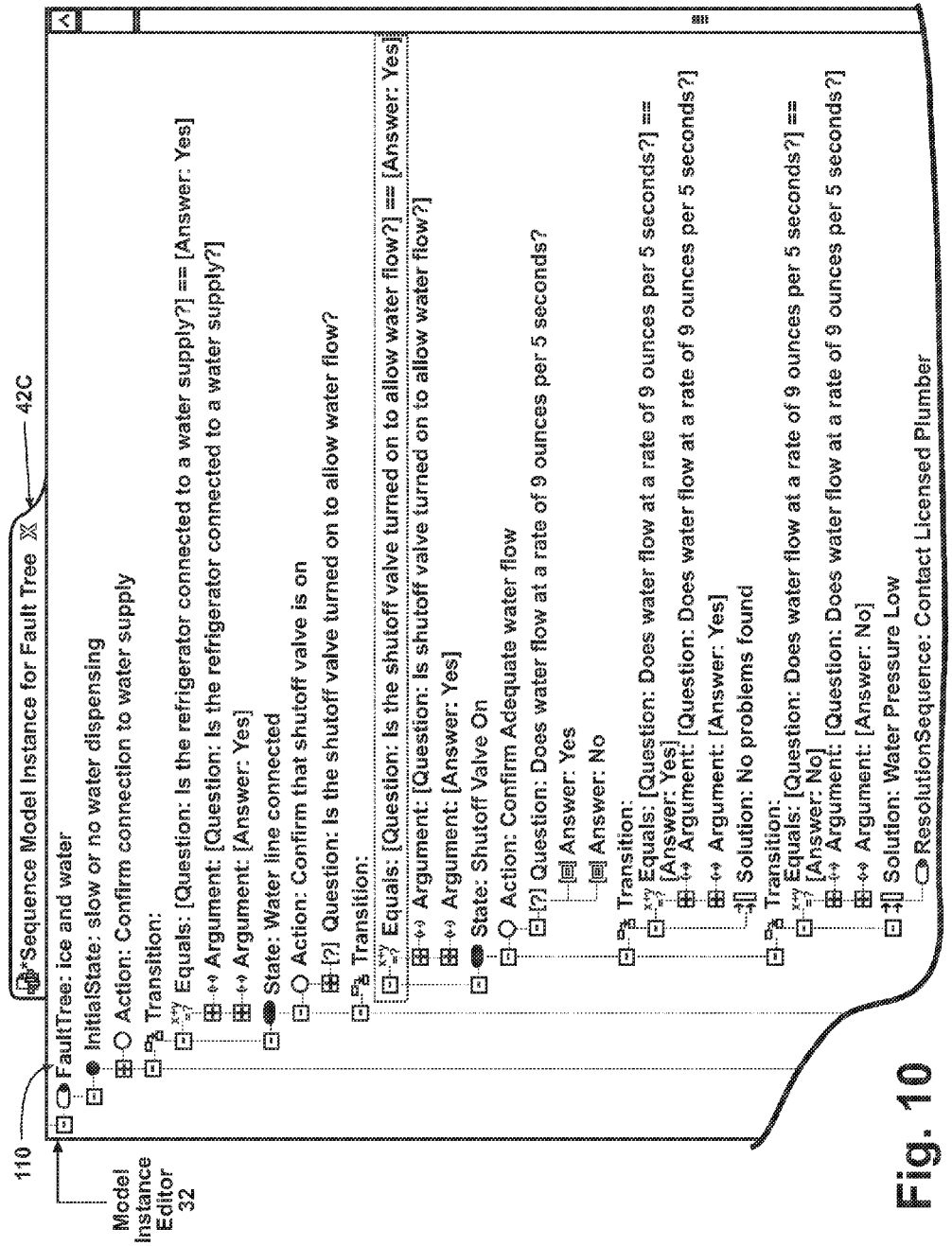
FIG. 10 is a screen shot of an editor in an appliance development toolkit according to the invention with a sequence model instance for a fault tree being created.

As shown in FIG. 10, when an answer of "Yes" is obtained when the initial step is carried out, the appliance fault tree 110 can transition to the next step. Thus, the question and answer function as arguments that, in combination, form a conditional statement in the appliance fault tree 110. While proceeding through the appliance fault tree 110, the specific steps, actions, and transitions are performed based on whether the various conditional statements in the appliance fault tree 110 are true or false. If a conditional statement is false, no transition will occur, and the appliance fault tree 110 will proceed in order. If a conditional statement is true, then a transition can be performed, which can act as a path to a particular step, action, and/or transition. In some cases, the action can be displaying a solution on the user interface 64.

Figure 10A:
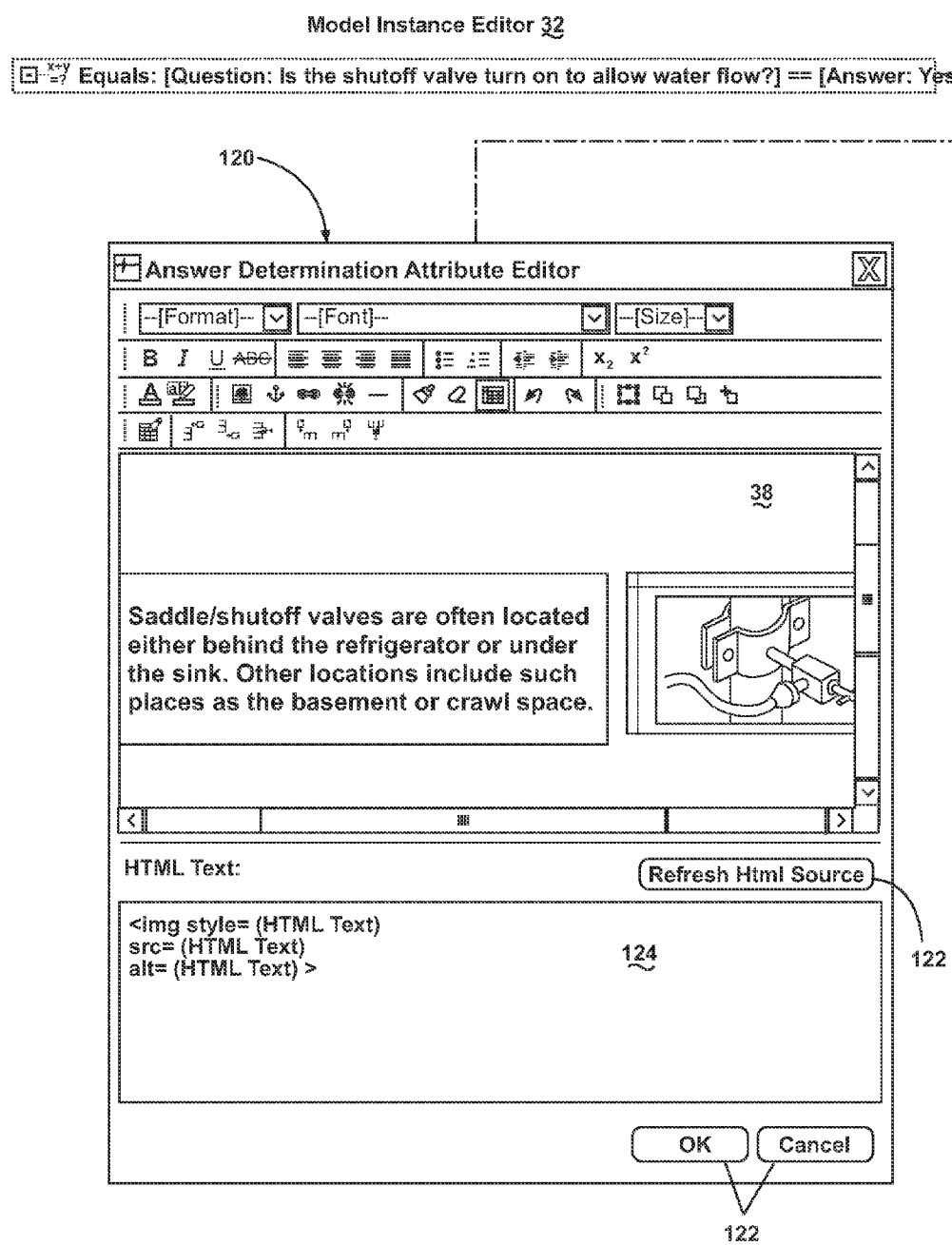
FIG. 10A is a screen shot of an attribute editor in an appliance development toolkit according to the invention showing the creation of a portion of the instance of FIG. 10.

As shown in FIG. 10A, an answer determination attribute editor 120, which is also a component of the model instance editor 32, can be used to edit the content 20 displayed to the user 14 at a given transition corresponding to a given question and answer conditional statement. The answer determination attribute editor 120 is illustrated as having a number of well-known elements frequently included in computer-based editing applications, such as clickable buttons 122, a display window or viewer 38, and a text entry box 124.

As shown in FIGS. 12-15, the sequence model instance for a fault tree 42C can also be used to present a use and care guide 130 to the user 14 via the user interface 64 of the appliance 12, which can comprise the GUI 68. Content 20 comprising text to be displayed to the user 14 can be created using a document model instance 42G (FIG. 43) for a use and care guide 130, which specifies content 20 can be displayed on the user interface 64 that enables a user 14 to select a symptom 132 included in the use and care guide 130. The selection of a symptom 132 can automatically bias the user 14 to an entry or starting point in the sequence model instance for a fault tree 42C so that the user 14 does not have to waste time looking through irrelevant symptoms. In addition, a given appliance 12 can have more than one fault tree 110 associated with it. For example, there can be a fault tree 110 associated with different components or different subsystems in the appliance 12. There can also be different fault trees 110 associated with accessories connected to the appliance 12, and each fault tree 110 can have an initial step A that would normally serve as the starting point for entry into the respective fault tree 110. It may be, and often is the case, that any given fault tree 110 for an appliance 12 might have multiple entry points. Further, a transition, as discussed previously with respect to FIGS. 10-15, is not limited to transitioning to a sequential step within the same fault tree 110. For example, a transition from a first step on a fault tree 110 can lead to a second step on another fault tree 110.

Figure 14:
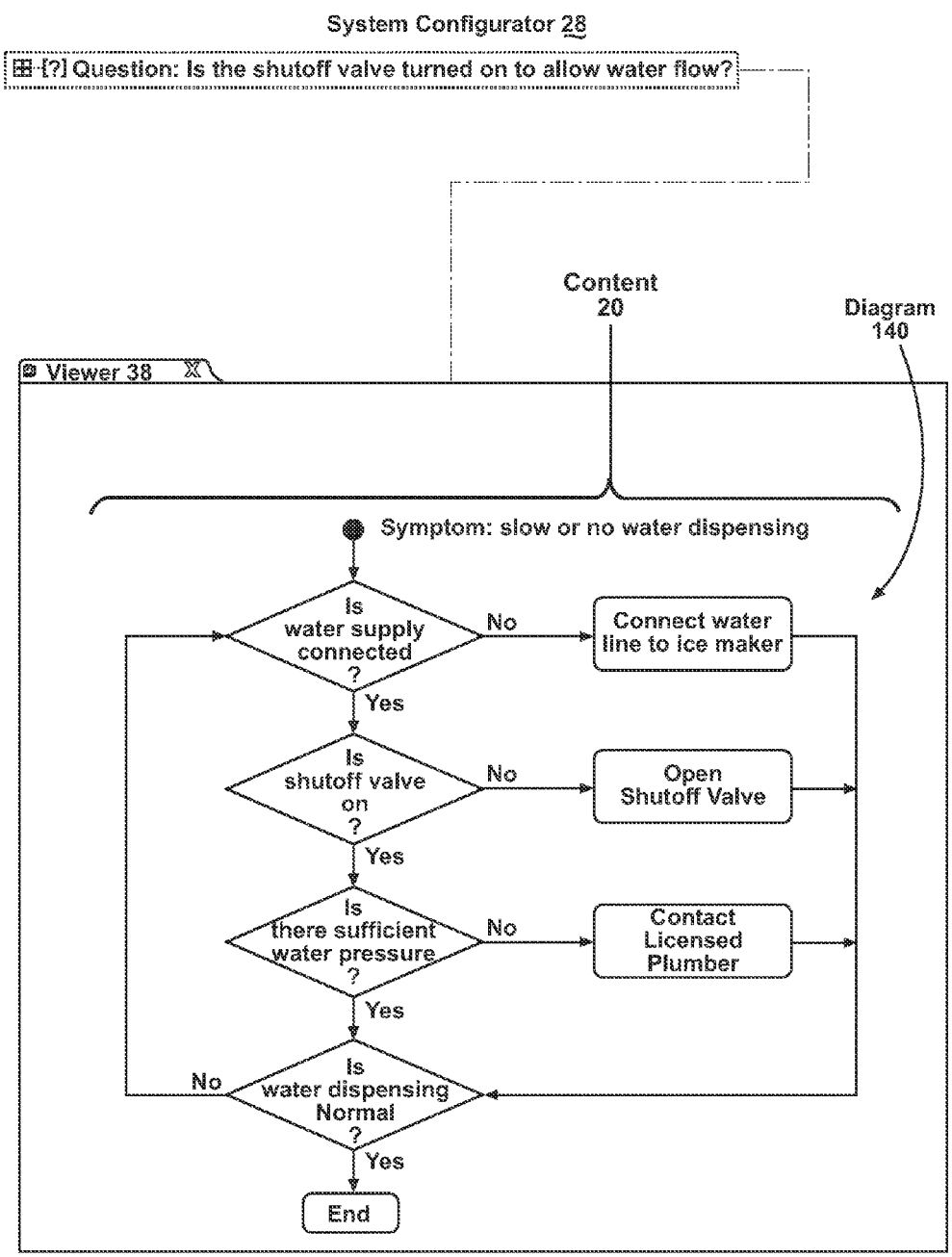
FIG. 14 is a screen shot of a viewer in an appliance development toolkit according to the invention showing a flow chart of the content in FIGS. 12-13B.
Figure 15:
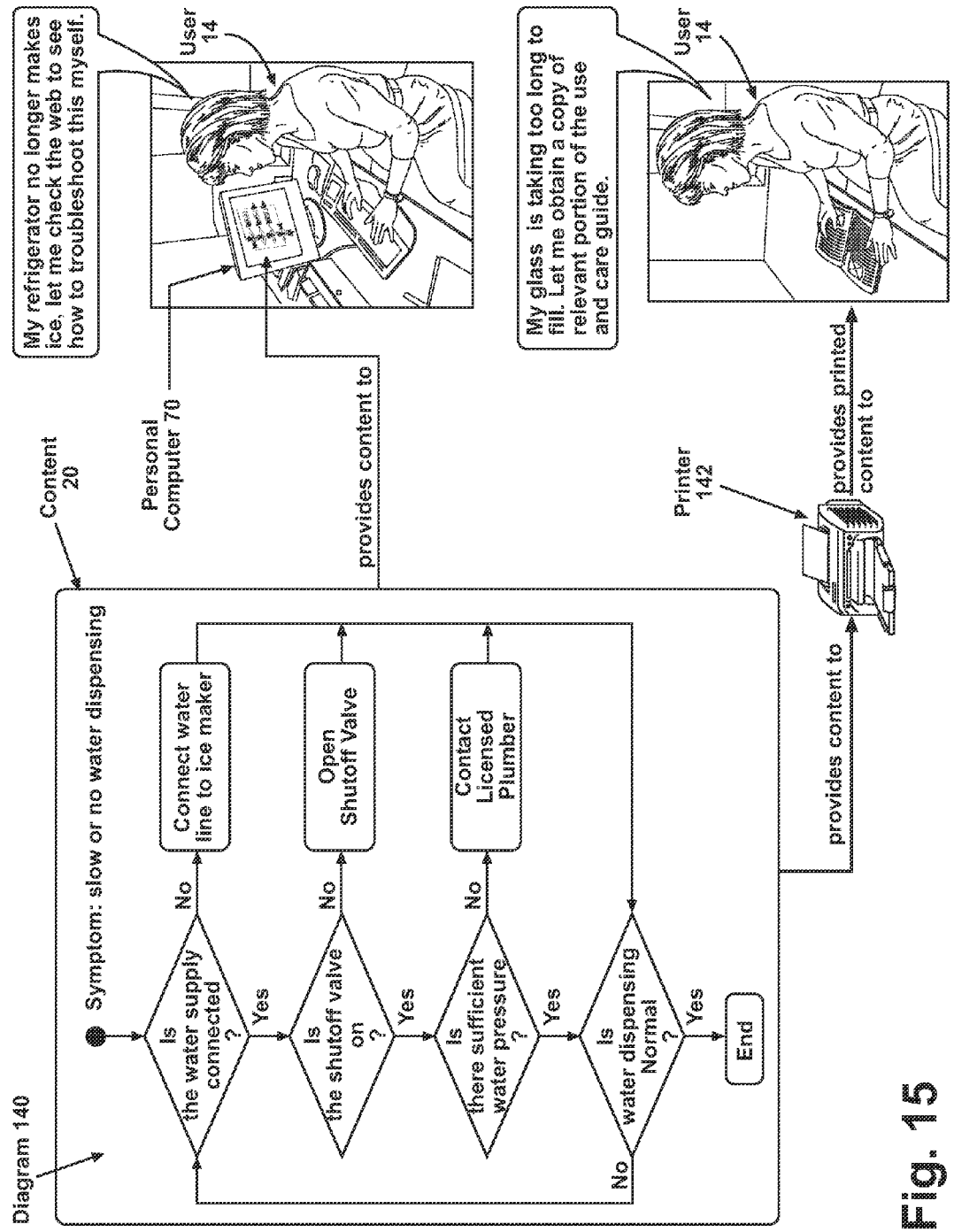
FIG. 15 illustrates an interaction between the content of FIGS. 12-13B and a user.

The fault tree 110 and/or use and care guide 130 provided by the sequence model instance for a fault tree 42C can also be presented in a viewer 38 as content 20 in the form of a diagram 140 as shown in FIGS. 14 and 15. The user 14 can troubleshoot problems by simply using a content target 22 capable of presenting the content 20. For example, as shown, a user 14 can use the personal computer 70 to view a web page including the information, or the user can use a printer 142 to print out a copy of the diagram 140. In either instance, the sequence model instance for a fault tree 42C can be used to diagnose problems and potentially find a solution without requiring a visit from a serviceperson.

Looking now to FIGS. 16-23, a message data payload model instance 42D is used to manage message data payloads 150 comprising a first portion 152 having usable data and a second portion 154 having information to describe the usable data. The first and second portions 152, 154 can comprise an ordered collection of message elements 156 or at least one message element 156. One of the first and second portions 152, 154 can have a direct or indirect reference to the other of the first and second portions 152, 154, which can effectively bind the portions. The constraints defined by the model 40 can be used within the model instance editor 32 to create the association between the first and second portions 152, 154. Various message elements 156 can be compiled to create a portion 152, 154 using the model instance editor 32 during creation of the message data payload 150 and can comprise meaningful text describing the meaning of the message element 156. Usable data from the communications network 18 can be combined with non-usable data describing the usable data wherein the user 14 can understand the meaning of the usable data. Based on the message data payload model instance 42D and the properties 158 thereof, a viewer 38 can display a complete specification 160 that updates in real time as the user 14 edits the message data payload model instance 42D and properties thereof.

Figure 16:
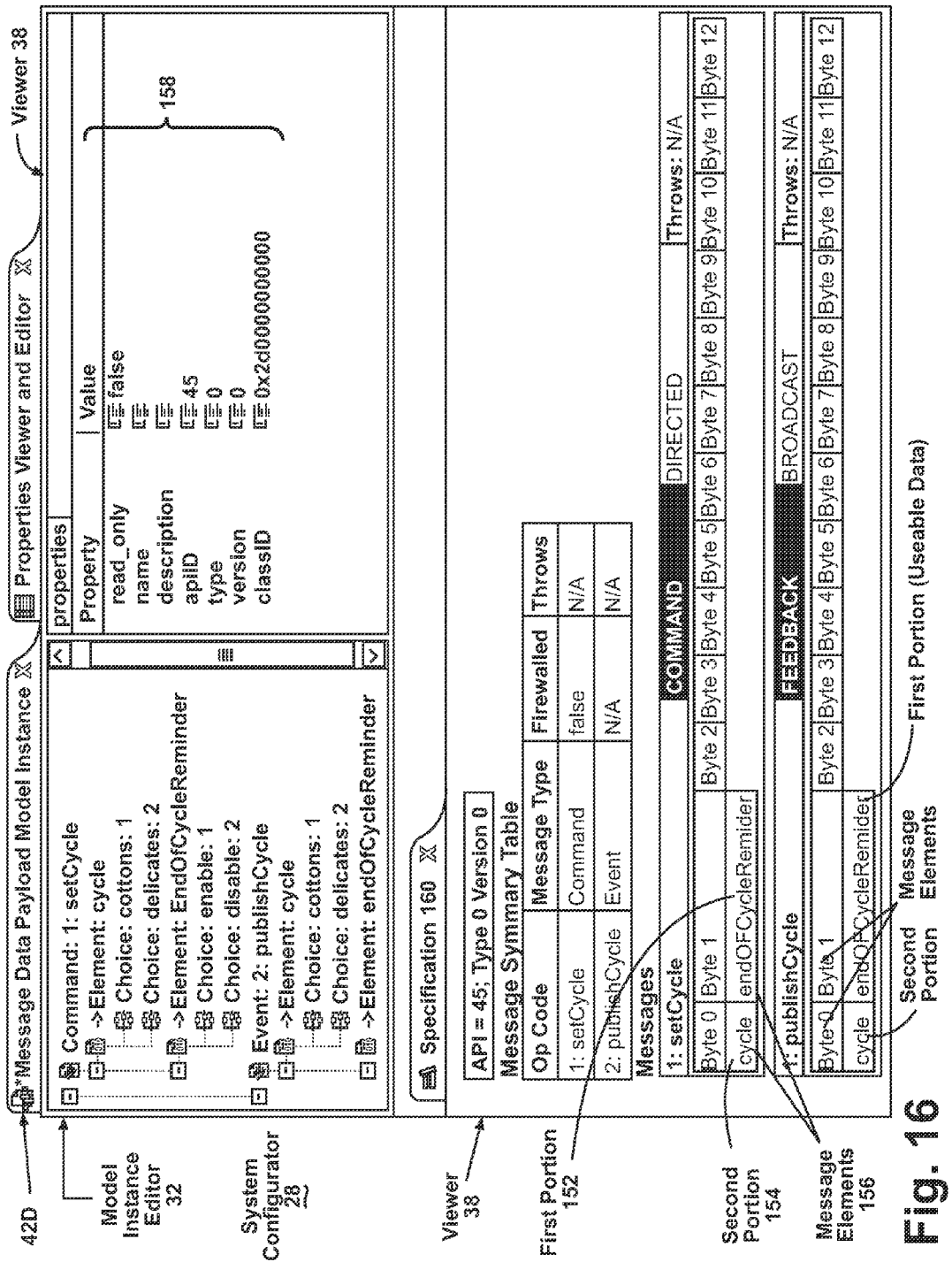
FIG. 16 is a screen shot of an editor in an appliance development toolkit according to the invention with a message data payload model instance being created
Figure 17:
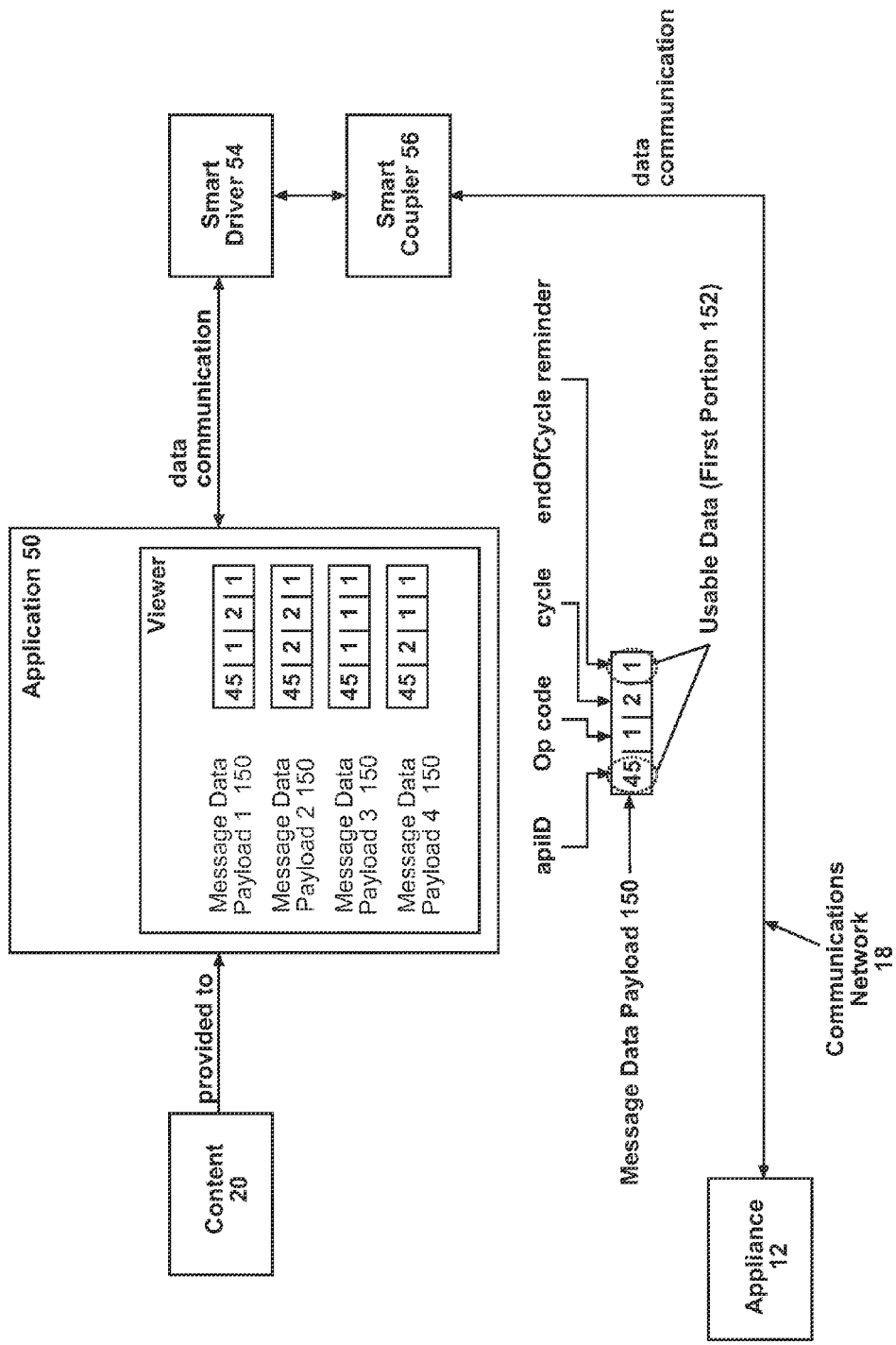
FIG. 17 is a schematic diagram showing the use of the message data payload model instance of FIG. 16 in an appliance.
Figure 18:
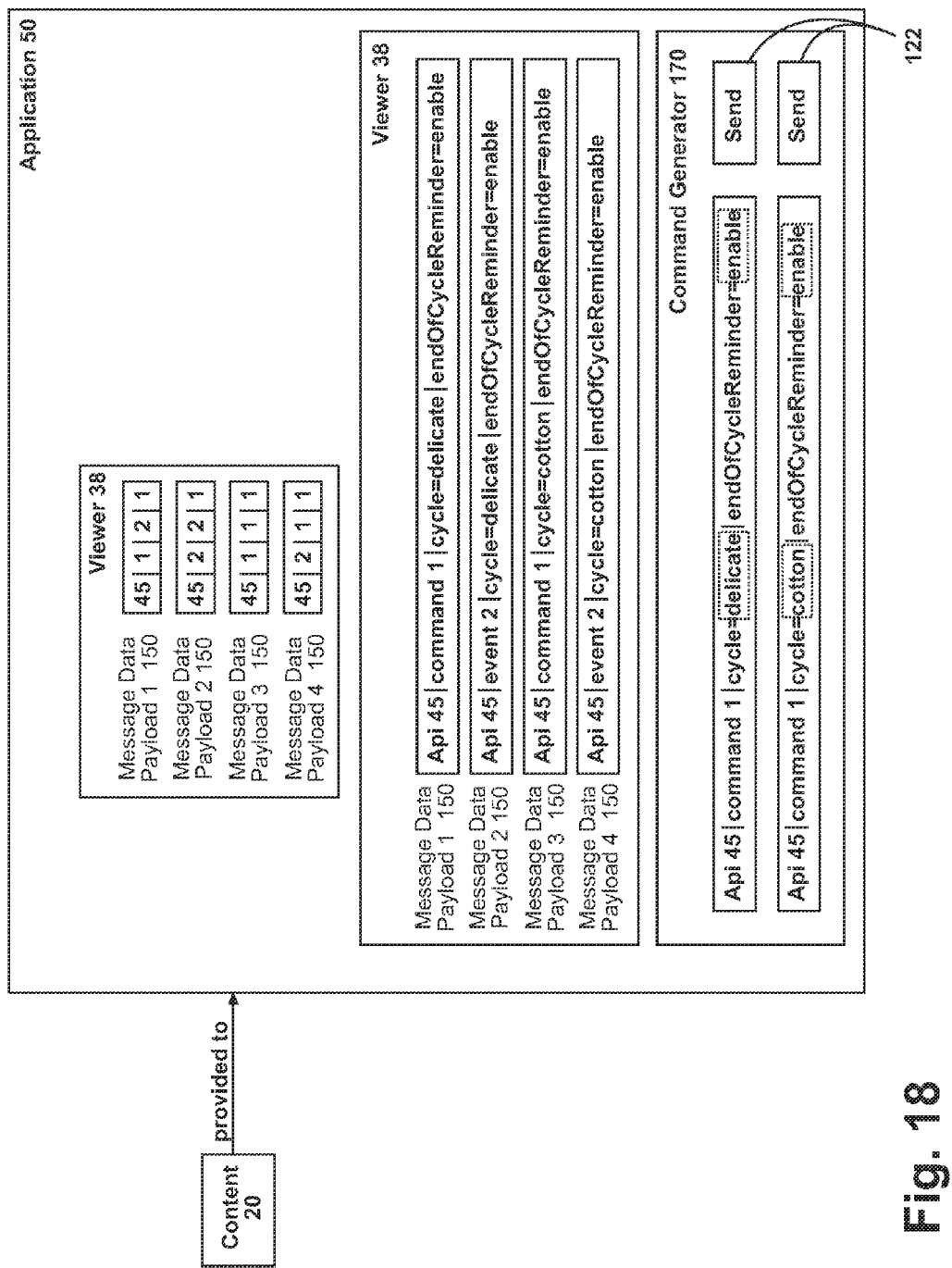
FIG. 18 is a screen shot of a viewer in a target application showing the message traffic of the message data payload model instance of FIG. 16
Figure 19:
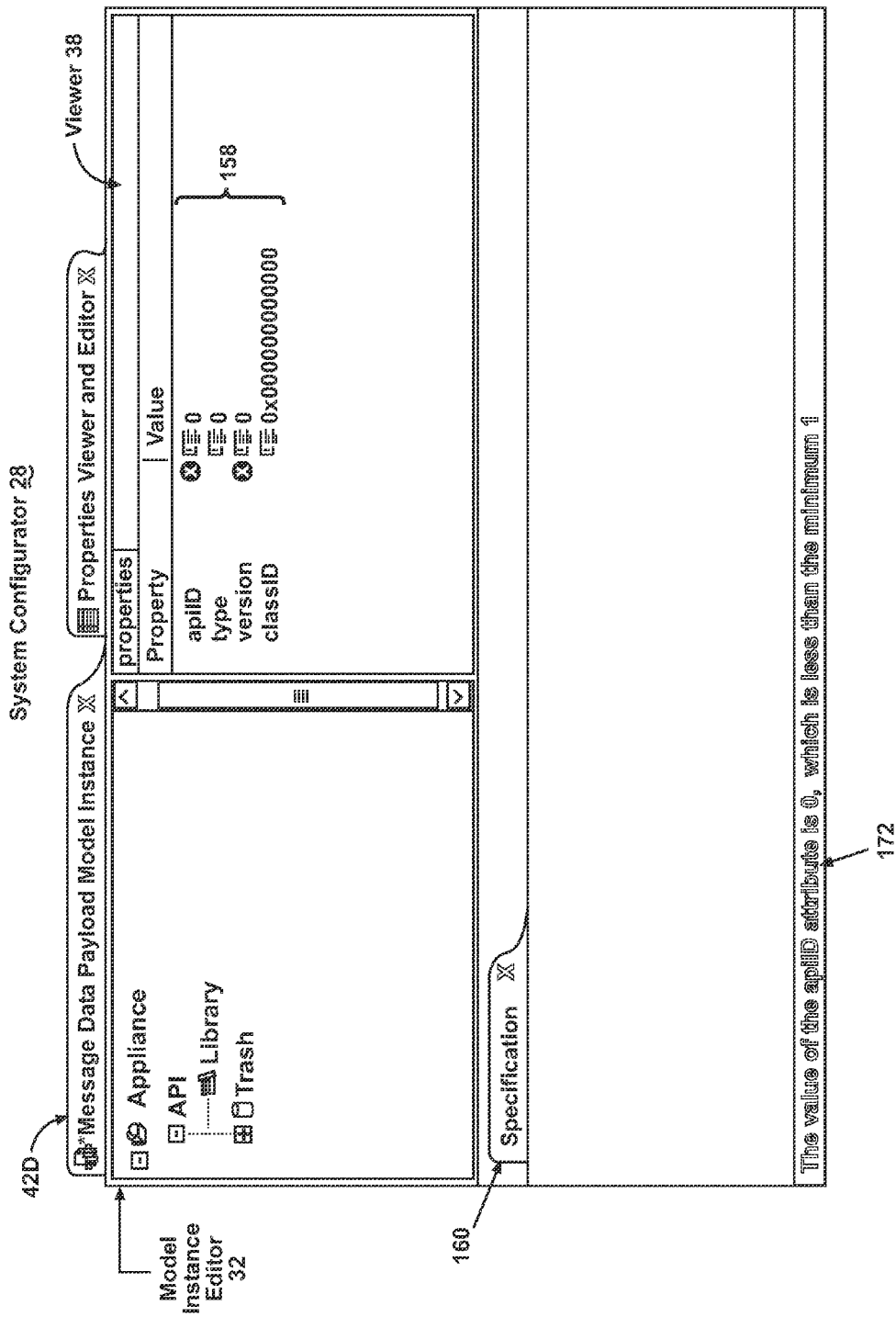
FIG. 19 is a screen shot of a model instance editor in an appliance development toolkit according to the invention showing a step in the creation of a message data payload.

Specifically, FIGS. 16-18 show the creation and advantages of useable data in the inventive appliance development toolkit 10. The system configurator 28 displays the message data model instance 42D in the model instance editor 32, a viewer 38 showing properties 158, and a viewer 38 showing the specification 160. Elements and choices of a command structure or sequence are created in the model instance editor 32 as an instance of a message data payload 150. A first portion 152 of a message element 156 comprises useable data and is set in byte 1. A second portion 154 identifies the first portion 152 and is set in thus example in byte 0. The model instance editor 32 can have constraints that limit or guide what a use can do in creating message payloads 150. In any event, the model instance editor 32 creates an association between the first and second portions 152, 154 where rules for data representation provided by the communications network 18 over which the message payload 150 is to be sent provide the constraints.

A user interface 64 or viewer 3 can display a visualization of the message data payload 150 from the model instance editor 32 so that a user 14 can conveniently create the message data payload 150 for immediate use and see a graphical representation of the message data payload 150 as it is created. An example of that display is seen in FIGS. 17 and 18. In FIG. 17, a viewer associated with an application 50 can display relevant data including the identifiers (second portion). As shown in FIG. 18, a specialized viewer 38 associated with an application 50 or, alternatively, incorporated directly into the system configurator 28 can also be associated with a command generator 170 such that the associated viewer 38 displays the various message elements 156 of the message data payload 150 and the command generator 170 enables the user 14 to define and initiate the sending of a message data payload 150 to affect the operation of the appliance 12. The command generator 17 can include one or more buttons 122 for initiating the sending of a defined message data payload 150.

Figure 20:
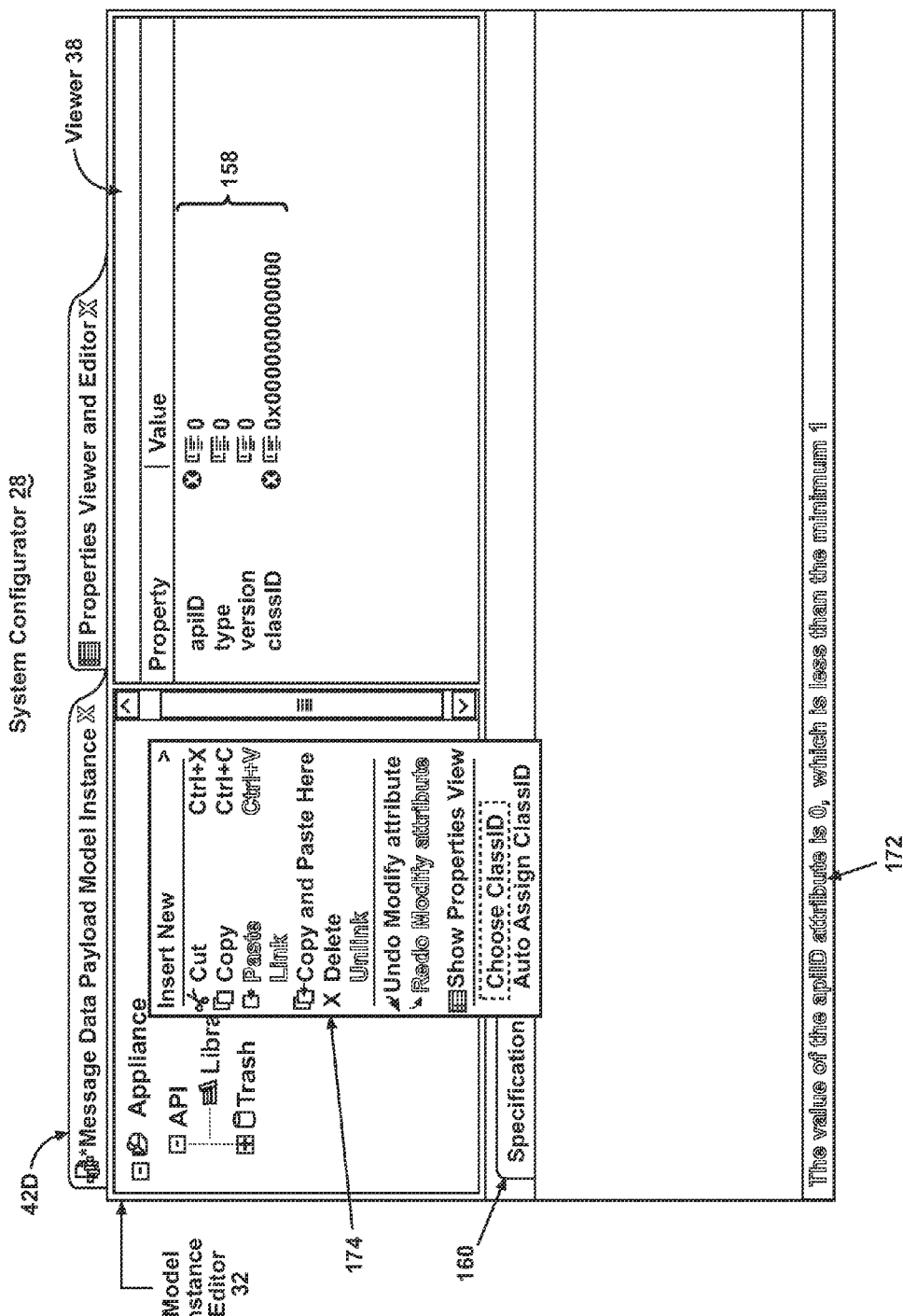
FIG. 20 is a screen shot of a model instance editor in an appliance development toolkit according to the invention showing another step in the creation of a message data payload.
Figure 21:
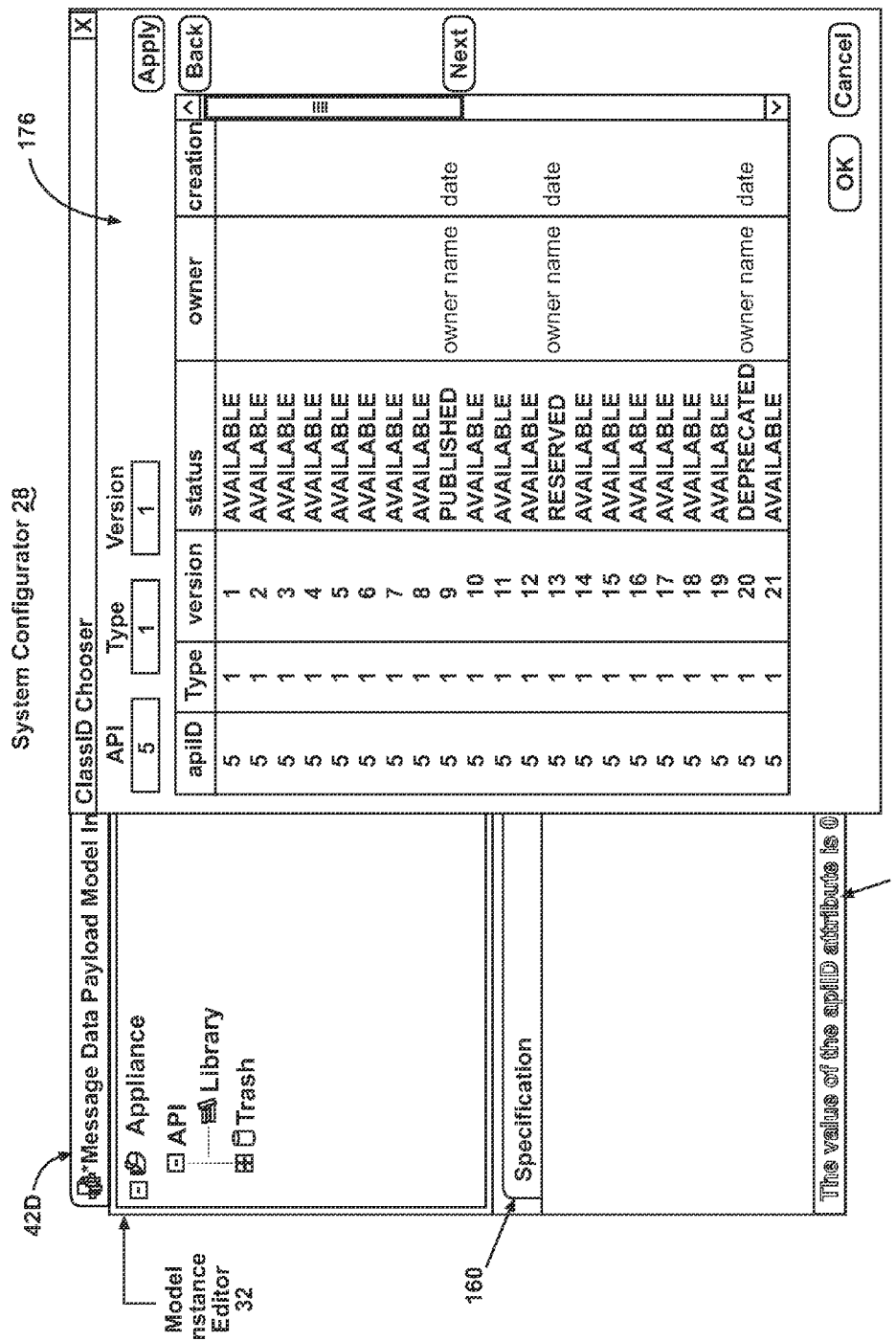
FIG. 21 is a screen shot of a model instance editor in an appliance development toolkit according to the invention showing another step in the creation of a message data payload.
Figure 22:
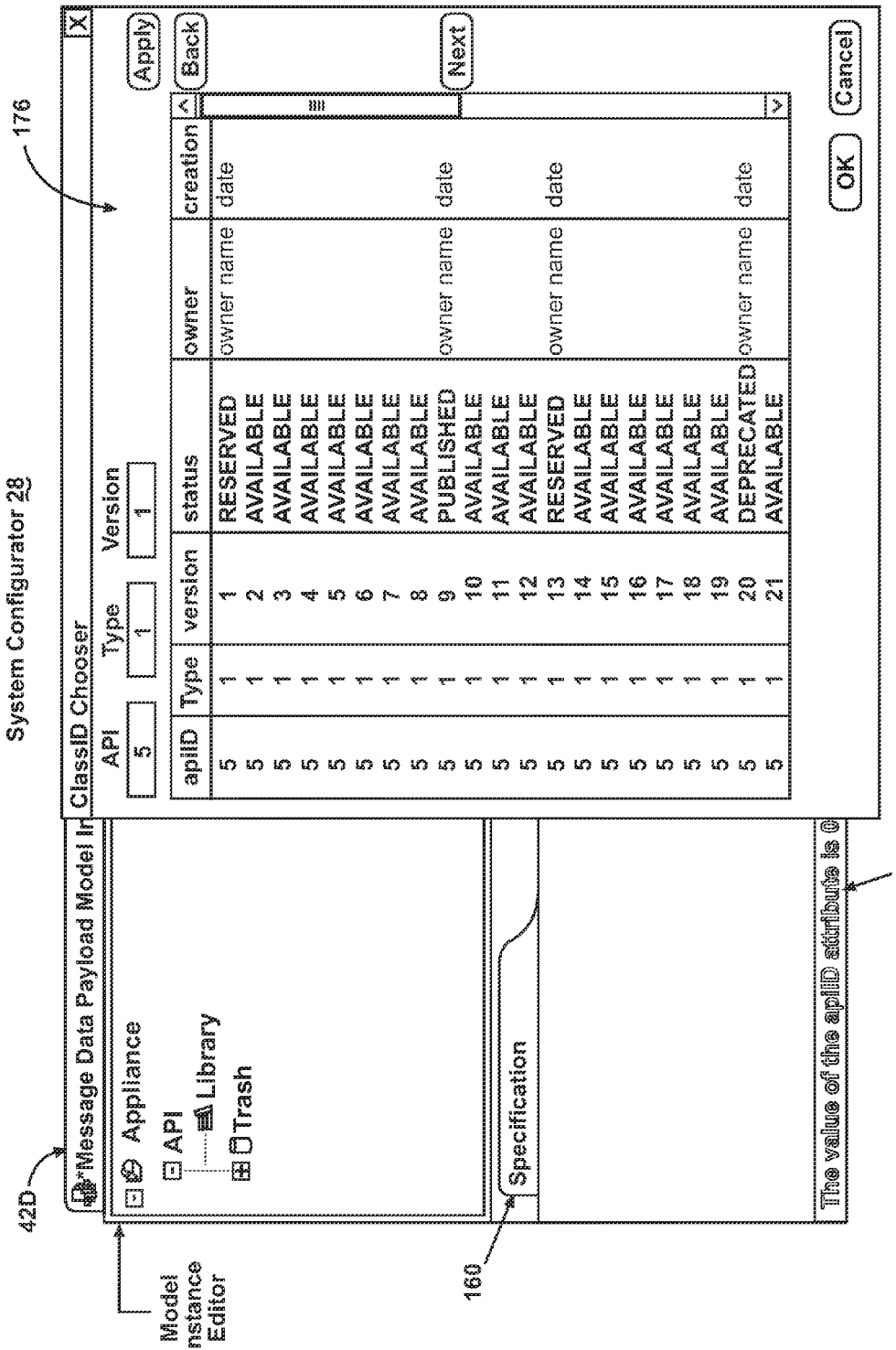
FIG. 22 is a screen shot of a model instance editor in an appliance development toolkit according to the invention showing another step in the creation of a message data payload.

FIGS. 19-23 show in steps the creation of a message data payload model instance 42D using variables, values, and value holders, which will be described in more detail hereinafter in FIG. 37. See the description of holders, infra. As well, FIG. 20 shows the use of menus 174 and forms 176 for guiding or limiting a user 14 in selecting and inputting information according to the constraints. An error message 172 can be displayed if a property 158 or parameter associated therewith is incorrect or improper according to the constraints. A model instance editor 32, which includes constraints as will be discussed in more detail hereinafter, is constrained by a model 40. In FIG. 20, an API object has been selected and the user 14 has right clicked the object, bringing up menu 174 having an "Insert New" feature. Referring to a message data payload model 40C of FIG. 37, an API is allowed to have a minimum of zero relationships with a message data payload 150 and a maximum of n or infinite relationships with a message data payload 150. Therefore, if the user selects the "Insert New" item on the menu 174, a sub-menu (not shown) or form 176 can appear, enabling the user 14 to choose to create a message data payload object. In this case, the model instance editor 32 reads the model 40 such that it is informed by the model 40 what the possible relationships between each current and potential objects are so that the model instance editor 32 editor can configure its functionality from the information in the model 40 so as to constrain itself according to the model 40. In this way, a constrained appliance development toolkit 10 constrained by a model 40 can limit the types of objects created and the available relationships between objects which in turn limits the ability to create content 20, which in turn limits the appliance control functionality.

Figure 24:
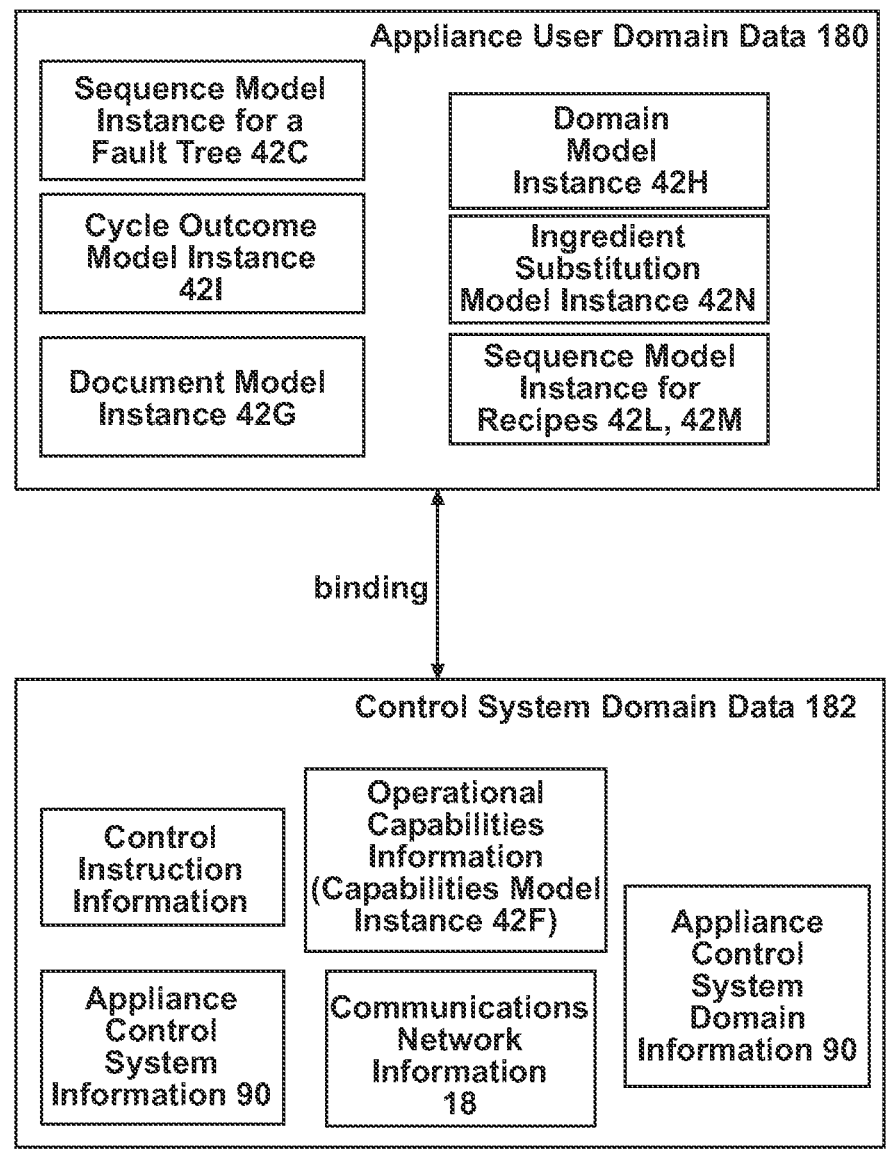
FIG. 24 is a schematic diagram showing a binding between appliance user domain data and control system domain data created by an editor in an appliance development toolkit according to the invention.

FIG. 24 illustrates types of model instances 42 that can be associated or bound by the model instance editor 32 of the appliance development toolkit 10. Essentially anything in the different domains of data can be bound for later use. Although appliance user domain data 180 and control system domain data 182 are here shown, it will be understood that binding among other domains is equally within the scope of the invention, e.g., user interface domain data 184 and/or source identification domain 186 data.

Figure 25:
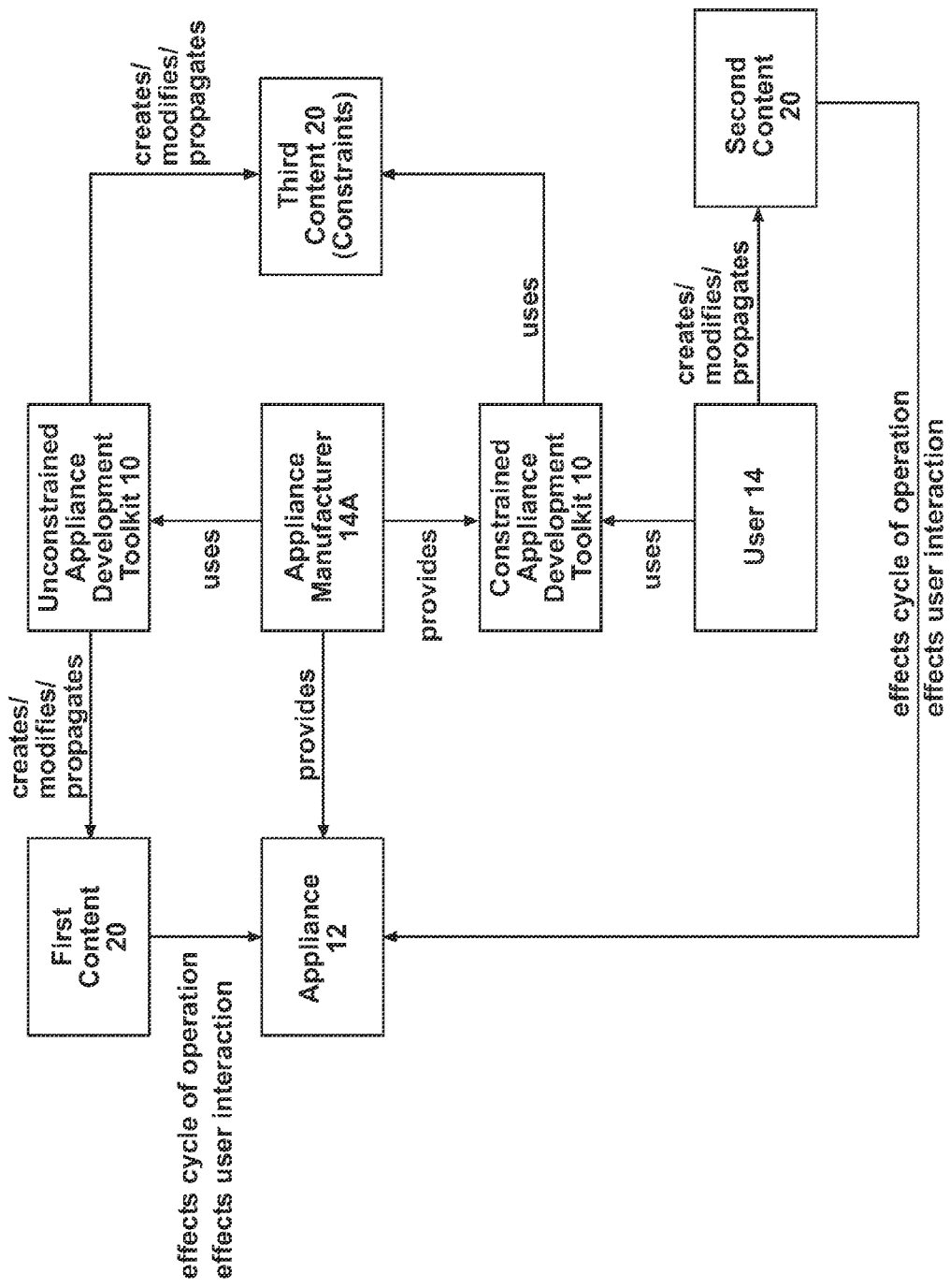
FIG. 25 is a schematic diagram showing use of a constrained appliance development toolkit according to the invention.

FIG. 25 illustrates the benefit of constraining the development toolkit 10 for use by users who want to create content 20 for effecting the cycle of operation of the user interaction of an appliance 12 but do not have all the engineering skills or knowledge to do so. The constrained development toolkit 10 enables a user 14 that has less than all the required knowledge or skills to create content 20 that effects the cycle of operation or the user interaction of an appliance 12 wherein the effect is less than the full effect that content 20 from an unconstrained appliance development toolkit 10 can create. The constraints used to constrain use of the toolkit 10 can be specified within a model 40. It is to be understood that for the purposes of describing the invention, unless otherwise specified, reference to the toolkit 10 herein can be understood as a reference to a constrained toolkit and/or an unconstrained toolkit.

Appliance manufactures build appliances for a competitive market and compete with one another in the areas of cost and innovation. Accordingly, manufacturers 14A must continuously invest in new products, new technologies, and new innovations while simultaneously reducing cost and improving quality. The ability of an appliance manufacturer 14A to develop a means by which to engage thousands of additional persons for the purpose of creating new product innovation without raising costs would be a disruptive competitive advantage for that manufacturer 14A. However, because only highly trained and specialized engineers can successfully and properly create appliance control functionality, previous attempts by manufacturers 14A to engage the thousands of additional persons in an uncontrolled manner have not resulted in the production of functional and properly-engineered appliance control functionality. As appliance control functionality plays a critical role in a person's everyday life, such as by affecting the clothes people wear, the food they eat, and the air they breathe, proper implementation of appliance control functionality is a necessity. Many appliance control functionalities are also potentially dangerous and must be precisely managed by the specialized and intricately engineered appliance control system, such as appliance control functionalities associated with high voltage sources, high heat sources, gases, liquids, and chemicals.

The use of constraints to contrain the appliance development toolkit 10 enables the thousands of additional persons to create content 20 that effects and/or the cycle of operation or the user interaction of an appliance by providing guidelines and rules for innovation. In particular, the constraints can enable users 14 to create content 20 that effects/affects only certain appliance control functionalities deemed appropriate for manipulation by the manufacturer 14A while preventing users 14 from creating content 20 that effects/affects the appliance control functionalities associated with critical systems and components of the appliance 12. This enables the manufacturer 14A to ensure that the appliance 12 is safe for use by maintaining the integrity of the core appliance control functionalities. For example, the manufacturer 14A would constrain the toolkit 10 so as to prevent users 14 from manipulating precision controls, such as those for high heat, electricity, or harmful substances, so that the food, clothing, air, or other article or elements is properly operated upon by the appliance 12.

Figure 26:
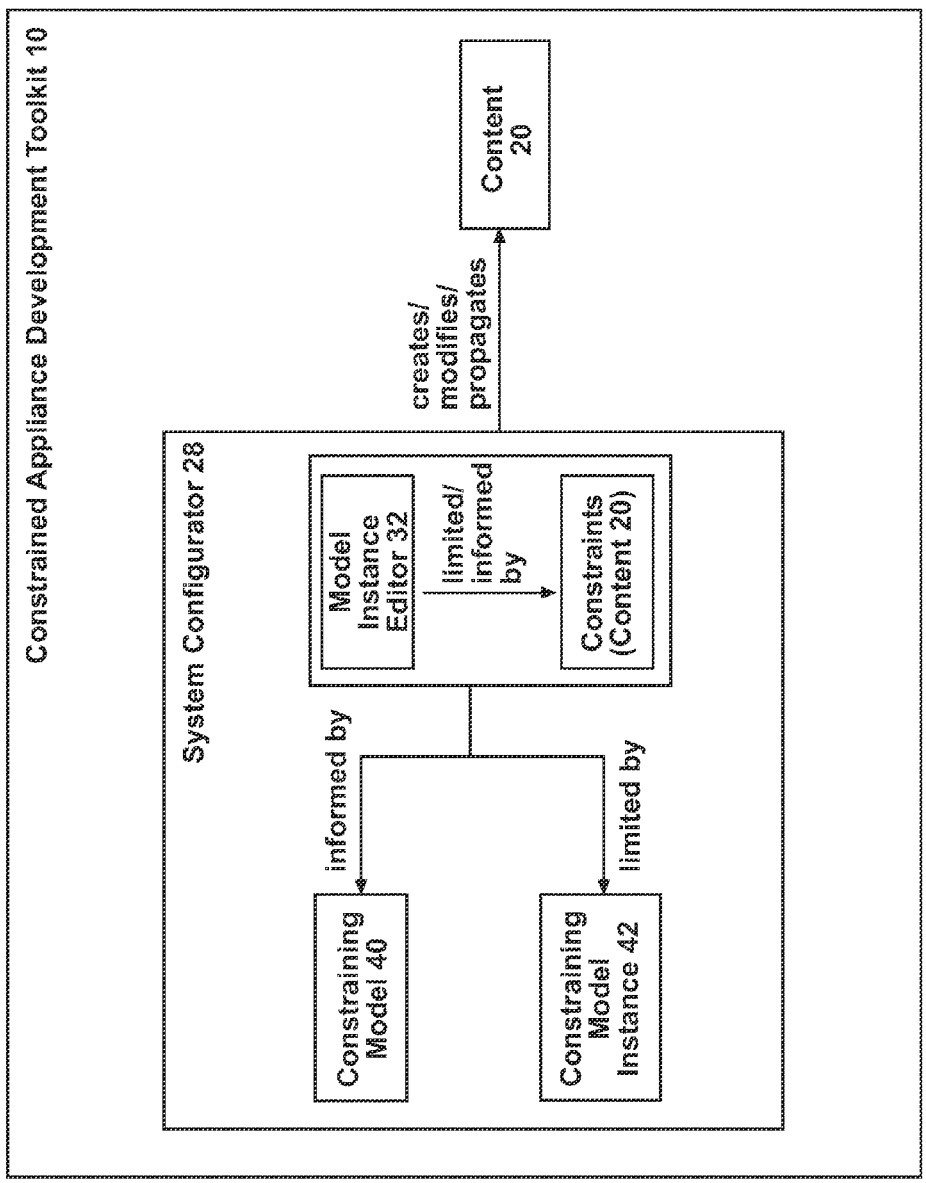
FIG. 26 is a schematic diagram showing a constrained appliance development toolkit according to the invention.

As shown in FIG. 26, there are three approaches to providing a constrained appliance development toolkit 10. They are through a constraining model 40, a constraining model instance 42, and hard-coded constraints, which can comprise content 20 as previously described. Constraints define at least a portion of the functionality of the constrained appliance development toolkit 10. It is generally the model instance editor 32 of the system configurator 28 which uses the constraints to partially limit and partially control the functionality and therefore the content 20 which the system configurator 28 is able to create.

Figure 28:
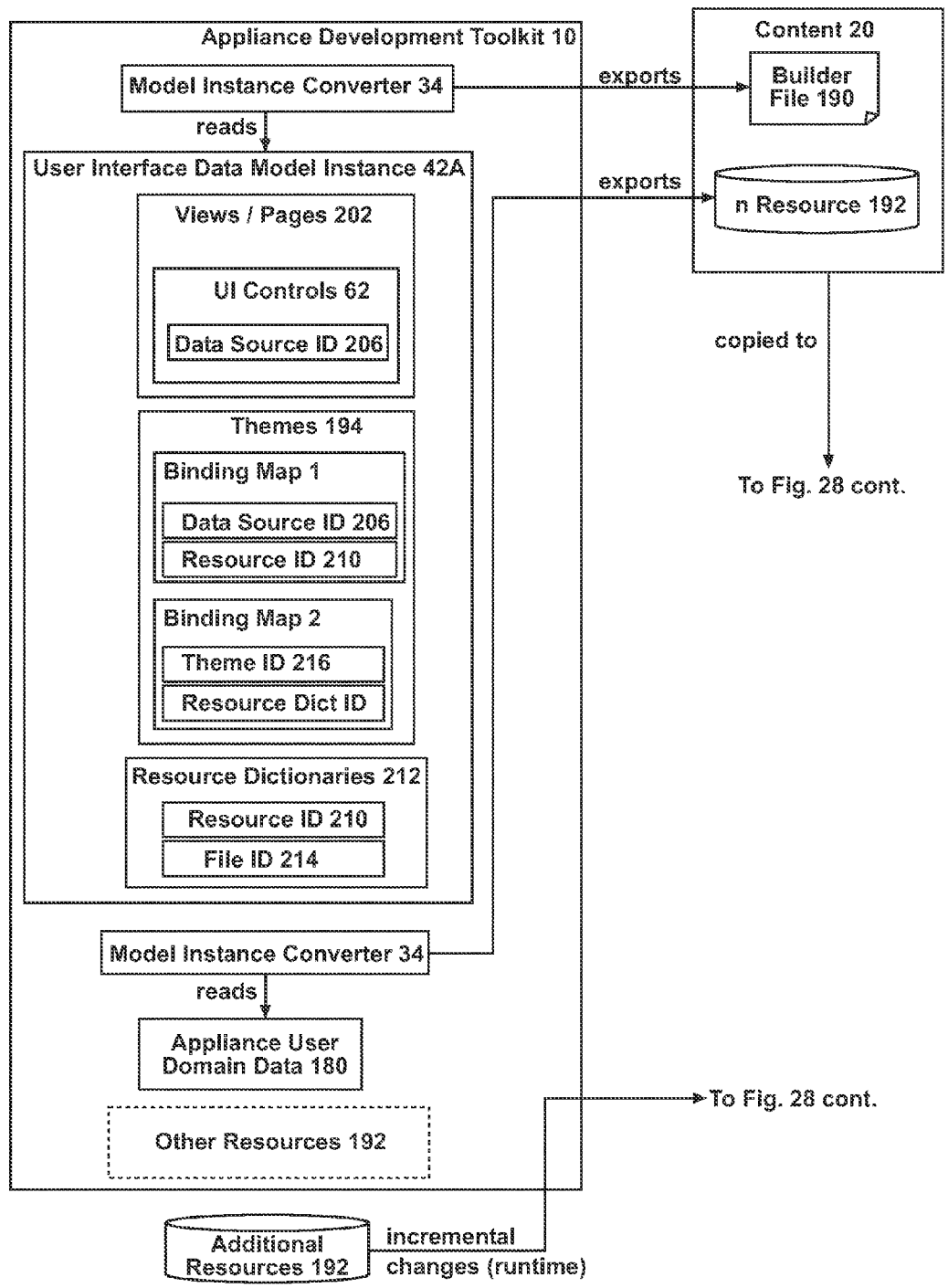
FIG. 28 is a schematic diagram showing elements of an appliance development toolkit according to the invention and an appliance that uses content from the appliance development toolkit in creating themes and animations.
Figure 28:
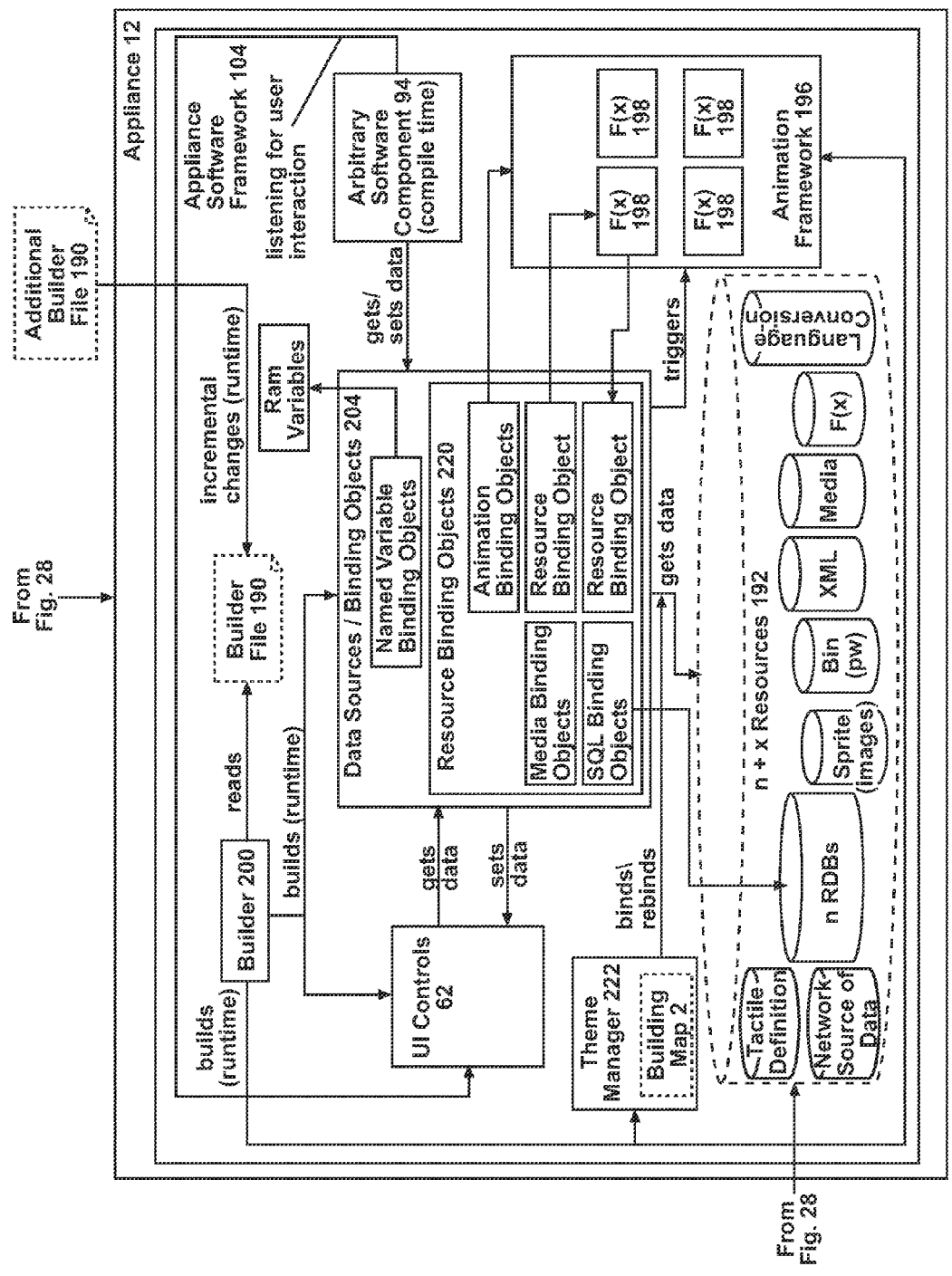

As shown in FIG. 28 and in FIGS. 7 and 8, appliance control functionality can be created from content 20 generated from an appliance development toolkit 10. This is also shown in FIG. 25 via first content 20 and second content 20 created by the appliance manufacturer 14A and a user 14 respectively.

Referring back to FIG. 25, the appliance manufacturer 14A may provide a constrained development toolkit 10 which is hard-coded. The appliance manufacturer 14A can also use an unconstrained toolkit 10 to create the third content 20, which can include a constraining model 40, a constraining model instance 42, or both. In the latter two cases, the constrained appliance development toolkit 10 uses the third content 20 to define at least a portion of the constraints.

Referring back to FIG. 26, it is generally the model instance editor 32 of the system configurator 28 which uses the constraints to partially limit and partially control the functionality and therefore the content 20 which the system configurator 28 is able to create. The message data payload 150 instance may have been created by an unconstrained model instance editor 32 or by a constrained model instance editor 32. The system configurator 28 of the appliance development toolkit 10 (unconstrained and constrained) is able to load multiple model instance 42 files in model instance editors 32 for the creation of and associations between objects.

A constrained model instance editor 32 constrained by hard-code is shown in FIG. 26. This approach can achieve the same results as the other two approaches, but at a higher development cost over time because each new model 40 or each new model instance 42 interaction needs to be hard-coded. The previous two approaches rely on a data driven approach with is lower cost over time.

Figure 27:
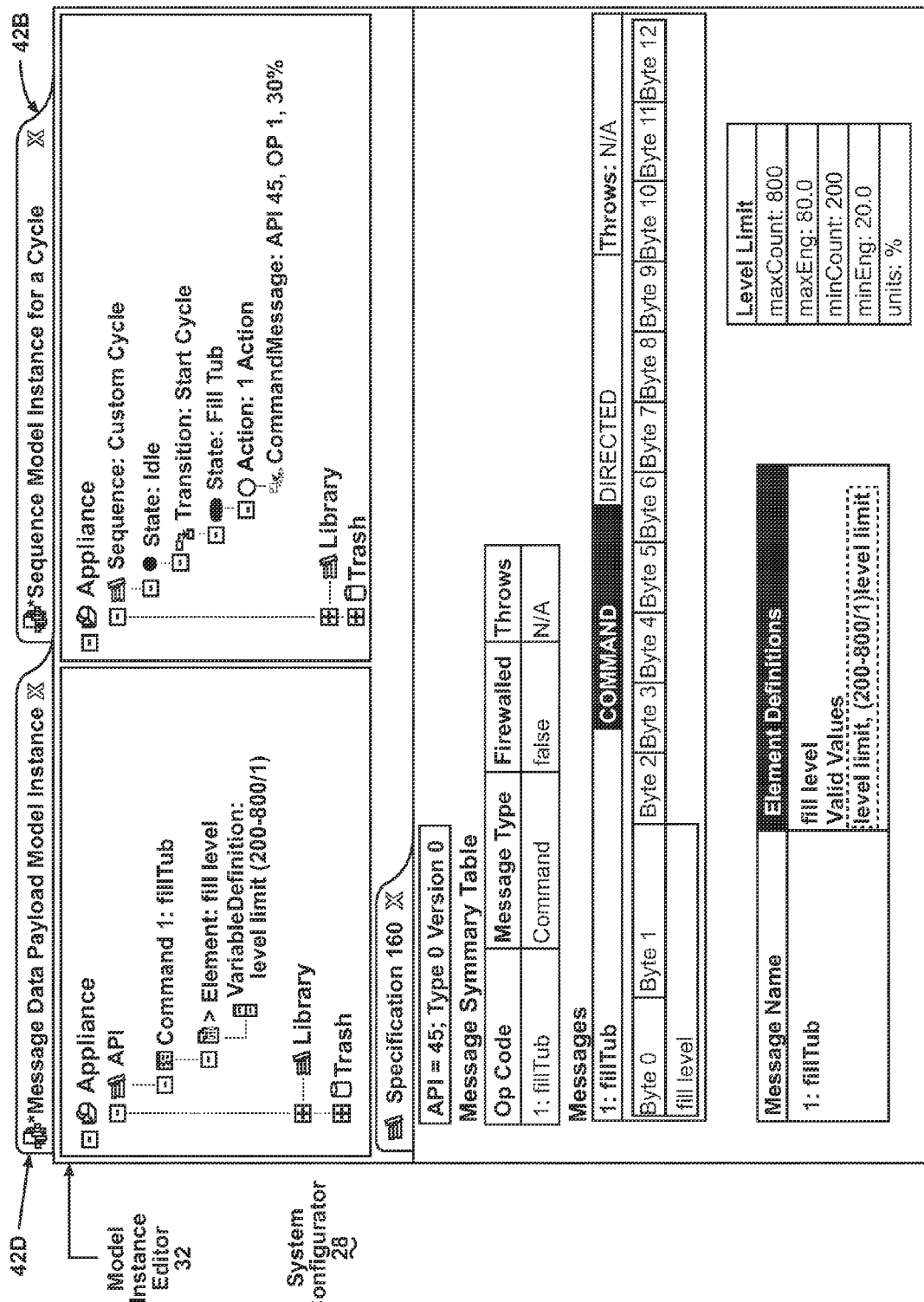
FIG. 27 is a screen shot of a model instance editor in an appliance development toolkit according to the invention showing aspects of a message data payload.

FIG. 27 includes an illustration of using a constraining model instance 42. On the right side of the model instance editor is a sequence model instance for a cycle 42B for a washing machine. The model instance editor 32 is being used to create a custom cycle with the sequence model instance for a cycle. As shown, the custom cycle includes a transition from the idle state to the fill tub state wherein the action object for the fill tub state is responsible for the exact control actions to be taken when the fill tub state is entered. In an unconstrained toolkit 10, the user 14 can specify any control action from the universe of control actions as the action to be taken in the fill tub state. However, the constrained toolkit 10 includes an message data payload model instance 42D which provides a set of control actions less than the universe of control actions such that the user can associate at least one command from the message data payload model instance 42D with the fill tub action object of the sequence model instance for a cycle 42B in order to define the control action to be taken when the fill tub state is entered. Note that the level limit on the fill level message element 156 is between 20 and 80%. This prevents the user 14 from specifying a value for fill level either above 80% or below 20%.

FIG. 28 depicts the appliance development toolkit 10 interacting with an appliance 12 via its appliance software framework 104 by way of content 20 created by the toolkit. In this embodiment, the content 20 is created by one or more model instance converters 34 and includes a builder file 190 and a plurality of resources 192, which can comprise one or more resources 46. A resource 192 can be a data set containing data. A resource 192 can be a file or collection thereof, a database, a stream of streaming data, an event source, a network connection for communicating data and the like. In all cases, the nature of the data for a resource 192 ranges from images and videos to XML, relational databases, language conversions, and animation definitions.

Consumers/users 14 enjoy dynamic user interfaces 64, especially graphical user interfaces 68. Even better are multimedia interfaces that combine audio, visual, and tactile stimuli to create the ultimate user experience. However, users 14 keep their appliances for 10-12 years, and as such it is desirable to provide a variety of user experiences over time to keep the user 14 engaged and excited about the user experience of the appliance 12. The capability to update and transform a multi-media user interface 68 on an appliance 12 is desirable. Themes 194 are collections of resources 192 which can be applied to the components or controls of a multi-media user interface 68 through a mapping at runtime. Themeing is the application of themes 194 to the multi-media user interface 64 at runtime such that that the user interface 64 transforms dynamically in response to the application 50.

Similarly, the capability to create a very dynamic user experience wherein a plurality of user interface controls or stimuli cause other plurality of user interface stimuli to trigger is desirable. Moreover, an additional feature is to have the different pluralities of user interface stimuli related through a mapping so that when the mapping changes, the user experience also changes. An animation framework 196 includes animation execution software and animation definitions connected to other components of the appliance software framework 104, including properties of the UI controls 62 so that the rendering of the UI controls 62 is affected by the animation execution software operating on the animation definition.

In both cases of themeing and animations 198, creating associations between resources 192, animations, themes 194, and user interface controls 62 is essential and complex. The appliance development toolkit of FIG. 28 is configured to create the necessary object representations and associations therebetween in order to generate the content 20 necessary for the appliance software framework 104 to build the objects at runtime, including UI controls 62, animation definitions (i.e. objects), data objects from resources, and objects which associate or bind the aforementioned together to achieve the dynamic graphical and multi-media user interface 68 for the appliance 12.

The main output of the toolkit 10 in this embodiment is a builder file 190. The builder file 190 contains information including object identifiers, object type (class) identifiers, and relationships between identifiers so that a builder 200 in the appliance 12 can read the file at startup or on demand and create the runtime object collections, hierarchies, graphs that control the dynamic graphical and multi-media user interface 68 for the appliance 12. The builder file 190 is generated by a model instance converter 34 that traverses the model instance objects resident in the toolkit 10 memory and exports the builder file 190 content 20 in response. The user interface domain data model instance 42A includes instances of objects from the user interface domain data model 40A, which includes class definitions for pages and user interface controls 62 and the relationship definitions therebetween.

A view or page 202 contains one or more pages, and a user interface control (UI control) 62 contains one or more UI controls 62. Pages are objects that display a plurality of user interface components and are generally designed to be navigated to and navigated from. UI controls 62 are generally reusable templates of components that must be combined with data at runtime to create a useful control. UI controls 62 are things like buttons, knobs, slider bars, select boxes, text boxes, check boxes, image frames, movie frames, input windows, and the like. UI controls 62 have a plurality of properties which are named components of the UI control 62 which either receive or emit data. It is also possible to think of a UI control property as a variable wherein the identifier of the variable would be UI control identifier, property identifier (i.e., UI control identifier, control property identifier). Examples of UI control properties are font, color, style, size, data, shrinkable, hideable, hide, and the like.

The behavior, rendering, visualization and functionally of a UI control 62 is affected by its properties. UI controls 62 can also emit data which can also be associated with a property. Examples of properties include current data, state 246, current size, current state of visibility and the like. By connecting or associating UI control properties to representations of variables known as data sources or binding objects 204 at runtime, the UI control 62 is able to be affected by other actors in the appliance software framework 104 and to be effectively rendered. Additionally, the connection to properties is able to affect other actors in the appliance software framework 104 which are connected to or are listening to property values of a UI control 62. For example, a tactile animation can be listening to a pressed property of a UI control 62 so that when the press property is true, the tactile animation executes. The aforementioned UI controls 62, their properties, representations of variables, binding and actors objects, and the relationships therebetween are created by the builder 200 in response to the builder file 190.

To accomplish both themeing and animations, the appliance development toolkit 10 creates a representational hierarchy of objects which can be exported to the builder file 190 and read by the builder 200 to create the aforementioned runtime objects of the appliance software framework 104. First the toolkit 10 is configured to create objects representing runtime UI controls 62 and to associate a data source identifier 206 with certain properties of the created UI controls 62 wherein the data source identifier 206 is later associated with a resource identifier 210 to create a first binding map, binding map 1. Next, a set of resource dictionaries 212 are created each having a plurality of resource identifiers 210 and where each resource identifier 210 is associated with a file identifier 214, which can comprise an address to a resource 192. The file identifiers 214 can be in the form of a URI, URL, URN, path, and the like. Different resource dictionaries 212 can contain the same resource identifier 210 associated with a different file identifier 214, thereby creating the basis for themeing.

The toolkit 10 can also be configured to enable the user 14 to associate a plurality of theme identifiers 216 each with one or more resource dictionary identifiers 218 in a second binding map, binding map 2, so that when a theme 194 is selected at runtime, data for application to a property of a UI control 62 can be acquired by finding the address of the data through the use of the information contained in binding map 2, binding map 1 and the resource dictionary 212.

Figure 29:
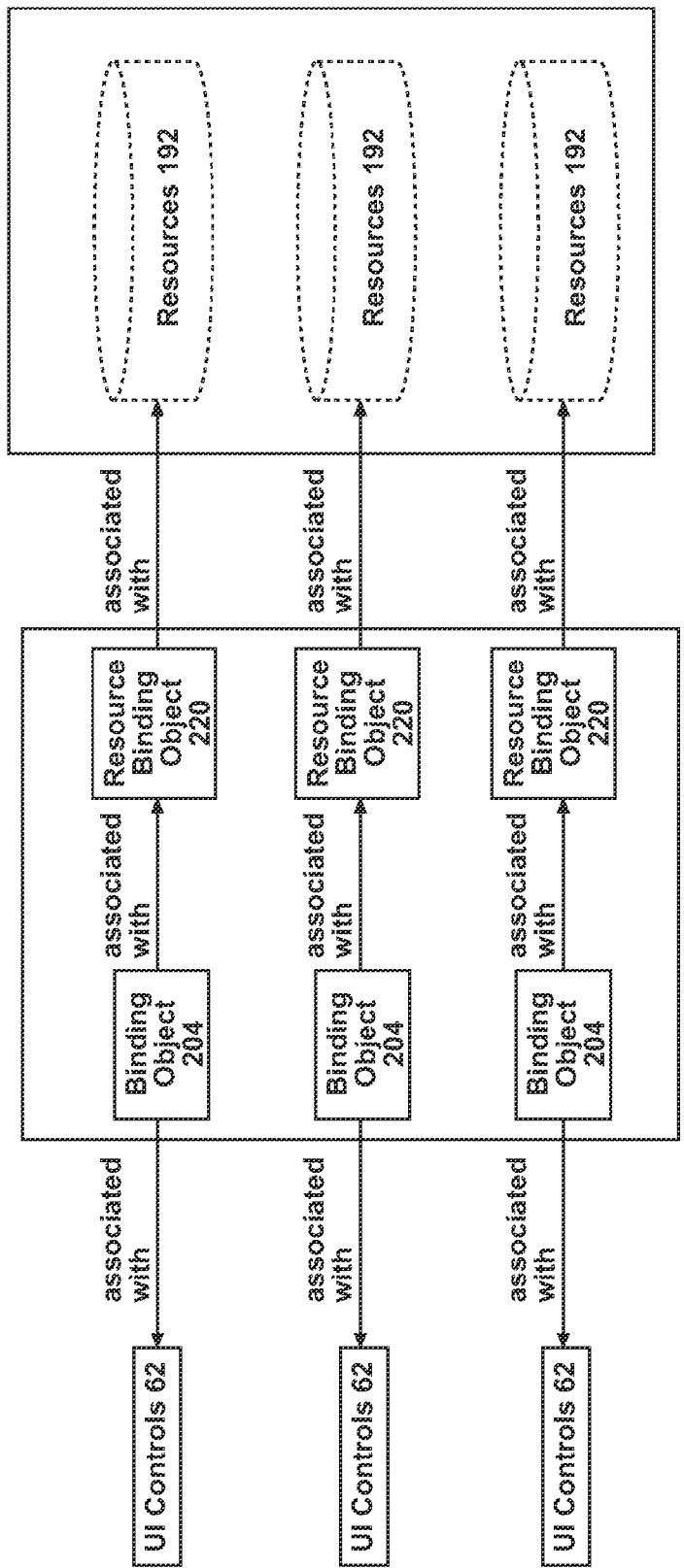
FIG. 29 is a schematic diagram showing multiple bindings created by an appliance development toolkit according to the invention for user interface controls in an appliance.

Referring still to FIG. 28, at runtime, the builder 200 reads the builder file 190 and creates the UI control objects and associates them as shown in FIG. 29 with data sources 204. Binding objects/data sources 204 are created for each unique data source identifier 206 in the builder file 190 and locator objects or resource binding objects 220 are created for each unique resource identifier 210 in the builder file 190. The binding objects 204 are associated with the properties of the UI control objects according to the builder file 190 and associated with the resource binding objects 220 according to the builder file 190 The addresses of file identifiers 214 associated with the resource identifiers 210 in the resource dictionaries 212 corresponding to the currently selected theme 194 are set into the resource binding objects 220 so that the resource binding objects 220 can acquire the data from the resources 192 when requested.

Using this arrangement, a theme manager 222 applies a newly selected theme 194 by creating new resource binding objects 220 and associating them with the appropriate binding objects 204 according to the information in the builder file 190. In this manner, a user 14 of the toolkit 10 can construct multiple mappings between resource data, UI control properties, data streams, animations, and media files, such that changing a the mappings results in a dynamic transformation to the graphical or multi-media interface 68 of an appliance 12.

There can be multiple types of resource binding objects 220. An SQL binding object will know how to execute SQL against a database found at the address of its associated locator resource binding object 220. A media binding object may know how to un-marshal a binary media file of a certain type. There can also be binding objects pointing to control system domain data 182 associated with the cycle of operation enabling either the UI control objects and or the animation definitions to interact with the appliance control system 90, appliance software framework 104, and cycle of operation.

A special type of resource 192 is a language resource. By choosing a theme 194, the graphical user interface 68 can transform between a first and second language. Also because of the many to many relationships between two or more of the theme identifiers 216, resource dictionaries 212, and resources identifiers 210 are composable, a theme 194 can have resources 192 supporting a Spanish Christmas, and another theme 194 could have resources 192 supporting a Spanish victory in the soccer World Cup, wherein there can be one resource dictionary 212 for the Spanish language, one for Christmas, and one for Soccer.

Animations 198 work the same way as do other resources 192. Animations 198 can have two binding points, an input and output. The output of an animation 198 is a function of its input value determined by its binding and its f(x) function, which can be any mathematical function. The binding to an animation is depicted in FIG. 28 wherein the animation is bound to two data sources 204 in the form of resource binding objects 220, as well as to an animation binding object. In effect, the animation 198 acts like a resource 192 of FIG. 29 having its input connected to one resource binding object and its output connect to anther resource binding object. When the theme manager 222 changes themed animations 198, it creates two new resource binding objects, sets an address of the new animation definitions (either input or output) into each of the new resource binding objects, and optionally loads the animation 198 into memory for execution.

Additionally, the toolkit 10 can construct resources 192 for access by the appliance software framework 104. The appliance 12 can also have an interface for receiving a new builder file 190 and/or new resources 192 and can either combine or interchange the new and the existing files so that the appliance 12 can be updated over time with new pages 202, new themes 194, new animations 198, and new resources 192.

Looking now to FIGS. 30-42, in a first embodiment, a hierarchy of objects starts with a single root object that we can call "root." The root object has 0 to n children and the children may be of different types (i.e., type 1 and type 2). In turn, the 0 to n children may also have children. Therefore, an object A that is a child of root and has children of B and C is considered to be both a child and a parent and can be referred to either as a child or a parent depending on the context. Except for the root, all objects in a hierarchy are a child and those with children are also parents. The root is a parent unless it has no children.

The first embodiment is a simple example of an implementation of a hierarchy wherein the parent child relationships are direct relationships. In a direct parent child relationship, the parent includes an identifier identifying each of its children. Therefore, the parent cannot be decoupled from its children because it comprises the identifiers of its children.

A second embodiment exemplifies an indirect parent child relationship wherein neither the parents nor the children include identifiers of the other. Instead, a holder object contains the identifiers of both. For example, object Q is a holder and contains an identifier of object A, object B, and object C, wherein object A is of type 1, object B is of type 2 and object C is of type 3. Objects A, B, and C do not have access to the identifiers of one another. The primary responsibility of object Q is to contain identifiers for objects A, B, and C thereby establishing that there is some type of relationship between objects A, B, and C. There are a number of ways that the nature of the relationship between A, B, and C can be ascertained. In a first example, object Q has access to information defining the possible relationships between objects of type 1, 2, and 3. In this example the information would define a first relationship definition between objects of type 1 and type 2 as being a parent—child relationship wherein type 1 must be the parent and type 2 must be the child. The information would also define a second relationship definition between objects of type 1 and objects of type 3 as being a parent—child relationship wherein type 1 must be the parent and type 3 must be the child. With the information, object Q can interpret the relationship between object A, B, and C as a parent with two children wherein A is the parent of children B and C.

A third embodiment exemplifies an alternate approach for creating an indirect parent child relationship wherein neither the parents nor the children include identifiers of the other. In this embodiment, multiple holders are used to create a holder hierarchy. For example, object Q is a holder and contains an identifier for object A. Object Q also contains an identifier for a second holder object X. Object X contains an identifier for object B. Holder object Q is a parent holder with respect to holder object X because holder object Q contains the identifier to holder object X. Therefore the relationship between object A and object B be can be inferred as a parent child relationship when observed from the perspective of holder object Q and holder object X because holder object Q are in a direct parent child relationship. In this case, object A and object B are in an indirect parent-child relationship.

Figure 30:
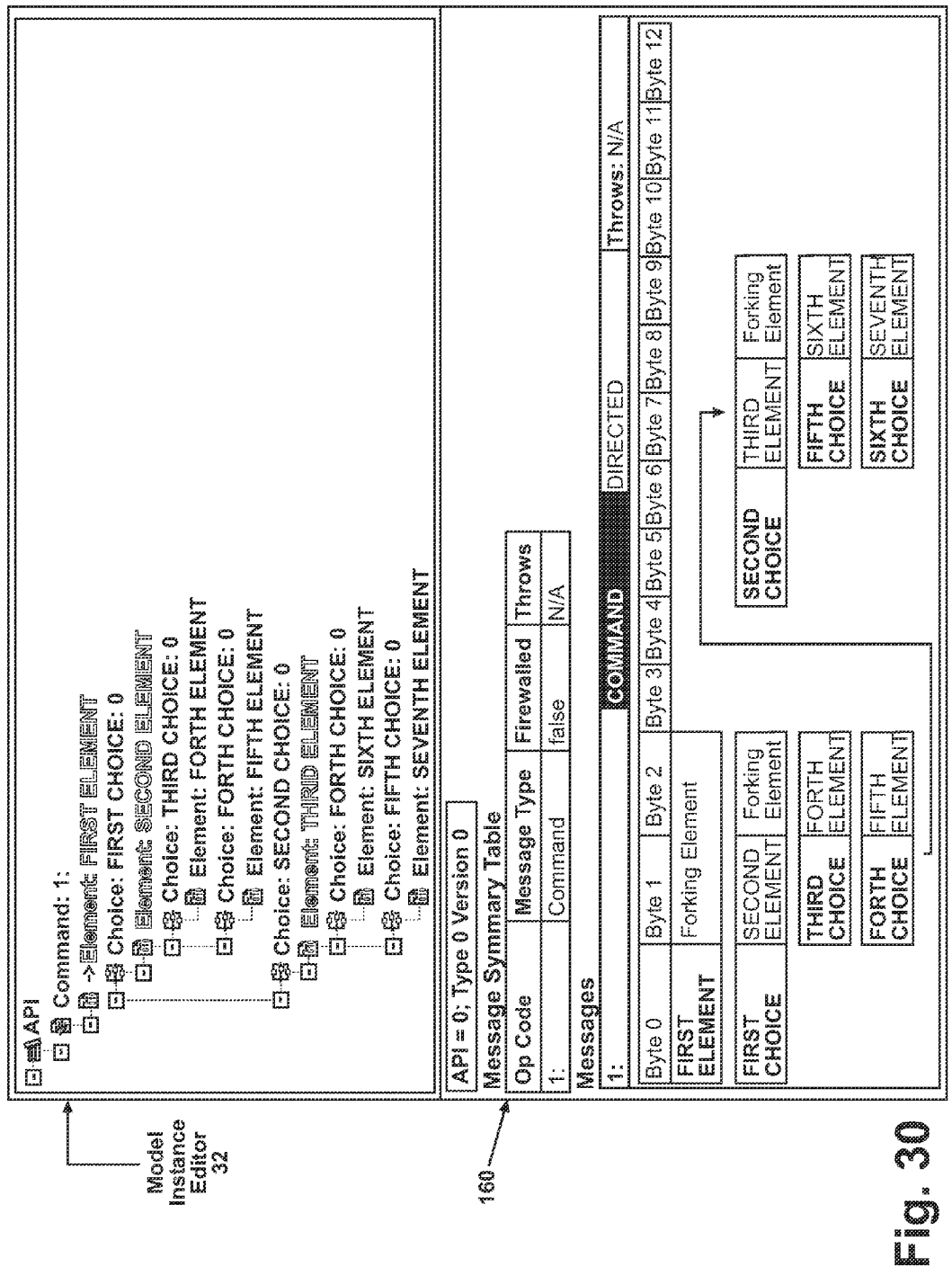
FIG. 30 is a schematic diagram showing the message structure of forking elements in an appliance development toolkit according to the invention.
Figure 31:
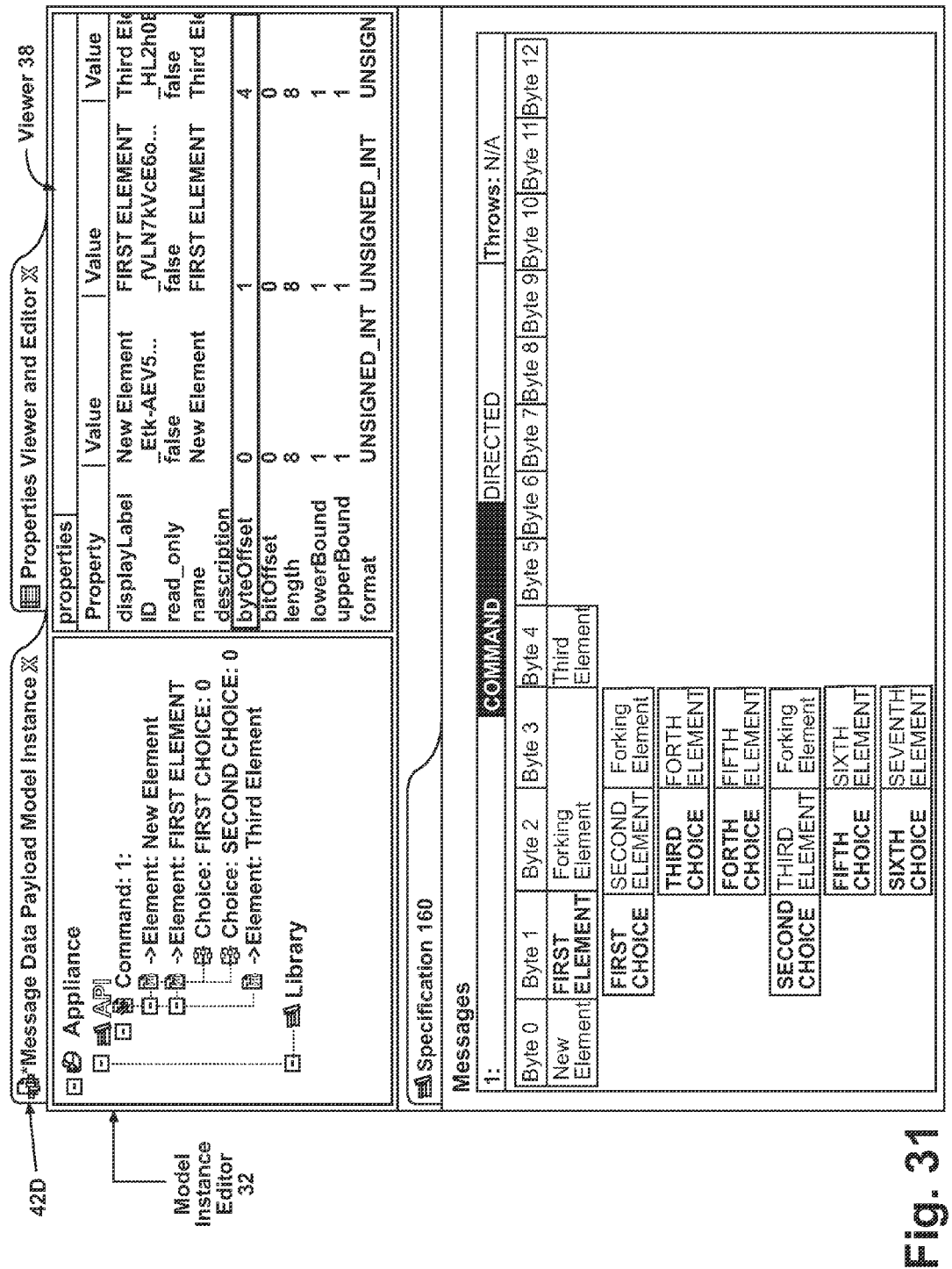
FIG. 31 is a screen shot of a model instance editor in an appliance development toolkit according to the invention showing a step in the creation of a message data payload with a forking element.
Figure 32:
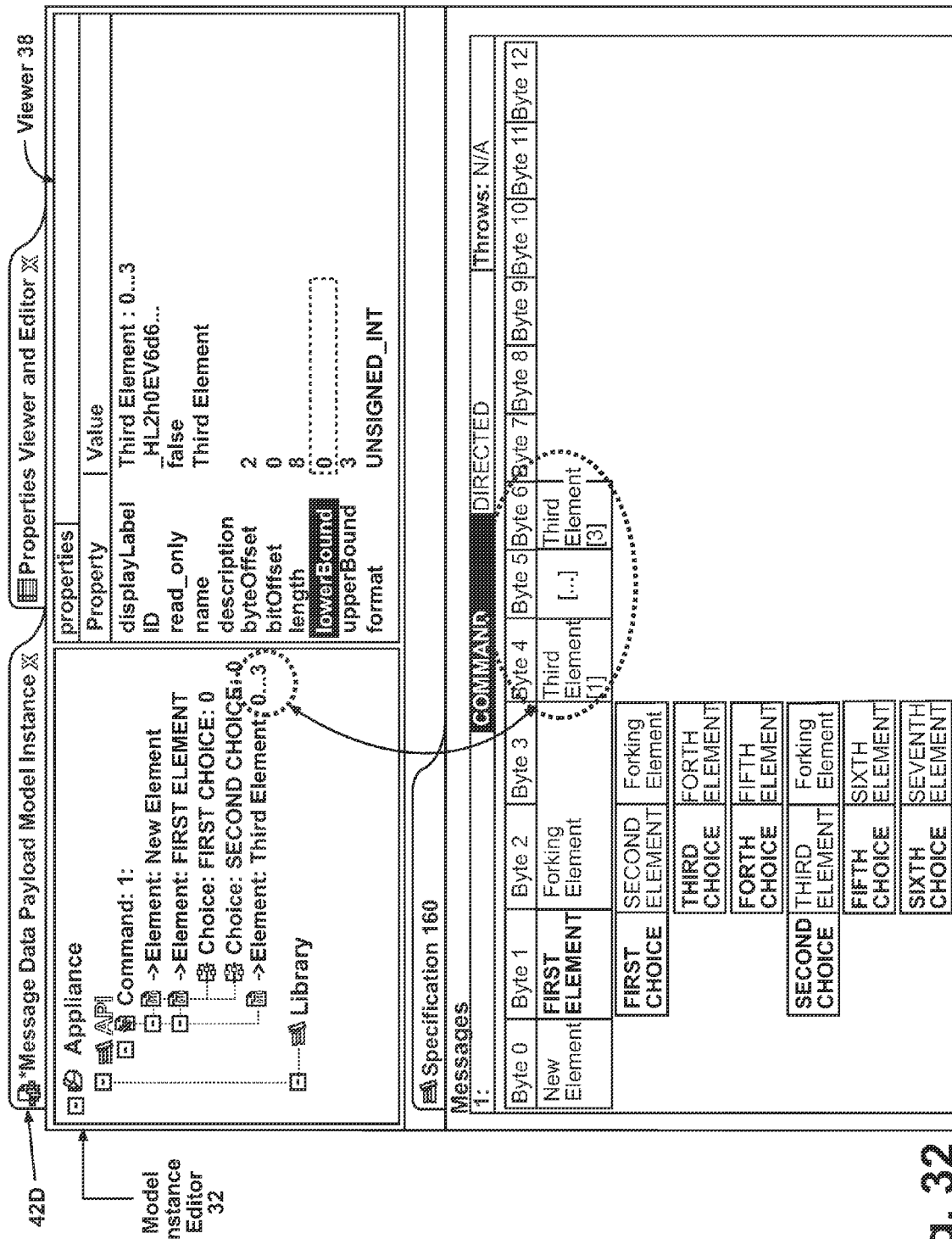
FIG. 32 is a screen shot of a model instance editor in an appliance development toolkit according to the invention showing another step in the creation of a message data payload with a forking element.

A forking element includes a hierarchy having a first parent object with at least two children where at least one of the two children has one or more second children and where the one or more second children have one or more third children. An interpreter of the first parent, the one of the two children, the one or more second children, and the one or more third children interprets the two children as valid values of the parent and interprets that the one or more second children is applicable to the hierarchy when the first parent is paired with the at least one of the two children that is the parent of the one or more second children FIG. 30 illustrates a set of direct parent child relationships having an example of a forking element as part of a message data payload model instance 42D. The First Element of Byte 0 has two valid values, First Choice and Second Choice. Second Element is a child of First Choice and Third Element is a child of Second Choice. Given this arrangement, when a message data payload 150 corresponding to the illustrated message data payload model instance 42D is transmitted on a network as part of a network message, the value of Byte 0 would determine the meaning of Byte 1. For example, if the useable data transmitted in Byte 0 corresponded to the first portion of useable data associated with First Choice, then an interpreter or user of the network message could ascertain that Byte 1 contained useable data associated with the second portion of the Second Element rather than Third Element.

In an extension of the first example exemplifying a nested forking element, the Second Element also has two children Third and Forth Choice respectively each having a child Forth and Fifth element respectively. Here an interpreter or user of the network message could ascertain the meaning of Byte 2 by looking at the useable data found in Byte 1 and associating the useable data of Byte 1 with corresponding second portion of Byte 2. For example if the useable data of Byte 1 corresponded to the useable data of Third Choice, an interpreter could then determine that the meaning of the useable data found in Byte 2 would correspond to the second portion of the Forth Element. A forking element comprising at least one additional forking element creates a nested forking element.

Figure 37:
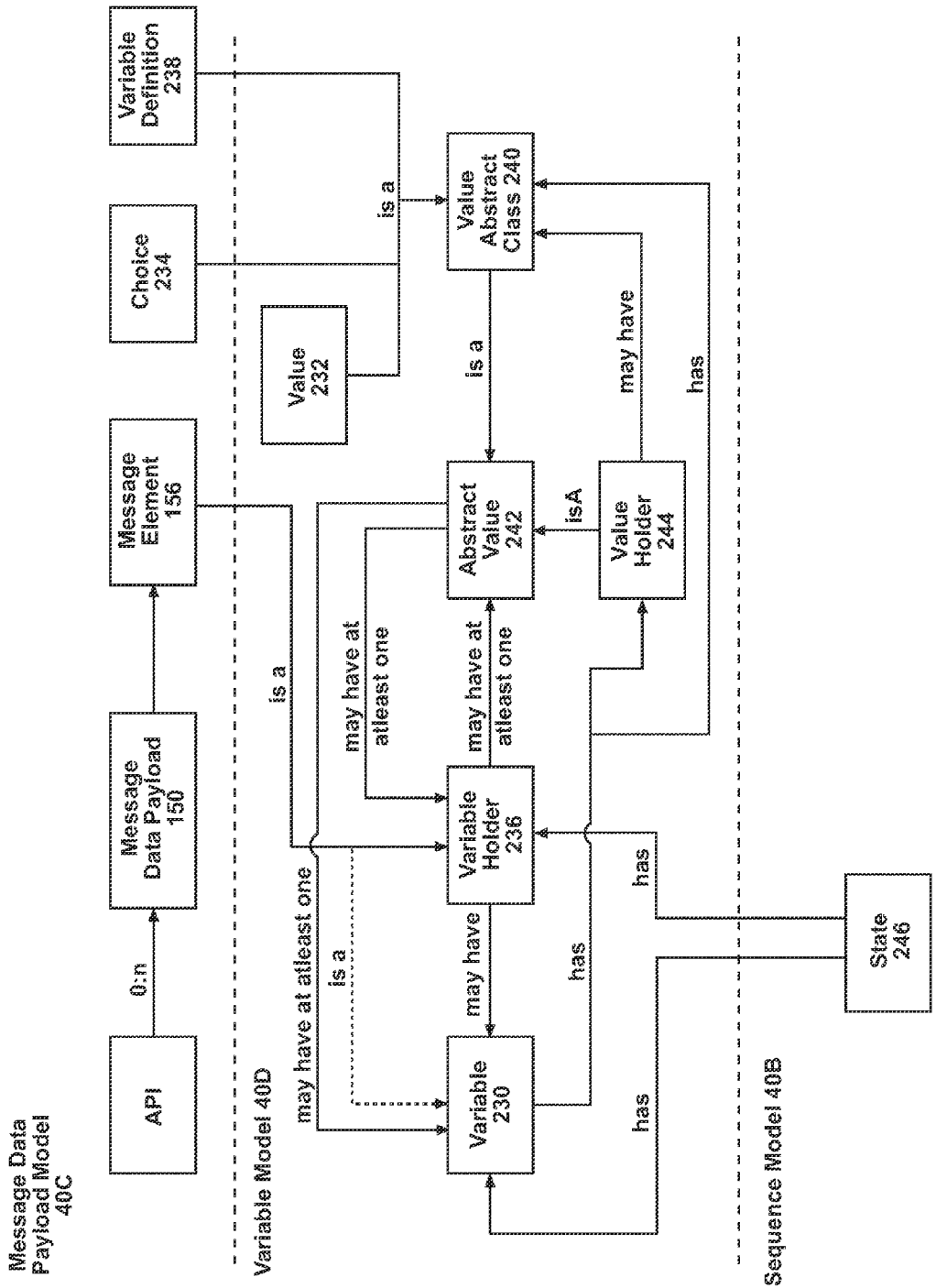
FIG. 37 is a schematic diagram showing the use of holders in different a variable model according to the invention.

FIG. 37 shows a plurality of models 40 that form a simplified UML class diagram that includes examples of relationship definitions including both direct and indirect parent child relationships. It should be noted that a UML class diagram defines possible relationships between future instances of objects derived from at least one class definition by depicting an arrangement of relationship definitions used to define relationships between class definitions where the possible relationships are a function of the relationship definitions. A UML class diagram is useful because the arrangement of and relationships between each of the future instances of objects derived from at least one class definition may be verified and or at least partially predicted using the UML diagram.

Generally, in an appliance runtime environment, variables 230 are identifiers which have an associated value 232 where different actors in the runtime system set the value 232 of the variable 230. However, FIG. 37 depicts additional possibilities for expanded use of variables 230 and their values 232 and illustrates the benefit of holders.

In some cases, a variable 230 can have a relationship with a value 232 where, for example, the relationship depicts a request for the variable 230 to be set to the value 232 at a future time. In other cases, a variable 230 could be associated with a plurality of values 232 in order to depict the possible values 232 of a variable 230 at some future time.

Yet in other cases, as in forking elements within a message data payload 150 or a capabilities definition, values 232 are parents of other variables 230. Relationships like this are useful to express hierarchies of choices 234, variable validation, payload validation, command validation, user interface behavior, etc. For example a hierarchy of choices 234 might have a root of question 1 with choices A and B as children, where choice A has a child of question 2 having choices of C and D as children. This hierarchy could be used to drive a wizard, such as the use and care guide 130, such that the answer to question 1 would dictate if another question would need to be asked. For example, if the answer to question 1 was choice A, then question 2 would need to be asked to get an answer of either choice C or choice D. However, if choice B were the answer of question 1, then no further questions would be necessary. Using this technique, the behavior of the wizard could be controlled by the capability definition and an answer sheet comprising the list of questions asked and the answers given could be validated using the capability definition.

Looking again at FIG. 37, the previous example illustrated by FIG. 30 can be understood in the context of the message data payload model 40C shown in FIG. 37. Also shown is that components of the message data payload model 40C extend or inherit from class definitions in variable model 40D. A message element 156 can be a variable 232 or it can be a variable holder 236. Also, choices 234 and variable definitions 238 extend a value abstract class 240.

Using the previous example of FIG. 30 and applying it the model of FIG. 37, a forking can occur when an abstract value 242, such as a choice 234, has a child of a variable 230, like a message element 156, which is shown to be a potential arrangement in that a choice 234 extends an abstract value 242 via abstract value class 240, and that abstract value 242 can have a variable 230 as a child, and that message element 156 extends or is a message element 156. These relationship definitions as shown in the simplified UML class diagram define the possibility to have message elements 156 having children of choices 234 with those choices 234 having children of other message elements 156 as shown in FIG. 30, which shows an instance of the message data payload model 40C of FIG. 37.

Figure 39:
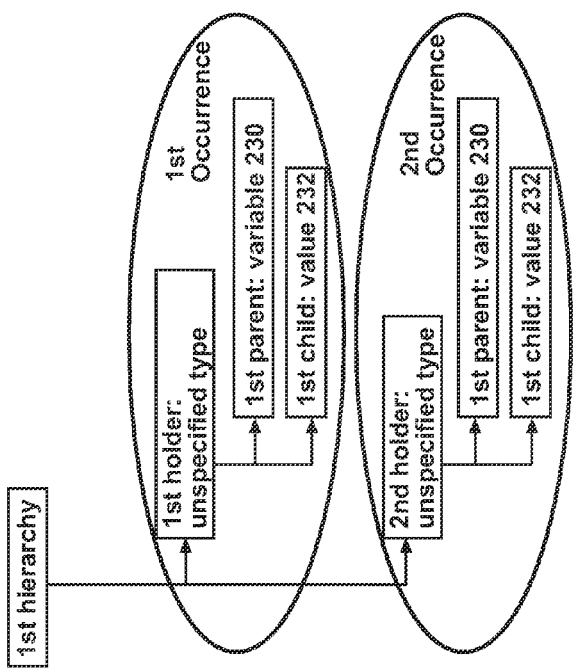
FIG. 39 is a schematic diagram showing a second scenario showing the use and relationships of holders.

However, it can be undesirable to have direct parent child relationships between variables 230 and their values 232 as shown in FIG. 30 and as allowed by the model 40D of FIG. 37. As shown in FIG. 37, a variable holder 236 can include a reference to a variable 230 and a value 232. In this way, an indirect parent child relationship can be formed as described in the second embodiment exemplifying an indirect parent child relationship (above) and as shown in the first and second occurrences of FIG. 39, where a first holder 236 holds a reference to a first parent variable 230 and a first child value 232 and a second holder 236 holds a reference to the first parent variable 230 and a second child value 232. FIG. 39 shows that by using the first and second holder objects, the first parent variable can participate in two different indirect parent child relationships; one with the first child value 232 and the other with the second child value 232.

Figure 40:
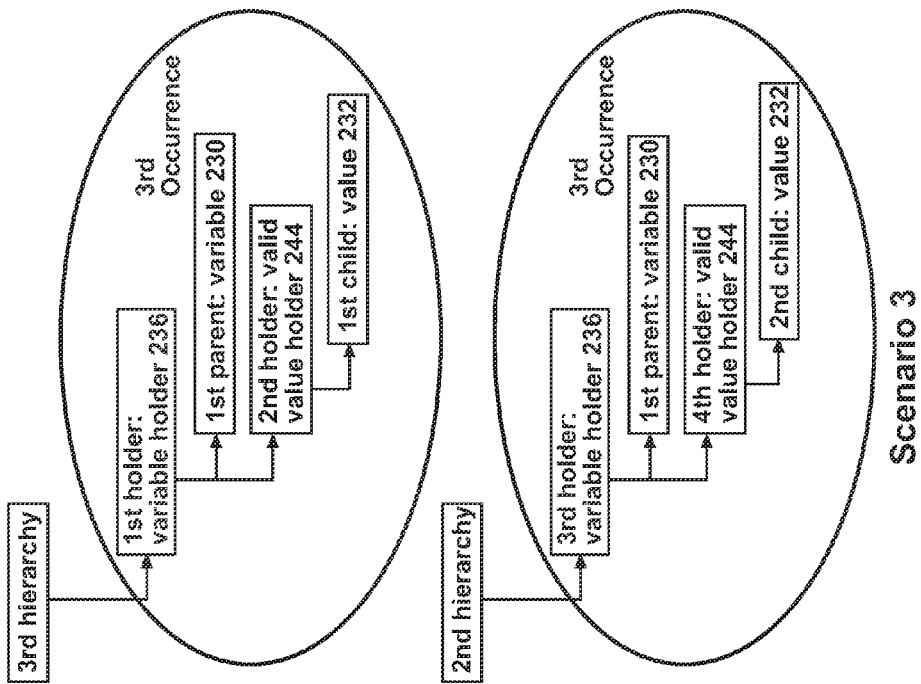
FIG. 40 is a schematic diagram showing a third scenario showing the use and relationships of holders.

Additionally, as shown in FIG. 37, another embodiment shows how an indirect parent child relationship can be formed. According to the figure, an instance of a variable holder 236 can also include a reference to an instance of an object that derives from the abstract value class 240, which includes value holder 244, value 232, variable definition 238, and choice 234. And an instance of value holder 244 can include a reference to an instance of an object that derives from value abstract class 240. In this way, an indirect parent-child relationship can be formed as described in the third embodiment exemplifying an indirect parent child relationship (above) and as shown in the third and forth occurrences of the third and second hierarchies in FIG. 40, respectively, where in the third occurrence, a first variable holder has a reference to or holds a first parent variable 230 and has a reference to or holds a second value holder 244 which then has a reference to or holds a first child value 232. In this way an indirect parent child relationship is formed between the first parent variable 230 and the first child value 232 via the direct parent child relationship between the first variable holder 236 and the second value holder 244. Likewise in the 2nd hierarchy, the first parent variable 230 is shown for a forth time in the forth occurrence (first and second occurrences from FIG. 39) in a similar indirect parent child relationship as is shown in the third hierarchy but with a second child value 232. FIG. 40 illustrates a variable 230 participating in two indirect parent child relationships where each relationship involves a different child by using variable holders 236 and value holders 244 as prescribed by the variable model 40D of FIG. 37.

Additionally, as shown in FIG. 37, the value abstract class 240 is defined as having a direct parent child relationship with variable holders 236 or variable 230. This is the enabling model relationship definition that supports the forking element of FIG. 30 as well as the relationship between Value: Wool: 4 and Attribute: Delay: Default=0 of FIG. 38.

Figure 38:
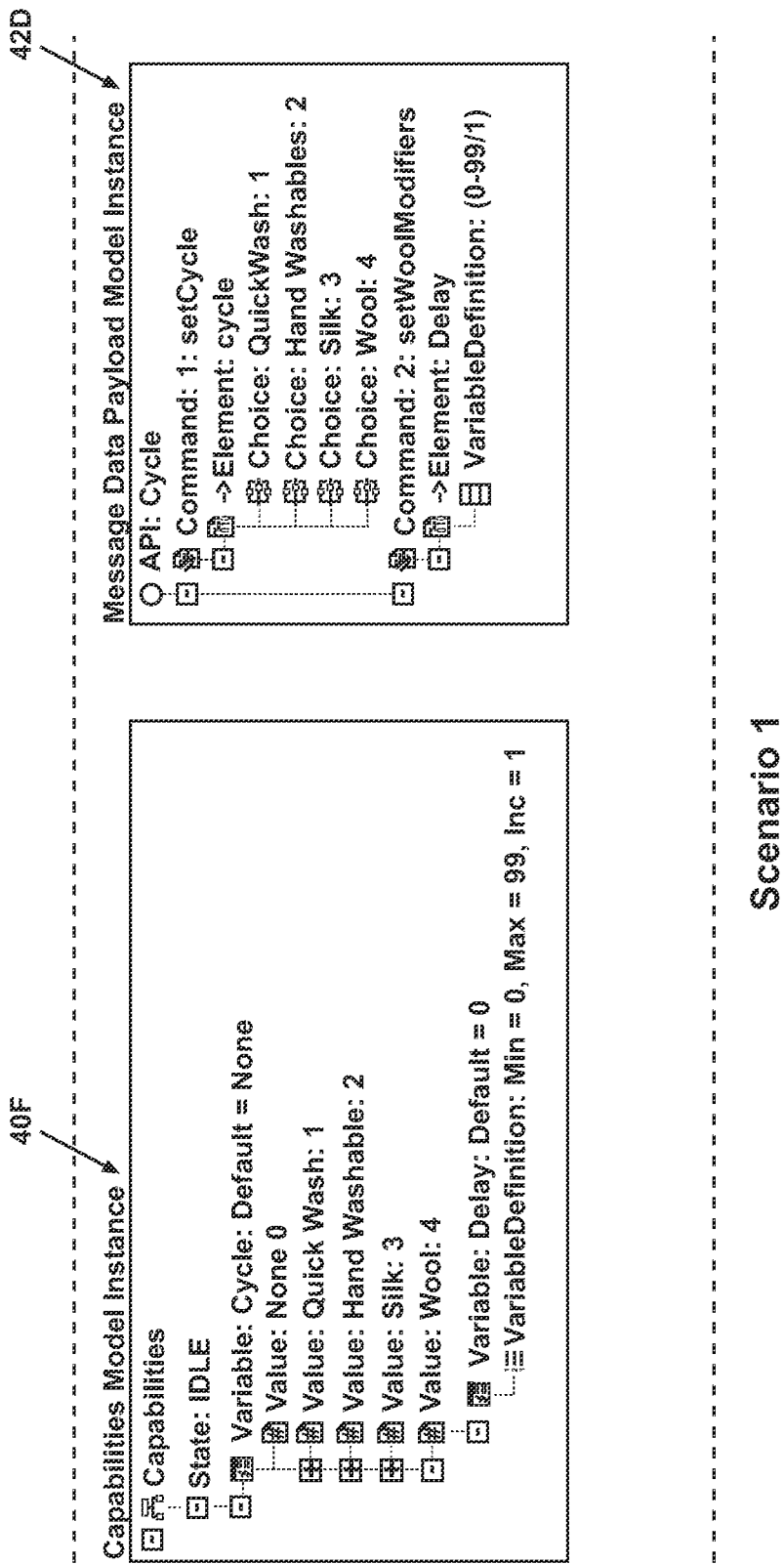
FIG. 38 is a schematic diagram showing a first scenario showing the relationships of variables.

FIG. 37 also illustrates the model 40 for the capabilities model 40F of an appliance 12. FIG. 38 illustrates a capabilities model instance 40F comprising a hierarchy of variables 230 to values 232 and variables 230 to variable definitions 238 in repeating direct parent child relationships. This hierarchy known as a capabilities tree is a child of the state 246 object idle, meaning that when the appliance 12 is in an idle state, the hierarchy contained by state object idle represents the operational capabilities of the appliance 12 from a command and control perspective. From the command perspective, all valid commands can be derived by observing and interpreting the hierarchy. A command, in its simplest form, is a message that results in one appliance variable 230 being set to a value 232. The variable 230 and the value 232 together are referred to as a paired element 252 (also shown in FIG. 41). In many cases however, a valid command to an appliance 12 includes a plurality of interdependent variables 230 each having a value 232 selected from a plurality of valid values 232 and wherein the selection of the values 232 determines a portion of the other interdependent variables 230 that also must be specified with a value 232 to form a well formed command or command container 250.

Figure 41:
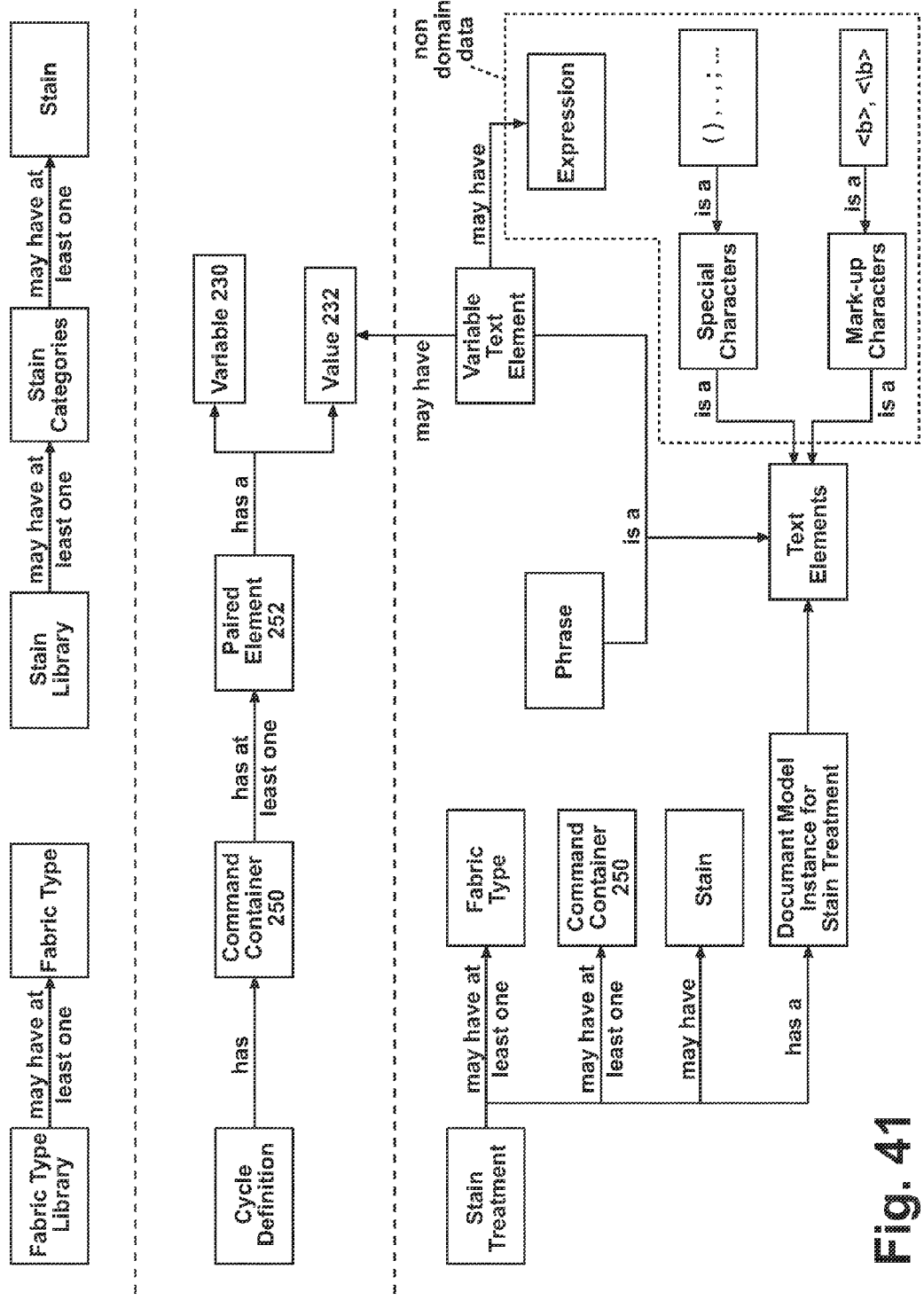
FIG. 41 is a schematic diagram showing the use of paired elements in stain treatment in an appliance according to the invention.
Figure 42:
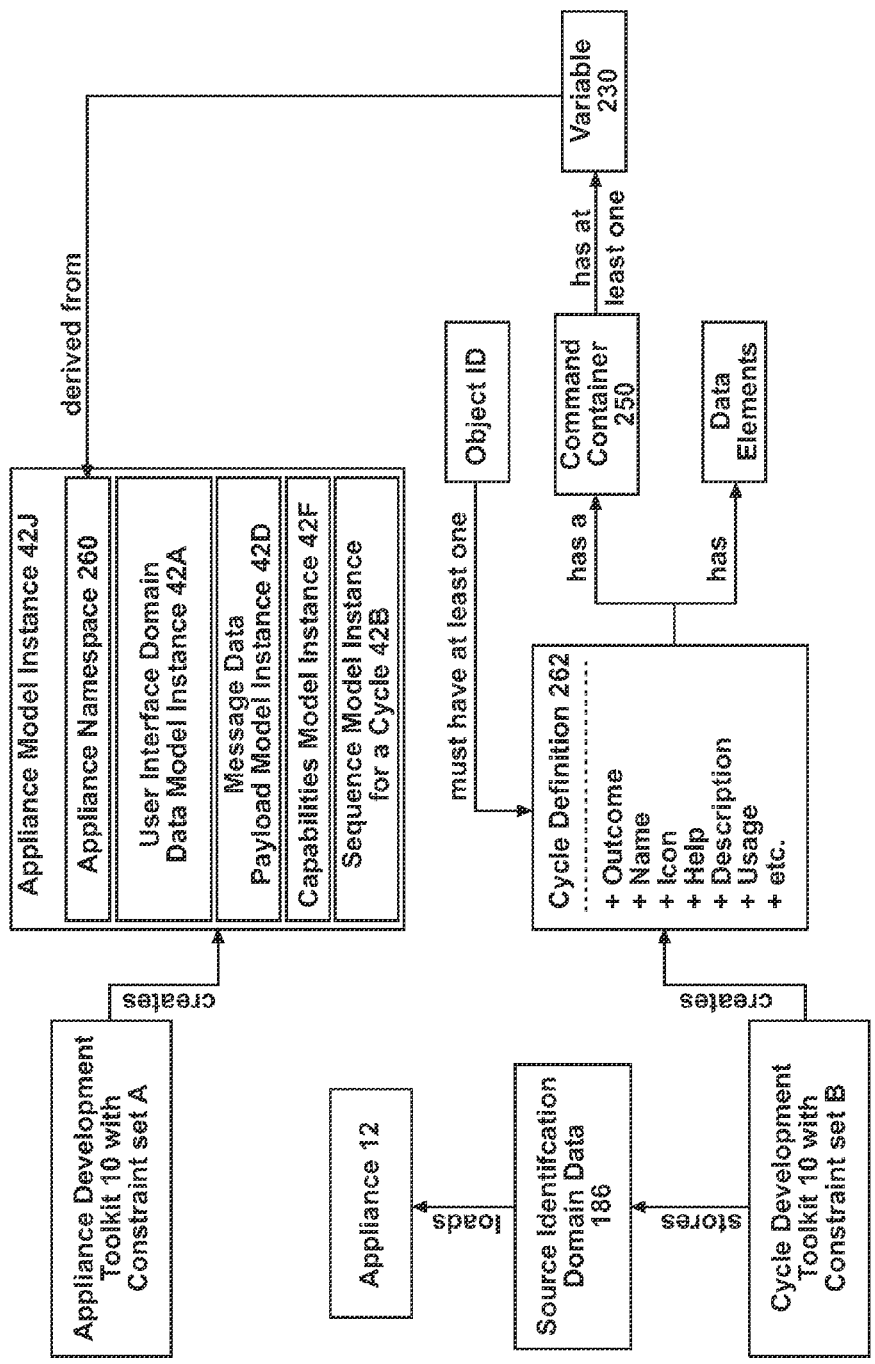
FIG. 42 is a schematic diagram showing the use of development toolkits according to the invention with an appliance in the creation of cycle instances for the appliance.

As previously described in the hierarchy of choices 234 example, the appliance capabilities model 40F can be used to determine what additional interdependent variables 230 must be included in a command container 250 based on the selected value 232 of each variable 230. Command containers 250 have at least one paired element 252. A command container 250 may be validated by traversing the capability tree to observe and verify that each of the variables 230 or variable holders 236 in the command container 250 is one of a root of the tree and a parent in the tree wherein the parent is a value 232 or value holder 244 as part of the plurality of paired elements 252, to observe and verify that each paired element 252 is located at one of the root or a direct descendent of another paired element 252 connected to the root, and to observe and verify that at least one paired element 252 comprises a value 232 or value holder 244 as a leaf node of the tree. As shown in FIGS. 41 and 42, a cycle definition, then, includes a command container 250 wherein the content 20 of the command container 250 affects the cycle of operation of the appliance 12 when the appliance 12 runtime sets the variables 230 specified by the command container 250 to the values 232 specified in the command container 250. Other information included in the cycle definition can be used for graphical user interface 68 rendering and other non-control system domain purposes.

The capabilities model instance 42F of FIG. 38 is an example of using only direct parent child relationships between variables 230 and values 232. However, according to FIG. 37, a different embodiment using variable holders 236 and value holders 244 can be constructed (similar to FIG. 40) where the capabilities model instance 42F would comprise variable holders 236, variables 230, value holders 244, and values 232.

It is apparent, by observing FIG. 38, how value holders 244 and variable holders 236 could provide improvement to the compatibility of the two model instances 42D, 42F. Just as in FIG. 37, the variable model 40D provides some common base classes for use by the message data payload model 40C and the capabilities model 40, Content 20 includes variables 230 and values 232 arranged in a nested repeating hierarchy of alternate levels of variables 230 having values 232 and value having variables 230. However, because direct parent child relationships are used in the model instances 42D, 42F, herein referred to as scenario 1, there is less reuse than could be accomplished if variable holder 236 and/or value holders 244 were used as in scenario 2 and scenario 3 of FIGS. 39 and 40, respectively. Referring the variable 'Cycle' in the capabilities model instance 42F and the element 'cycle' in the message data payload model instance 42D, it can be observed that these two information elements are the same logical entity. In both cases, the elements refer to the memory variable 230 in the appliance runtime which corresponds to one of the selected, request, and active cycle of the appliance 12. However, the capabilities model instance 42F contains a complete validation hierarchy as exemplified by the 'Delay' variable 230 underneath the 'Wool' value 232. By contrast, the message data payload model instance 42D on the right has two hierarchies, one for the 'cycle' and one for the 'Delay' because the designer of this context made a choice to arrange the information into separate hierarchies. Therefore, because the information is in multiple hierarchies and is partitioned and organized differently, the information must be duplicated in separate information elements as shown in Scenario 1.

However, if the information were created using the previously described technique of Scenario 3 of FIG. 40, the information would not require duplication and the information elements or identifiers thereof (i.e. variables 230, values 232, message elements 156, choices 234, variable definitions 238, etc.) could be re-used throughout multiple hierarchies each have a different context. Using this approach then, the multiple contexts can leverage information from the multiple contexts because there are common or shared objects within those contexts which can be used to gather information across multiple contexts by using the shared objects as navigation objects for jumping from and jumping to different contexts. This is further explained and exemplified by FIG. 40 and the description thereof.

For example, an appliance 12 can communicate its operational capabilities to a client by sending a capabilities model instance 42F to the client. The client can then form a command container 250 and send that command container 250 back to the appliance 12. The appliance 12 can take the variables 230 from the paired elements 252 of the command container 250 and validate the command container 250 by traversing the capabilities tree as previously described. Once validated, the appliance 12 can automatically convert the command container 250 into one or more message data payloads 150 for constructing network messages to execute the command container 250 across multiple control boards communicating on the communications network 18. This automatic conversion and validation is enabled by using variable holders 236 and value holders 244 to construct the capabilities and message data payload model instances, 42F and 42D, respectively.

When variables 230 and values 232 participate in more than one hierarchy, wherein each hierarchy has a context different from the other hierarchies, it is difficult to only use direct parent child relationships. For this reason, the UML class diagram of FIG. 37 depicts a variable model 40D wherein a user 14 can use either of the at least one variable holder 236 and the at least one value holder 244 in creating at least one hierarchy of elements for content 20 independent of any relationship that may otherwise exist between the variable 230 and other elements and between the value 232 and other elements so that the variable 230 and the value 232 can be used in different contexts with different relationships while maintaining their relationship with each other via the at least one variable holder 236 and the at least one value holder 244.

FIG. 42 depicts the use of an appliance development toolkit 10 a first set of constraints creating a first set of content 20 with which a second user 14 using an appliance development toolkit 10 having a second set of constraints could use to create a cycle definition 262. As previously described a cycle definition 262 includes a command container 250 with at least one pair element 252 derived from a collection of appliance variables 230 and values 232. The appliance namespace includes a collection of uniquely identifiable and meaningful variables 230 for an appliance 12. Therefore the user 14 of the toolkit 10 with the second set of constraints could create a cycle definition 262 by selecting data from the appliance model instance 42J shown in FIG. 42, which comprises a plurality of model instances 42 used by the appliance 12, and specifically from the appliance namespace 260. As the user 14 constructs the cycle definition 262, the toolkit 10 can validate the cycle definition 262 using the capabilities model instance 42F. The user 14 can associate data about the cycle definition 262 including source identification domain data 186 which includes brand emblems and other licensable data or other data including usage text, help, and one or more identifiers of persons, consumables, and articles, and the like.

Figure 43:
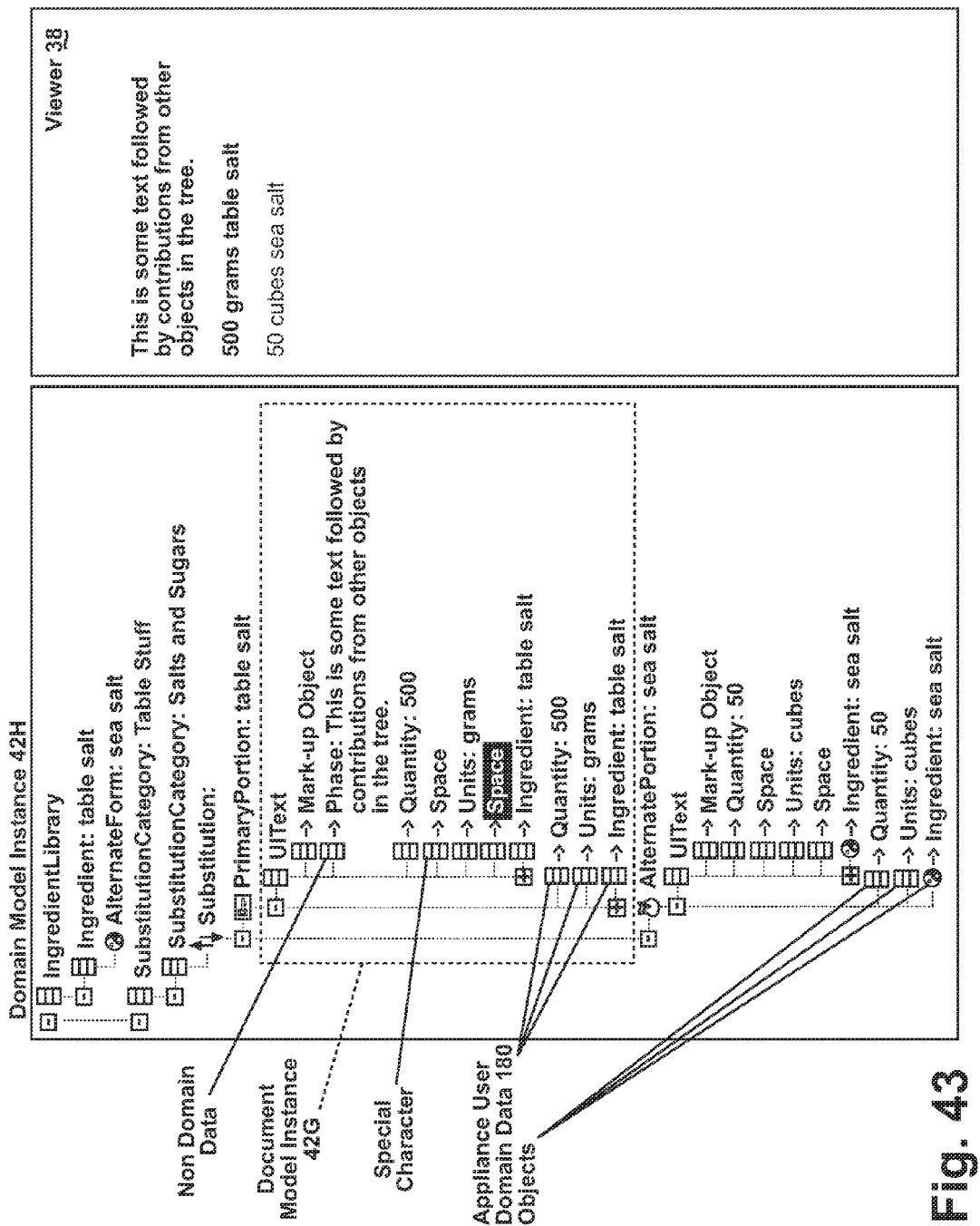
FIG. 43 is a schematic diagram of a substitution model instance created according to the invention.

FIG. 43 illustrates the use of a document model instance 42G within a domain model instance 42H interacting with a converter 34 to create content 20 for display in a viewer 38. The purpose of a document model (not shown) is to enable a user 14 to use the model instance editor 32 to create and view content 20 associated with a domain model instance 42H within the system configurator 28 before final export to a content target 22. In a sense, the viewer 38 is a content target simulator 52.

A domain model (not shown) is an abstraction or model 40 associated with real world constructs like cars, buildings, trees, law, language, media, finance, and just about any topical concept imaginable without respect to non-domain concerns like formatting, language, style, persistence form and the like.

In FIG. 43 the domain model instance 42H is an ingredient substitution model and the non-domain model instance is the contained document model instance 42G shown in the dashed box. As shown, the document model instance 42G is an arrangement of objects (shown under the UIText object) including markup objects for formatting, special objects for creating spaces or punctuation, text objects for creating static content 20, and domain objects able to contribute content 20 based on their properties, functionality, and composition.

A converter 34 traverses the arrangement to create html content 20 for the internet browser based viewer 38 on the right. In this way, a user 14 can specify the behavior of the content target 22 with respect to the content 20 by creating data for simulation of the content target 22. Additionally, viewing the content 20 aids the user 14 in understanding the meaning of the domain model 40H in that a portion of the viewable content 20 is a function of the domain model 40H. Therefore the content 20 and viewer 38 together help the user 14 validate and verify the composition of the domain model 40H.

Figure 44:
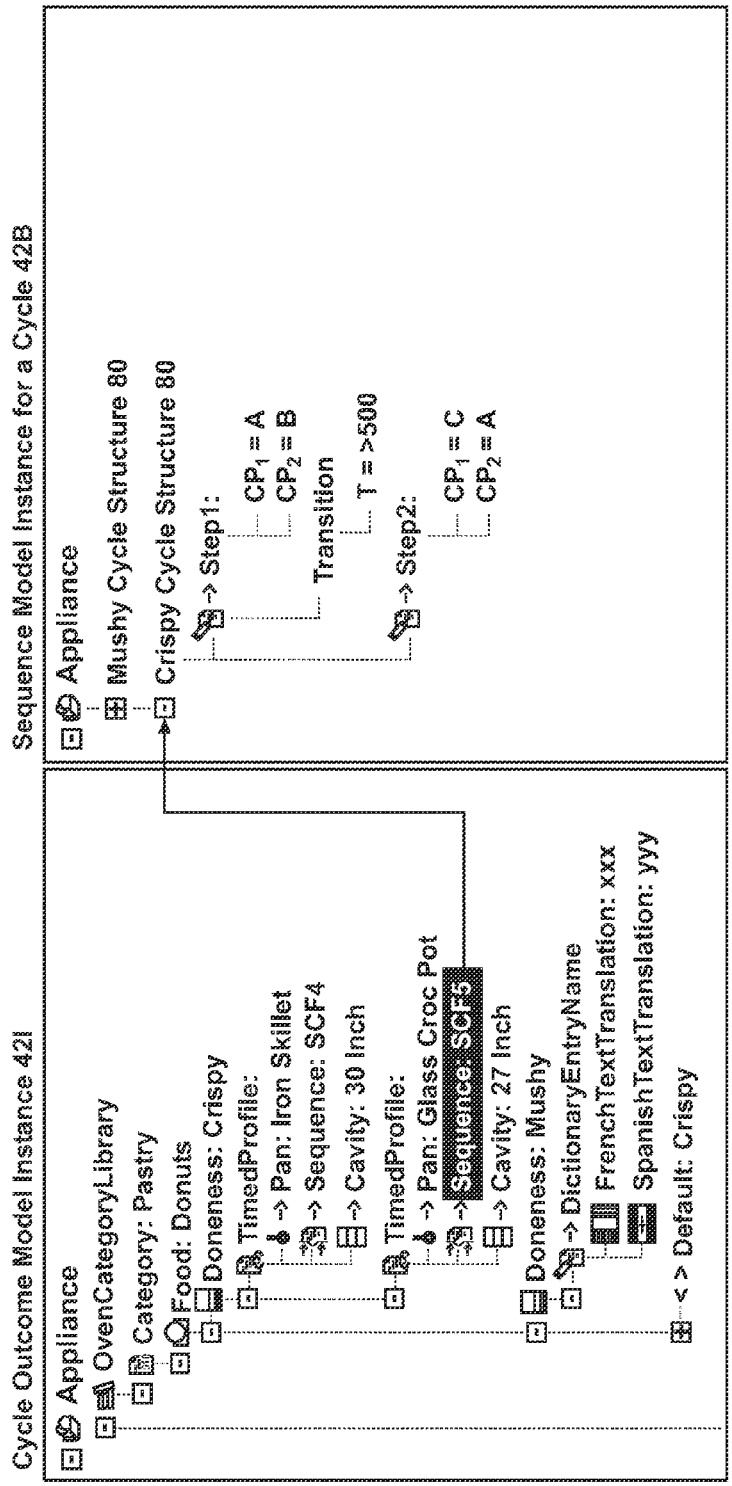
FIG. 44 is a schematic diagram showing the relationship between a cycle outcome model instance and sequence model instance according to the invention.

FIG. 44 depicts binding between appliance user domain data 180 and appliance control system domain data 182. As shown, a cycle outcome model instance 42I for cooking comprising a food identifier, a vessel identifier and a doneness identifier is bound to a cycle structure 80 identified by SCF5 wherein when the content 20 is generated for the appliance 12 from the cycle outcome model instance 42I and the sequence model instance for a cycle 42B, and appliance control functionality of FIG. 8 is created by the appliance software framework 104 of FIG. 7 and FIG. 28. A user 14 can affect the cycle of operation by selecting elements of the user interface domain data 184 rendered on the user interface 68 and bound to the cycle structure 80 identified by SCF5.

Figure 45:
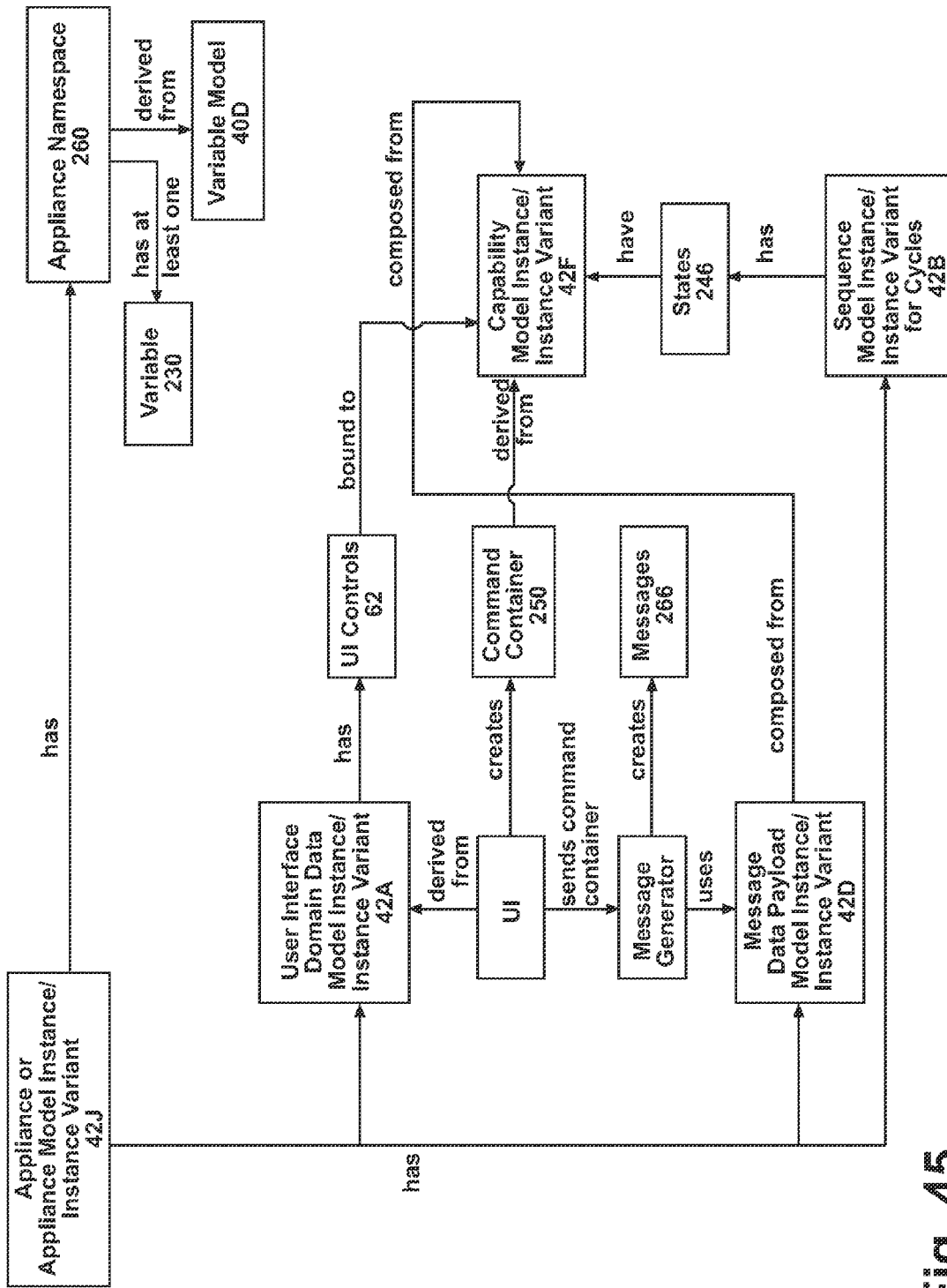
FIG. 45 is a schematic diagram showing the relationship among instance variants, user interface controls, and models according to the invention.

In this way, the graphical user interface 68 of FIG. 46 can display the source identification domain data 186 and other data on the user interface 64 of the appliance 12 in response to the identifiers either sensed from a sensor like a scanner or selected via the appliance user interface 64. Moreover, as previously discussed, the cycle definition 262 can be automatically translated into transmittable network messages 266 by a message generator 264 of FIG. 45 using the message data payload model instance 42D of FIG. 42 and FIG. 45.

FIG. 47 shows an example of how an appliance development toolkit 10 according to the invention is used in interaction with a user 14 and an appliance 12 to diagnose an appliance 12. It further shows additional examples of the use of a constrained toolkit 10 using model instances 42 as the constraining component. The toolkit 10 is configured to create one or more test scripts 270 having at least two steps, each step being separated from its adjacent steps by a transition condition that includes a logic expression resolvable to a Boolean transition value, at least one command statement associated with one of the at least two steps that instructs what should happen when the at least one step is the current step so that a test engine can execute the at least one command statement contemporaneous with the transition of the at least one step from the current step to the next step. The toolkit 10 also provides information associated with at least one message element 156 in a message data payload 50 so that the message data payload 50 is uniquely identifiable within a universe of pre-defined message data payloads 50 for the appliance 12. (See the foregoing discussion of identifiers.) A converter 34 will place the test script 270 into a form to be readable or at least useable in diagnosing an appliance 12.

There will be associations of command statements and message elements 156 created by the toolkit 10 so that a test engine application 50A can create a command container 250 based on the test script. Command statements will include such things as questions to a user such as shown in FIGS. 11-15. Holders 236, 244 as discussed elsewhere are useful tools for the editor 10 to effect flexibility in creating command sequences for the test script 270. The test engine application 50A is configured to observe subsequent network messages 266 and relate those to a transition logic in the test script 270, and to evaluate the logic for transition to the next step as it traverses a hierarchy in the test script 270.

In one embodiment, a second a communications driver can be configured to establish a communication link with the test engine application 50A, and a fault tree tool application 50B is configured to access one or more fault trees 110 to construct a command container 250 on instructions in the fault tree(s) 110 and to convey the command container 250 to the test engine application 50A via the second communication link during execution of a command statement in the fault tree 110.

So it can be seen that a model instance editor 32 can use the message data payload model instance 42D to create the data that a model instance editor 32 uses, along with a sequence model instance for tests 42K, to create the test script (which is a sequence model instance variant). The test engine application 50A uses the test script 270 in communication with a smart coupler 56, such as a smart cable, to communicate with the appliance 12 and with the user 14. Meanwhile a model instance editor 32 uses a sequence model instance for a fault tree 42C to create a sequence model instance variant, such as a fault tree, that a fault tree tool application 50B uses in interaction with the user 14.

A sequence model instance for tests 42K is similar to other instances using the sequence model 40B in that it allows the user 14 to create a set of steps separated by transition conditions having logic to drive the condition where each step has an associated action specifying the tasks to be done in that step. A sequence model instance for tests 42K can use message data payload model instances 42D as constraining elements for the actions in each step. This is accomplished in a similar fashion previously described for FIG. 27 wherein the message data payload model instance 42D is used to constrain a sequence model instance for a cycle 42B.

Referring back to FIG. 47, the sequence model instance for a fault tree 42C is constrained as well using the sequence model instance for tests 42K wherein each test in the sequence model instance for tests 42K might have an identifier or an identifying test object that can be bound to the action of a step in the sequence model instance for a fault tree 42C at tool time such that when the fault tree tool application 50B reaches a step wherein a test script 270 should be executed, it can communicate with the test engine application 50A to invoke the test script 270 corresponding to the identification of the test object at runtime.

The test engine application 50A, having been previously constrained by elements from the message data payload model instance 42D and having actions of steps bound to message data payload model instances 42D can use the binding to automatically construct and transmit useable messages 266 from the test engine application 50A to the appliance 12 using the method as previously described for cycle definition 262 translation to message data payloads 150.

Figure 23:
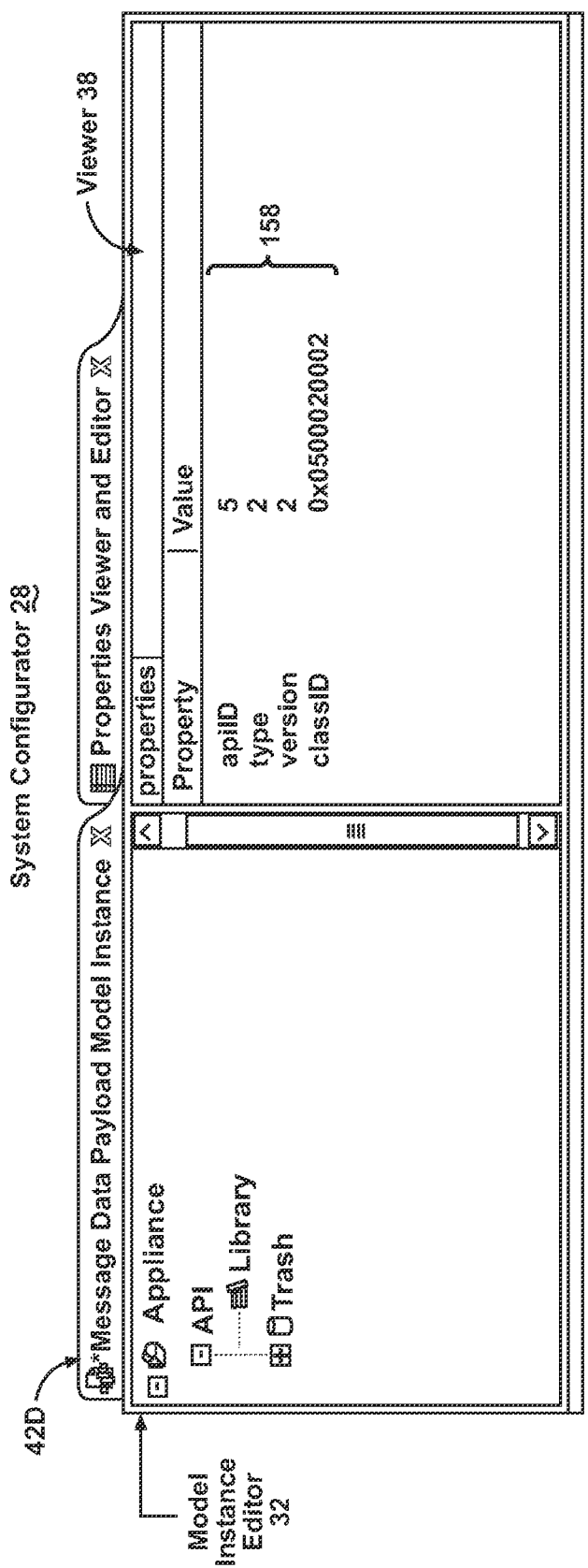
FIG. 23 is a screen shot of a model instance editor in an appliance development toolkit according to the invention showing another step in the creation of a message data payload.
Figure 48:
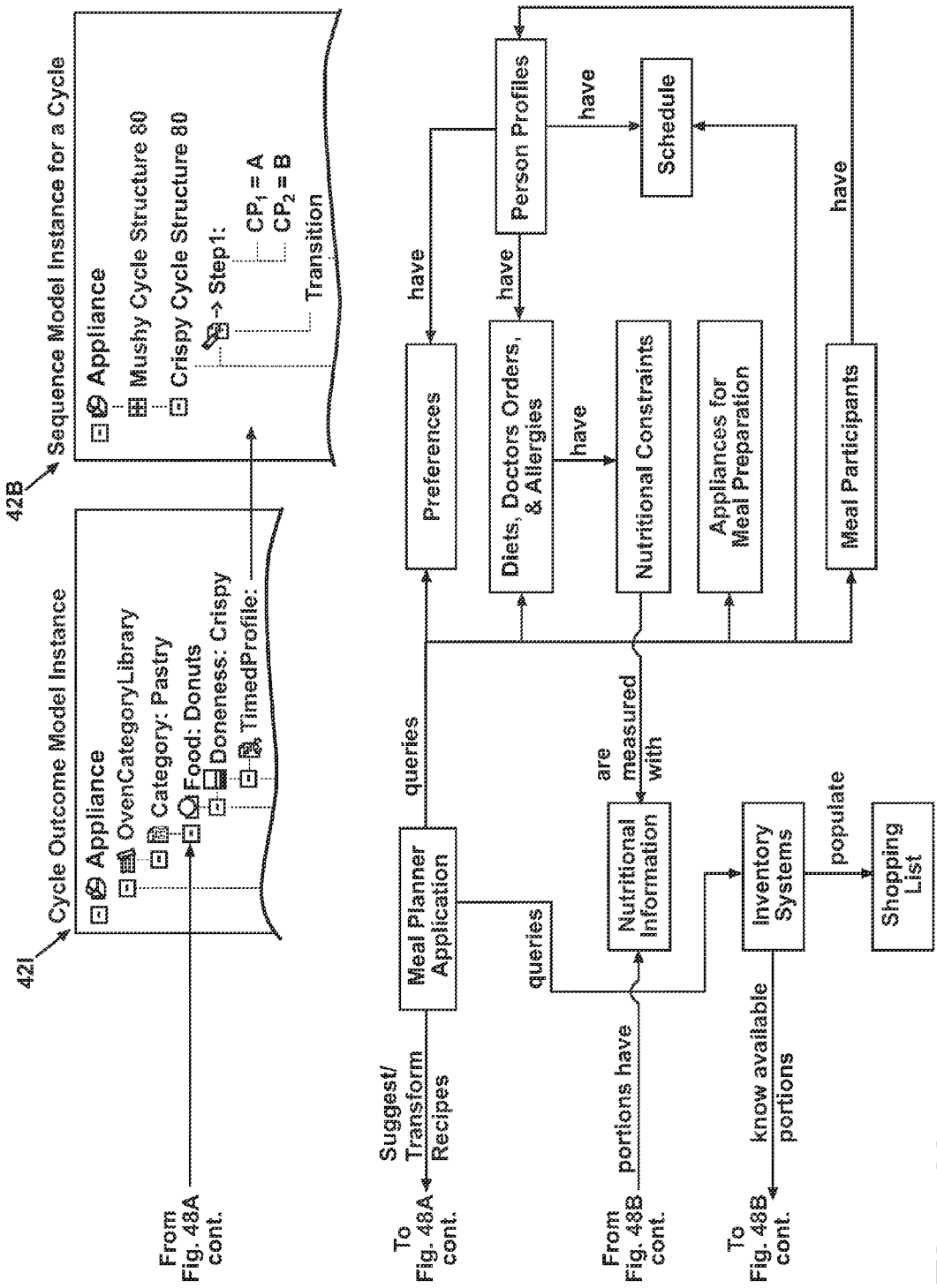
FIG. 48 is a schematic diagram showing the use of sequence model instances and cycle outcome model instances in meal planning according to the invention.
Figure 48A:
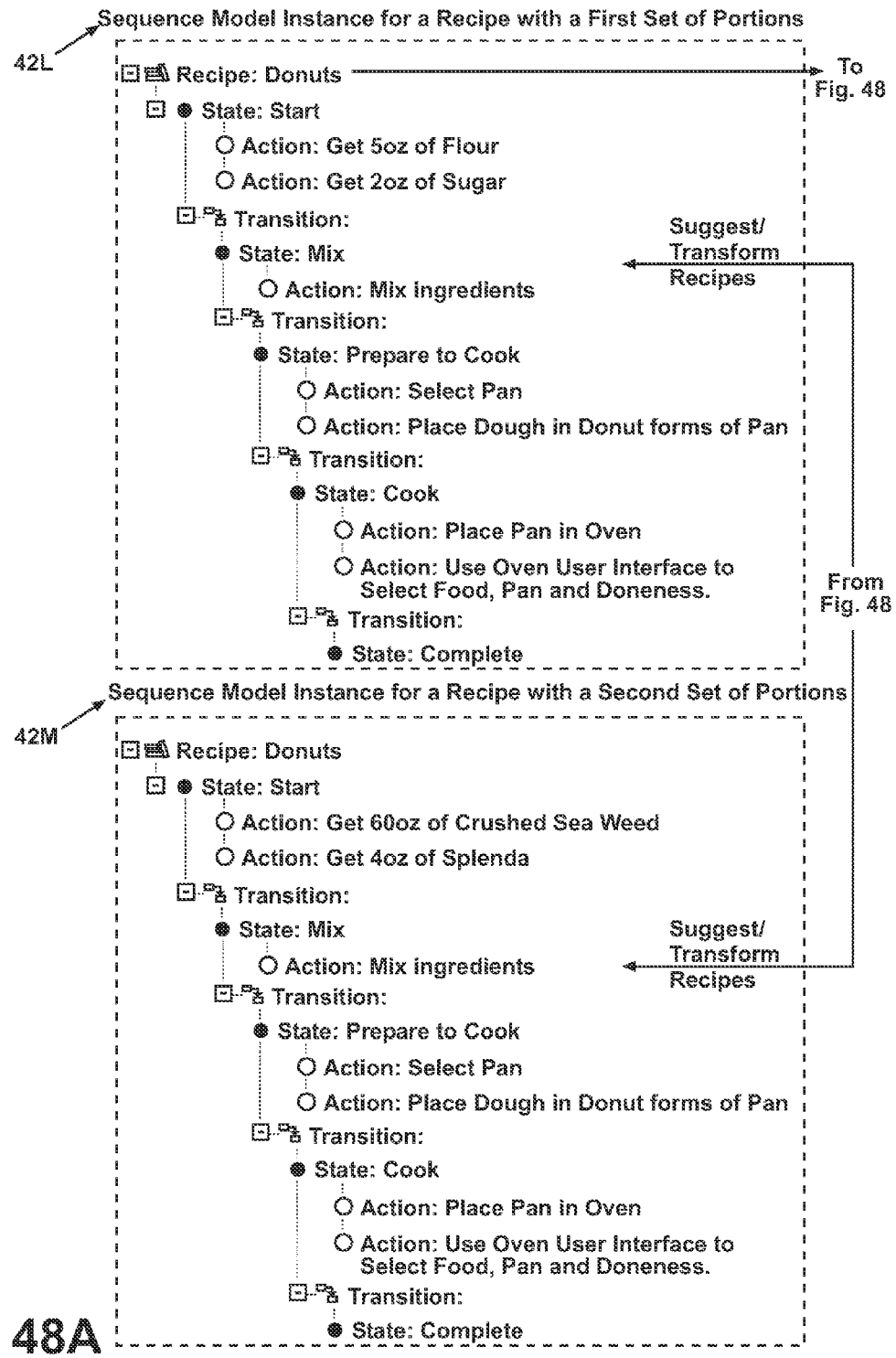
FIG. 48A illustrates a sequence model instance for recipes in FIG. 48.
Figure 48B:
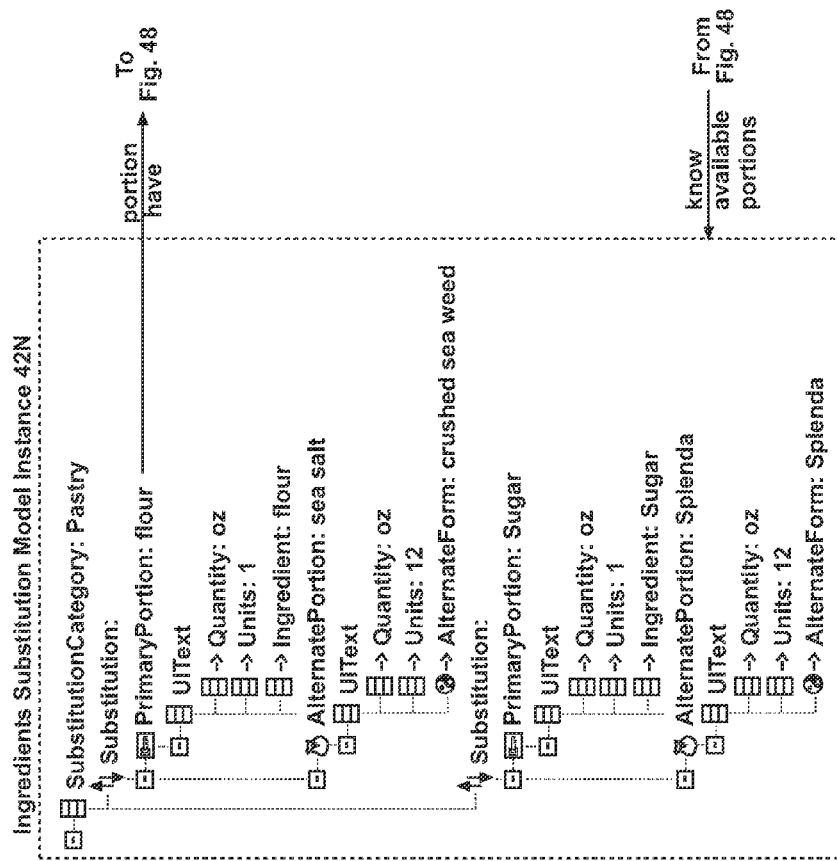
FIG. 48B illustrates a sequence model instance for substitutions in FIG. 48.

FIGS. 48, 48A, and 48B illustrate binding between multiple instances of user domain data 180 to control system domain data 182, which is illustrated at a high level in FIG. 23. The control system domain data 182 comprises a cycle outcome model instance 42I, 42B and a sequence model instance for a cycle 4B that can be used for a cycle structure 80 for a cooking appliance 12. To achieve a desired outcome, a set of cooking profiles (FIG. 44) are created each having multiple components specifying various parameters associated with the cooking cycle.

To get the doneness of crispy donuts, the profiles in FIG. 44 indicate that the user 14 needs to use an iron skillet in a 30" cavity, and in the other case we have a glass crock pot in a 27" cavity; thus, a user 14 can cook those donuts differently to achieve the same outcome, and the desired cycle outcome will point to the specific sequence for the cycle. Different profiles and different cycle structures 80 can therefore achieve the same outcome given a set of appliance user domain data 180 elements like the food type, cavity size, and the pan.

Using the recipe specified by one of the sequence model instance for a recipe with a first set of portions 42L and the sequence model instance for a recipe with a second set of portions 42M, the selection of which is based on the cooking profiles, the user 14 first gets the ingredients. In this example, the user 14 is using the sequence model instance for a recipe with a first set of portions 42L: get 5 ounces of flour, 2 ounces of sugar. The sequence model instance for a recipe with a first set of portions 42L then transitions to the next state 246 called mix. The user 14 then mixes the ingredients and transitions to the next state to cook. The user 14 puts the mix in the pan and forms the dough, gets a pan, places the dough in the donut forms in the pan, and then transitions into state cook, where the user 14 places the pan in the appliance 12 and uses the user interface 46 to select the food pan and doneness to select the cycle.

The ingredients substitution model 40N and instance 42N thereof are both appliance user domain data 180. For a portion of flour, there is an alternate portion of crushed seaweed, and a substitution object in the ingredients substitution model instance 42N holds the primary and alternate portion and enables a user 14 to substitute one for the other and still complete the desired cooking cycle.

Likewise, we have a second substitution that shows a substitution between sugar and Splenda. So the arrows between the ingredients and the alternate portions and the substitution window point up to both the sequence model instance for a recipe with a first set of portions 42L and the sequence model instance for a recipe with a second set of portions 42M, and as seen in the sequence model instance for a recipe with a second set of portions 42M, the ingredients automatically changed out the ingredients from 5 ounces of flour to 60 ounces of crushed seaweed and from 2 ounces of sugar to 4 ounces of Splenda. This relationship between these models/model instances enables the user 14 to fluidly accommodate issues that arise during cooking.

The alternate portion can also have nutritional information associated therewith so that as sequence model instance for recipes call for certain portion substitutions, the nutritional information is derived from the portions and then compared that to the constraints from the meal planner discussed below, allowing the meal planner to then actually achieve the substitutions based on nutritional constraints.

As shown in FIG. 48, this ability to transform and suggest a recipe comprises a meal planner that can query other smart agents of information to figure out how to best plan the meal. The meal can also be a combination of multiple recipes, such as a lasagna followed by donuts for dessert. The meal planner will thus query for the participants in the meal, each person's schedules, the profiles of the participates to note food preferences, allergies, diets, and doctor's orders that would create constraints on the meal planner. The meal planner will then use the information garnered from these queries to select either certain recipes or certain ingredients for recipes to conform to the preferences of the people, the schedules of the people, or the nutritional constraints that people might have based on their diets, allergies, etc.

The other constraint that a meal planner could look at would be an inventory system constraint where an inventory system actually knows the available portions that are in the house and then the meal planner could take that and select recipes or do ingredient substitutions or recipes based on the inventory at hand. It could also populate a shopping list if there were certain things that it highlighted as not being available or being in conflict with a preference of a person or a diet of a person, then it could kind of spit out a shopping list and say to the user of the meal planner, hey, we better get this. And of course it could automate that transaction by having it ordered, delivered, etc.

While the invention has been specifically described in connection with certain specific embodiments thereof, it is to be understood that this is by way of illustration and not of limitation, and the scope of the appended claims should be construed as broadly as the prior art will permit.

We claim:

1. An appliance configured to perform a physical cycle of operation on a physical article comprising:
    at least one control board having control software to control the cycle of operation,
    a graphical user interface in communication with the at least one control board for allowing a user to observe and interact with the appliance regarding the cycle of operation,
    a software framework configured to run in a processor having memory in communication with the graphical user interface and having theme definitions and access to builder content containing information with which the software framework associates a theme definition with at least one resource, and a theme manager configured to change at least one theme definition to at least one different theme definition in response to a user selection of a theme, wherein the software framework dynamically renders the graphical user interface at runtime based on the at least one resource in response to the user selection so that a user can cause the control board to control the cycle of operation via the selected theme in the graphical user interface.

2. The appliance of claim 1 wherein the graphical user interface further comprises at least one instance of a user interface control and wherein the builder content further contains information with which the software framework creates the at least one instance of user interface control.

3. The appliance of claim 2 wherein the at least one instance comprises at least one property and the builder content further comprises information from which the software framework associates the at least one property with the at least one resource to affect visualization of the at least one instance of a user interface control in the graphical user interface in response to selection of the theme.

4. The appliance of claim 2 wherein the software framework lazy loads the at least one resource contemporaneously with the activation of a user interface control.

5. The appliance of claim wherein the software framework is further configured to manage the memory of the processor in response to the selection of the theme.

6. The appliance of claim 5 wherein the management of the memory includes at least one of overwriting memory in use with the at least one different resource, allocating memory associated with the at least one resource, and deallocating memory associated with the at least one resource.

7. An appliance configured to perform a cycle of operation on a physical article comprising:
at least one control board having control software to control the cycle of operation,
a graphical user interface in communication with the at least one control board for allowing a user to observe and interact with the appliance regarding the cycle of operation,
a software framework configured to run in a processor having memory in communication with the graphical user interface and having theme definitions and access to builder content containing information with which the software framework associates a theme definition with at least one resource,
at least one sensor of information with the sensor in communication with the software framework, and binding data associating the information with the theme,
wherein the software framework dynamically renders the graphical user interface at runtime based on the at least one resource in response to the sensing of the information from the at least one sensor and wherein the theme is changed in response to the sensing of the information from the at least one sensor so that the rendering of the graphical user interface changes in response to the sensing of the information at runtime.

8. The appliance of claim 7 wherein the information is an identifier.

9. The appliance of claim 8 wherein the information is an identifier of at least one of a person, a consumable, an article, and a consumable holder.

10. The appliance of claim 7 wherein the at least one sensor is a virtual sensor.

11. The appliance of claim 10 wherein the at least one sensor is one of a time observer and a date observer.

12. The appliance of claim 11 wherein rendering is in response to the sensing of one of the time of day and a day of year.

13. An appliance of claim 7 wherein the at least one sensor is configured to sense one of a consumable, an article, and a person.

14. An appliance of claim 7 wherein the sensor is a software agent configured to sense appliance control information.

15. The appliance of claim 14 wherein the appliance control information includes at least one of information associated with the cycle of operation, a selected cycle of operation, cycle modifiers or selections thereof, cycle time, delay time, cycle duration, temperature, speed, energy usage, resource usage, water usage, waste heat capture, resource recycling, waste recycling, and at least one cycle outcome.

16. The appliance of claim 10 wherein the virtual sensor senses at least one of the weather, significant days, birthdays, anniversaries, and financial market conditions and wherein the graphical user interface displays information signifying the at least one of the weather, significant days, birthdays, anniversaries, and financial market conditions in response to one of the selected theme and the information.

17. The appliance of claim 10 wherein the virtual sensor is in communication with a social network.

18. The appliance of claim 17 wherein the rendering of the user interface changes in response to the communication.

19. The appliance of claim 10 wherein the virtual sensor is in communication with a remote data source connected via a network.

20. The appliance of claim 10 wherein the virtual sensor is in communications with a calendar application wherein data from the calendar application is acquired from the virtual sensor to affect the rendering.

21. An appliance configured to perform a physical cycle of operation on a physical article comprising:
a dynamic user interface for allowing a user to at least one of initiate and observe the cycle,
at least two theme definitions wherein each theme definition comprises an identifier,
at least one control board in communication with the user interface having at least one processor and memory,
a software framework in the memory having access to a content provider for acquiring a dataset from at least one source of data, at least one binding object and at least one user interface control object wherein the at least one binding object and the at least one user interface control object are directly or indirectly related, and a theme manager configured to change the theme identifier t oat least one different theme identifier,
at least one source of information about a dataset having data wherein the at least one binding object and the at least one source of information about a dataset are directly or indirectly related in the memory, and
a memory location to store a selected theme identifier wherein the software framework can change the relationship between the at least one binding object and the at least one source of information in response to a runtime change to the theme identifier value of the memory via the theme manager, resulting in a graphical transformation of the user interface wherein the relationships with the at least one binding object enable the transformation to be made at runtime.

* * * * *